(12) United States Patent
Cooper

(10) Patent No.: US 9,540,191 B2
(45) Date of Patent: Jan. 10, 2017

(54) SYSTEMS AND METHODS FOR PROCESSING STACKABLE ARTICLES

(71) Applicant: RMF Steel Products Company, Grandview, MO (US)

(72) Inventor: Clay C. Cooper, Clifton Park, NY (US)

(73) Assignee: RMF Steel Products Co., Grandview, MO (US)

( * ) Notice: Subject to any disclaimer, the term of this patent is extended or adjusted under 35 U.S.C. 154(b) by 160 days.

(21) Appl. No.: 14/286,273

(22) Filed: May 23, 2014

(65) Prior Publication Data

US 2014/0363266 A1 Dec. 11, 2014

Related U.S. Application Data

(60) Provisional application No. 61/832,739, filed on Jun. 7, 2013.

(51) Int. Cl.
*B65H 31/30* (2006.01)
*B65G 57/00* (2006.01)
(Continued)

(52) U.S. Cl.
CPC ............ *B65G 57/00* (2013.01); *B25J 11/0045* (2013.01); *B65B 5/06* (2013.01); *B65B 5/105* (2013.01); *B65B 25/065* (2013.01)

(58) Field of Classification Search
CPC .... B65B 25/143; B65B 21/183; B65B 25/065; B65B 5/06; B65B 5/105; G07D 9/065; B65G 57/00; B65G 57/302; B65H 31/30; A01D 90/08; B25J 11/0045
(Continued)

(56) References Cited

U.S. PATENT DOCUMENTS 4,478,024 A * 10/1984 Vedvik .................... B65B 35/16
53/247
4,827,692 A 5/1989 Fiske et al.
(Continued)

FOREIGN PATENT DOCUMENTS

FR 2890060 A1 3/2007

OTHER PUBLICATIONS

Communication of Results of Partial International Searched prepared by the European Patent Office (EPO) for corresponding PCT Application PCT/US2014/040988 mailed on Sep. 8, 2014.
(Continued)

*Primary Examiner* — Stephen Vu
(74) *Attorney, Agent, or Firm* — Tech Valley Patent, LLC; John Pietrangelo

(57) ABSTRACT

Systems and methods for processing stackable articles, such as, frozen hamburgers or compact disks, are provided. The systems include mechanisms for determining the number of articles in a stack of articles, a transfer device adapted to transfer the articles when the number of articles equals a predetermined number of articles, a gripping device adapted to receive the stacks of articles from the transfer device, an automated manipulator adapted to transfer the gripping device with the stacks of articles, and a mechanism for discharging the stacks of articles from the gripping device to, for example, a container. The systems and methods may also provide staging areas adapted to receive the stack of articles and then transfer the stack of articles to the gripping device. Though aspects of the invention may be uniquely adapted to handle food items, aspects of the invention may also be used for non-food items.

25 Claims, 35 Drawing Sheets

(51) Int. Cl.
    *B65B 25/06*    (2006.01)
    *B65B 5/06*     (2006.01)
    *B65B 5/10*     (2006.01)
    *B25J 11/00*    (2006.01)
(58) Field of Classification Search
    USPC .......................... 414/789.9, 790–790.2, 802
    See application file for complete search history.

(56) References Cited

U.S. PATENT DOCUMENTS

| | | | |
|---|---|---|---|
| 5,611,193 A * | 3/1997 | Farrelly ................. | B65B 5/105 |
| | | | 53/245 |
| 5,779,432 A * | 7/1998 | Pena ..................... | B65G 57/11 |
| | | | 198/418.6 |
| 5,809,745 A * | 9/1998 | Reinert ................. | B65B 35/50 |
| | | | 53/258 |
| 2002/0028127 A1 | 3/2002 | Hart et al. | |
| 2012/0216490 A1 | 8/2012 | Cooper et al. | |

OTHER PUBLICATIONS

International Preliminary Report on Patentability (IPRP) prepared by the European Patent Office (EPO) for corresponding PCT Application PCT/US2014/040988 issued on Dec. 8, 2015.
International Search Report and Written Opinion prepared by the European Patent Office (EPO) for corresponding PCT Application PCT/US2014/040988 mailed on Dec. 1, 2014.
RMF "Patty Stacker" Brochure, 2007.
RMF "Belt Conveyor" Brochure, 2007.

* cited by examiner

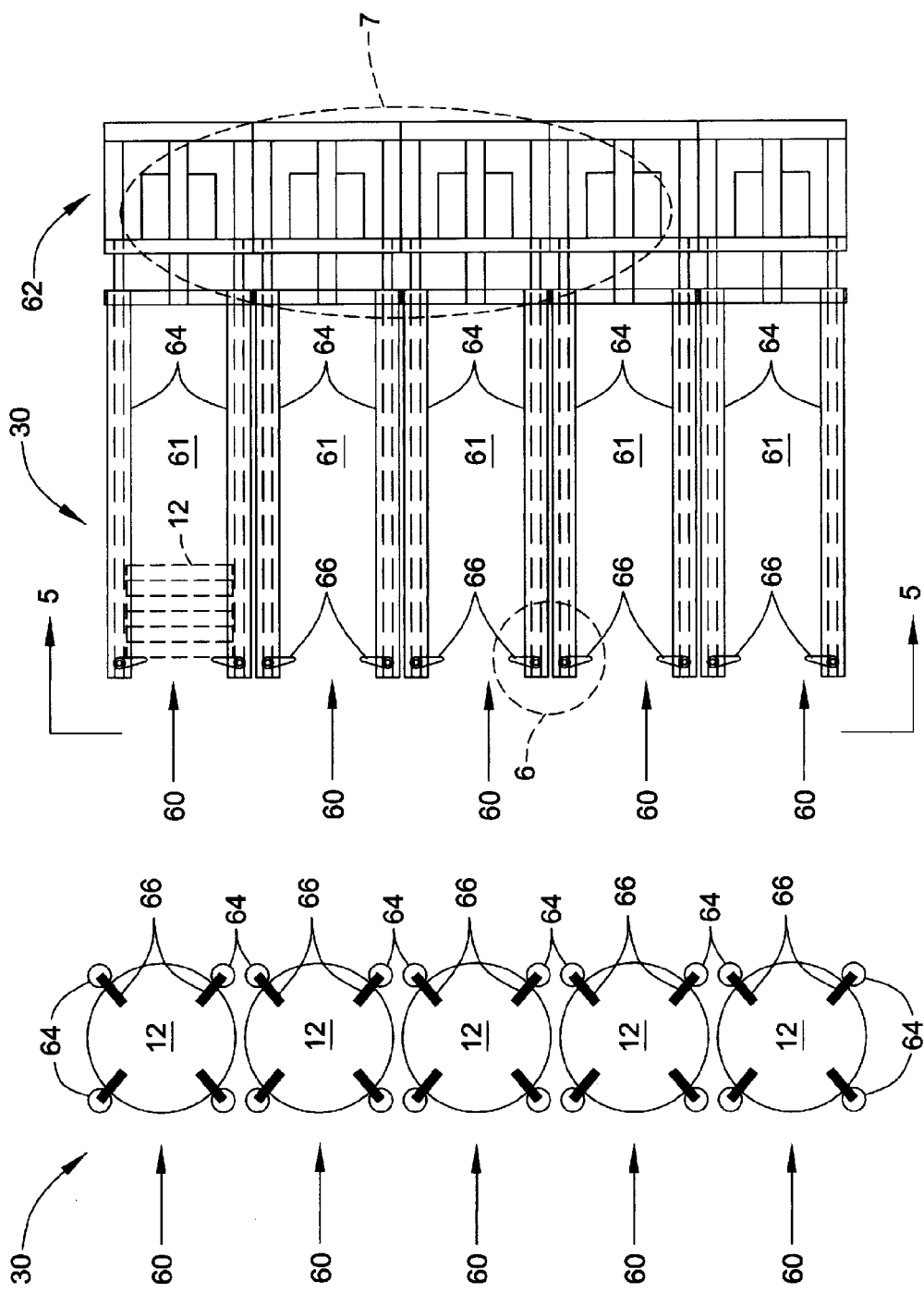

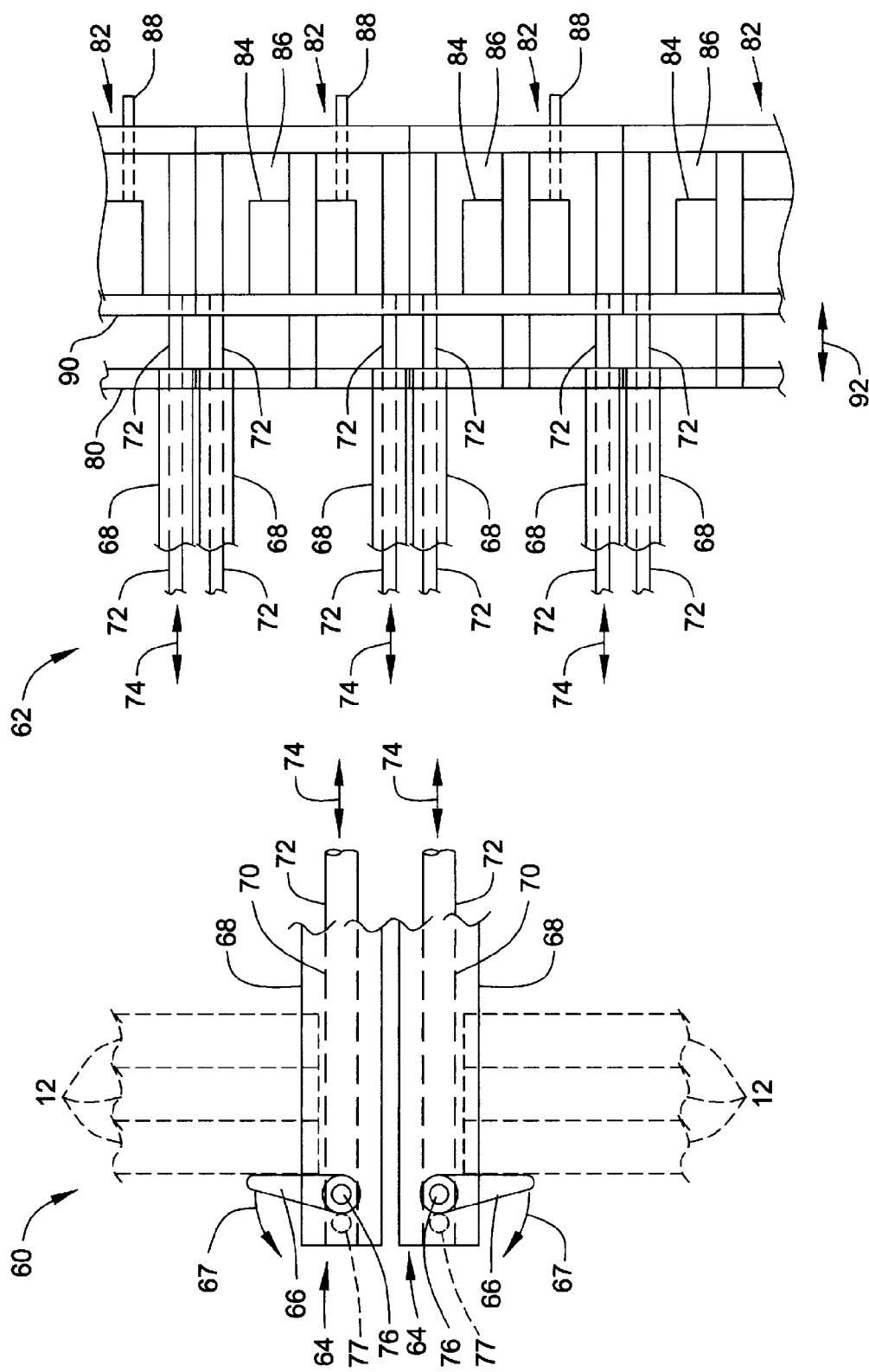

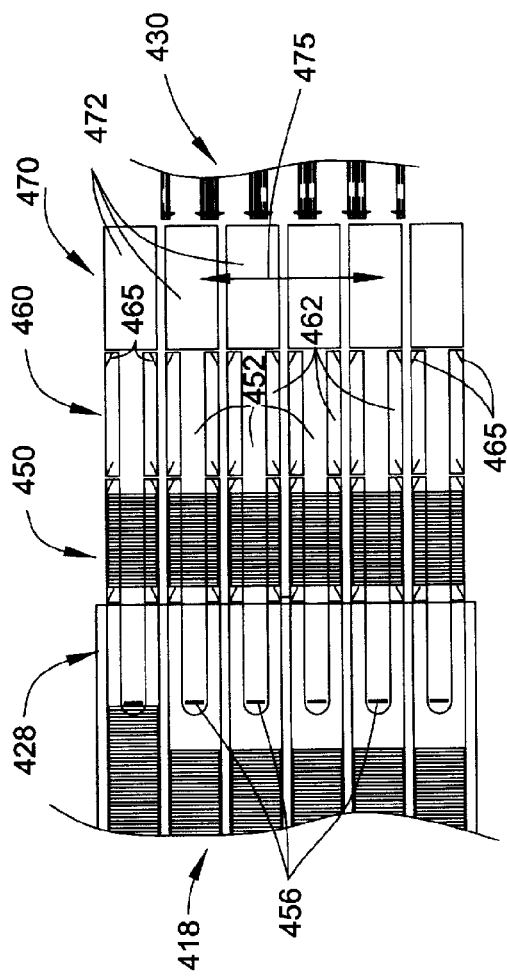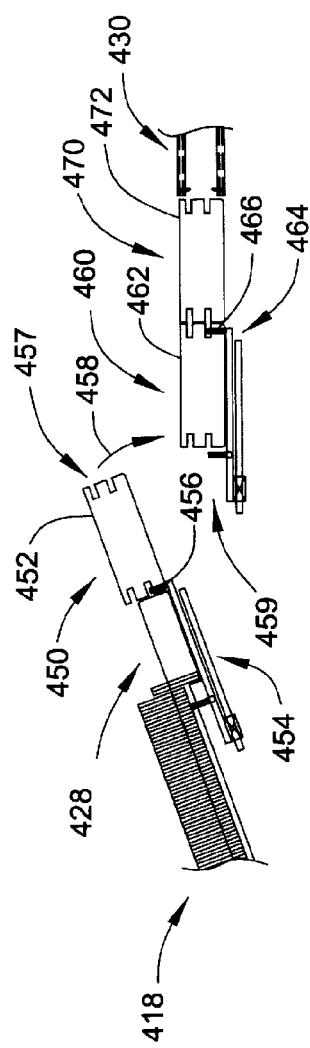

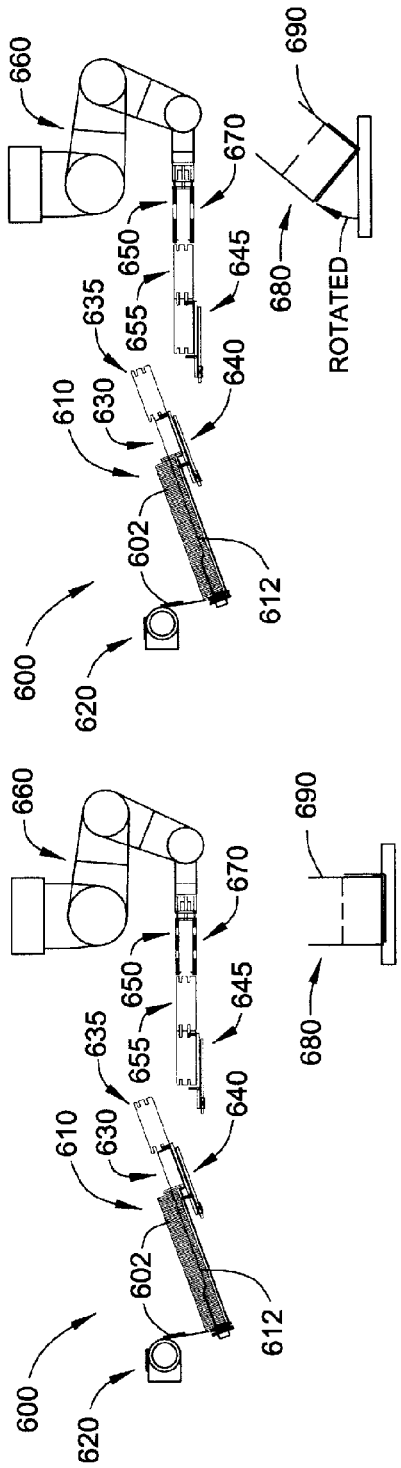
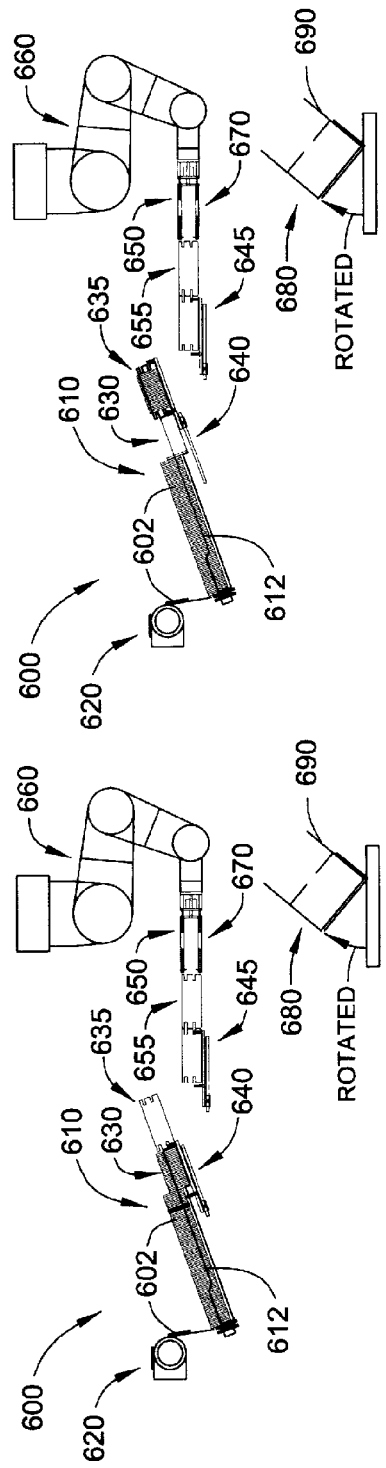
FIG. 28
FIG. 29
FIG. 30
FIG. 31

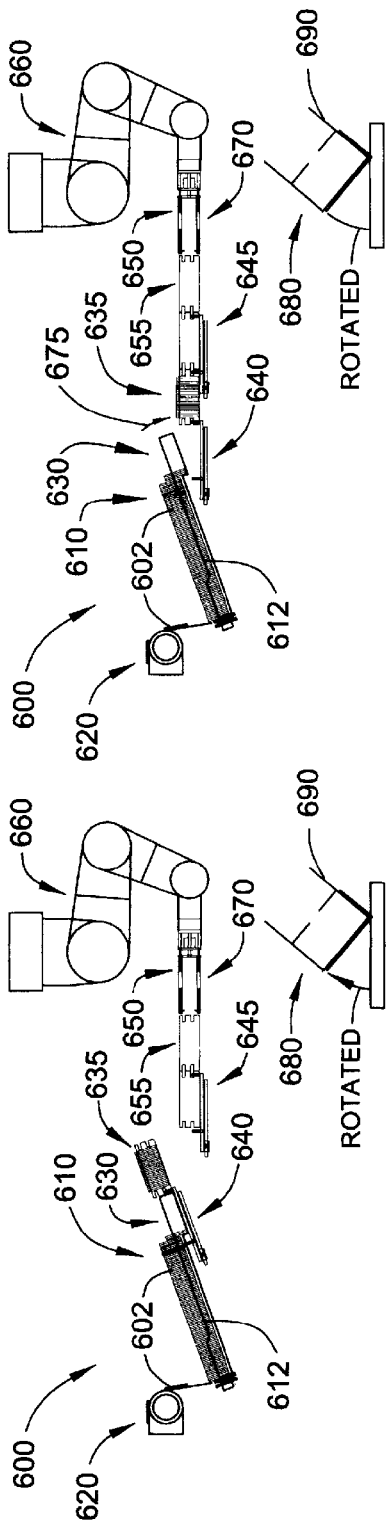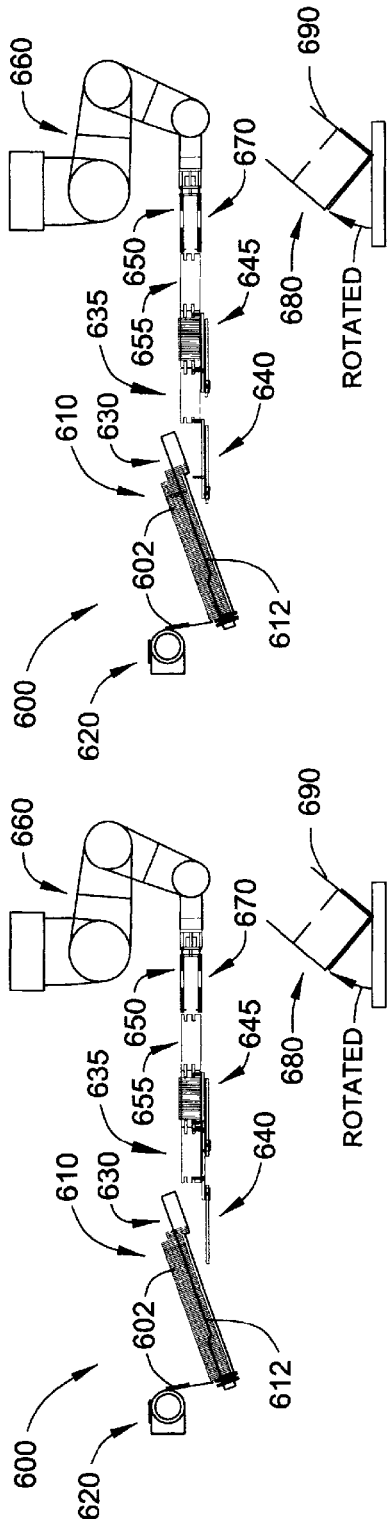

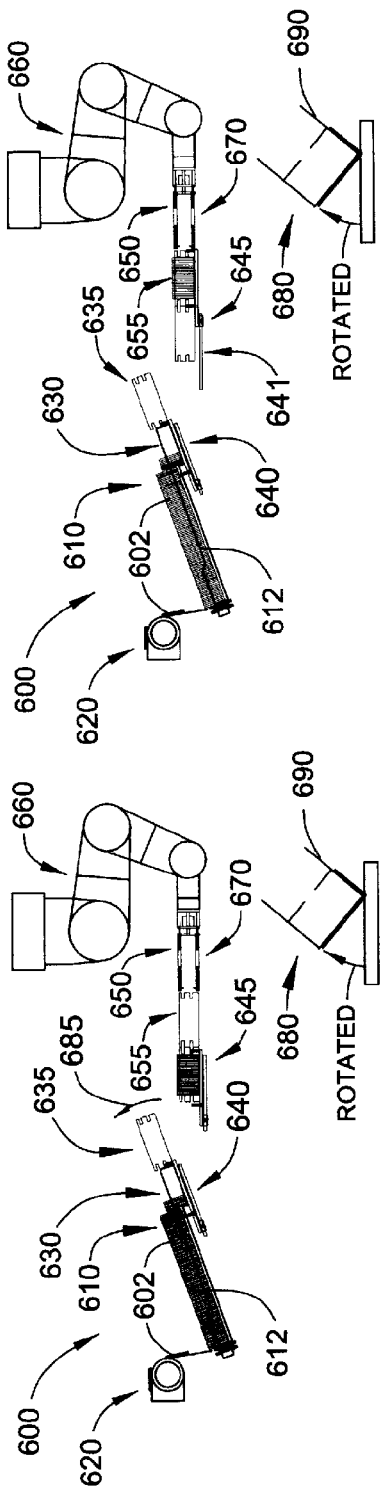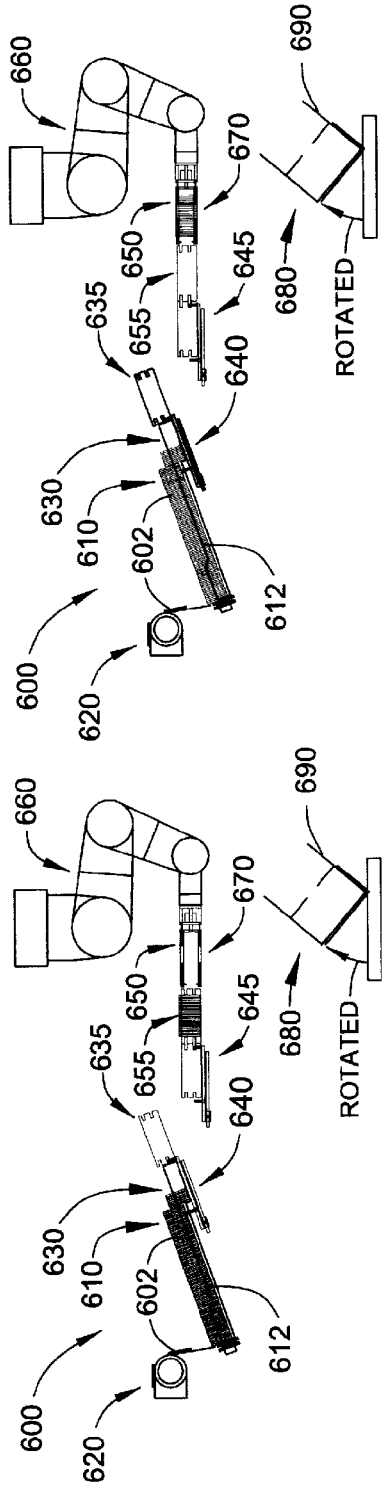
FIG. 36
FIG. 37
FIG. 38
FIG. 39

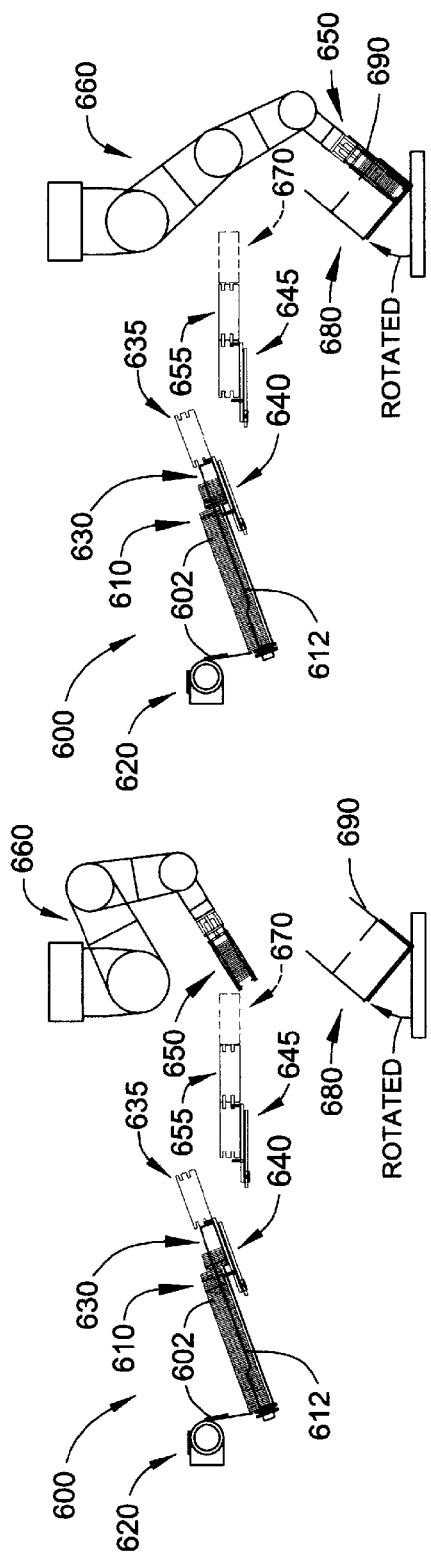
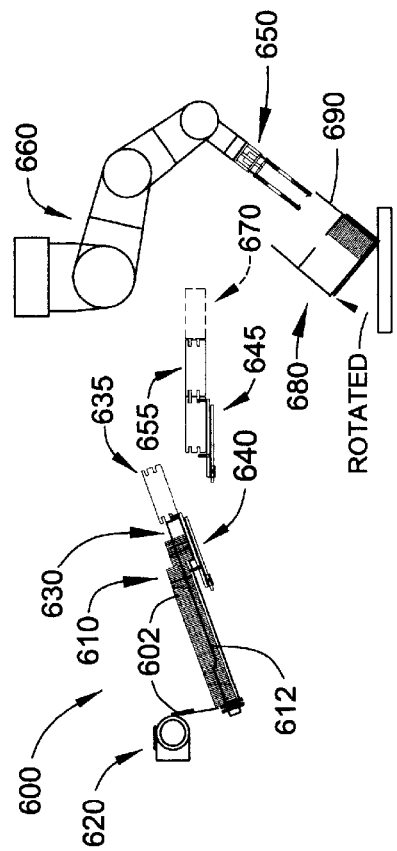
FIG. 40
FIG. 41
FIG. 42

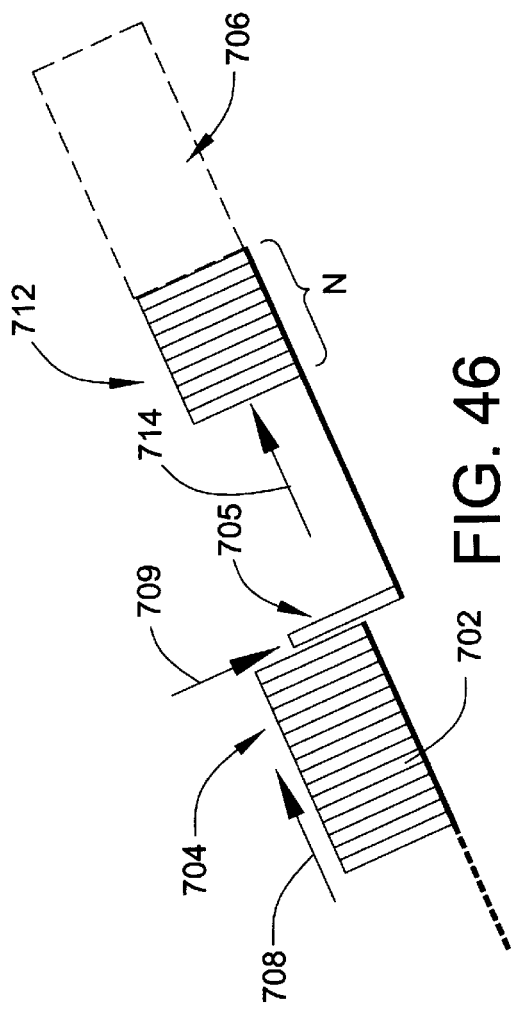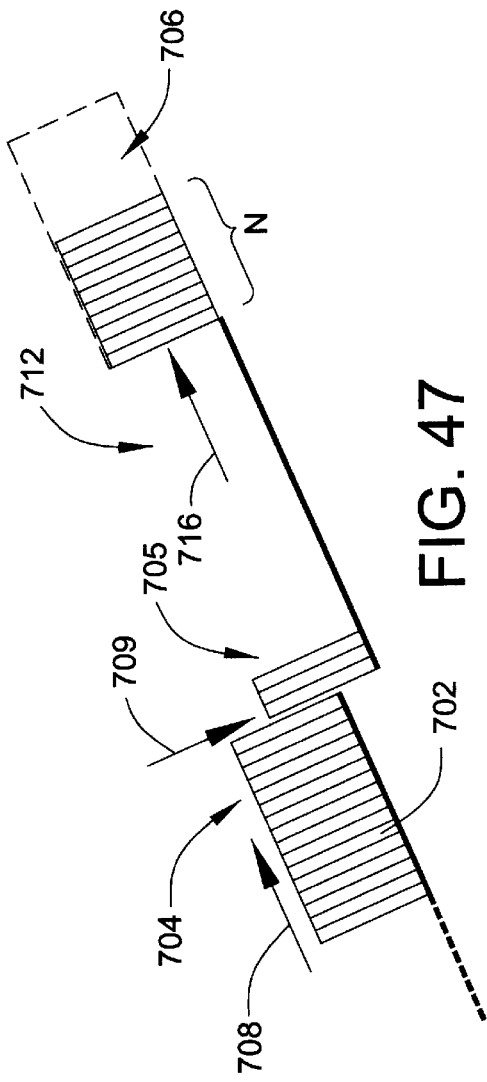

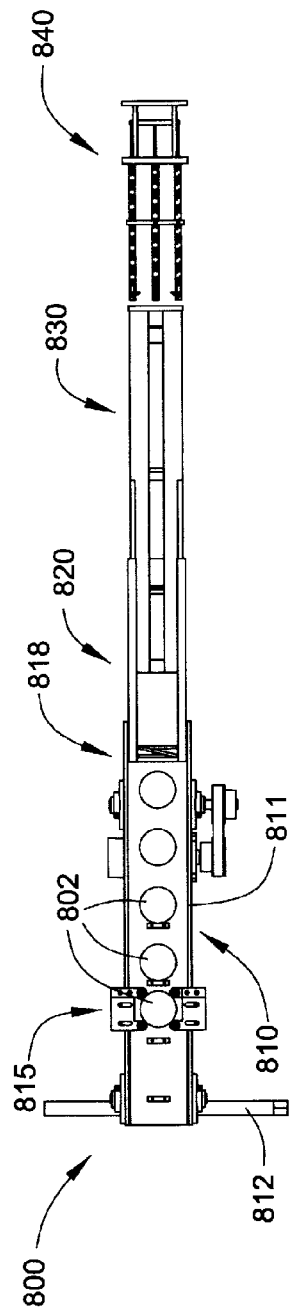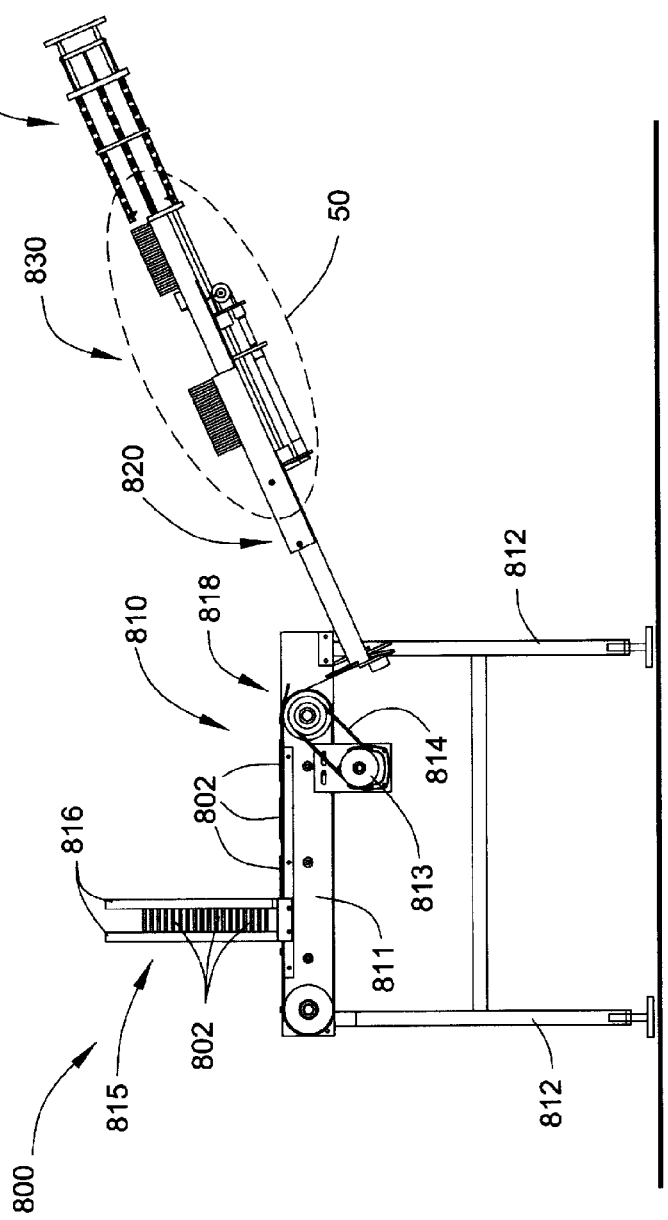
FIG. 49
FIG. 48

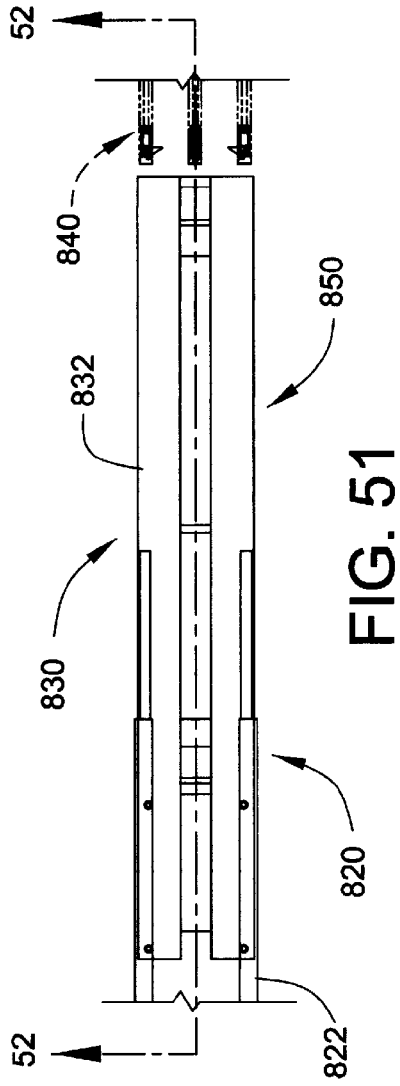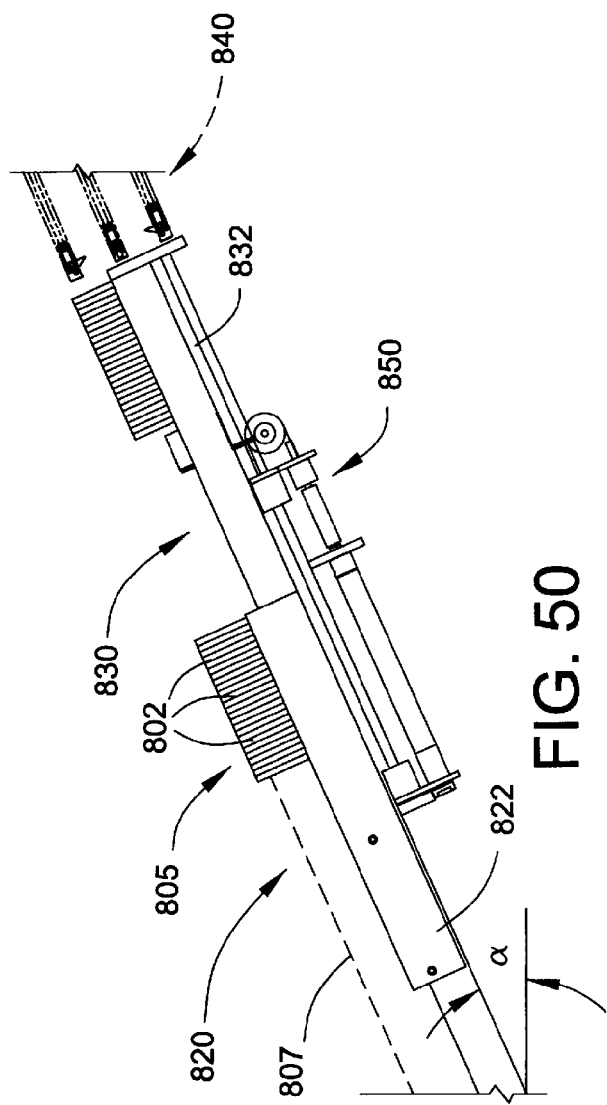

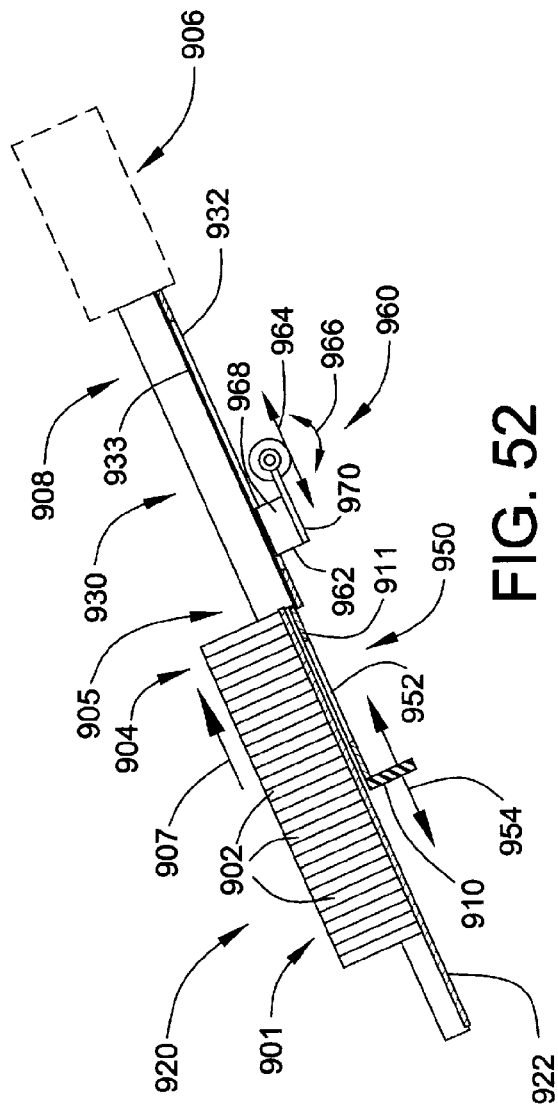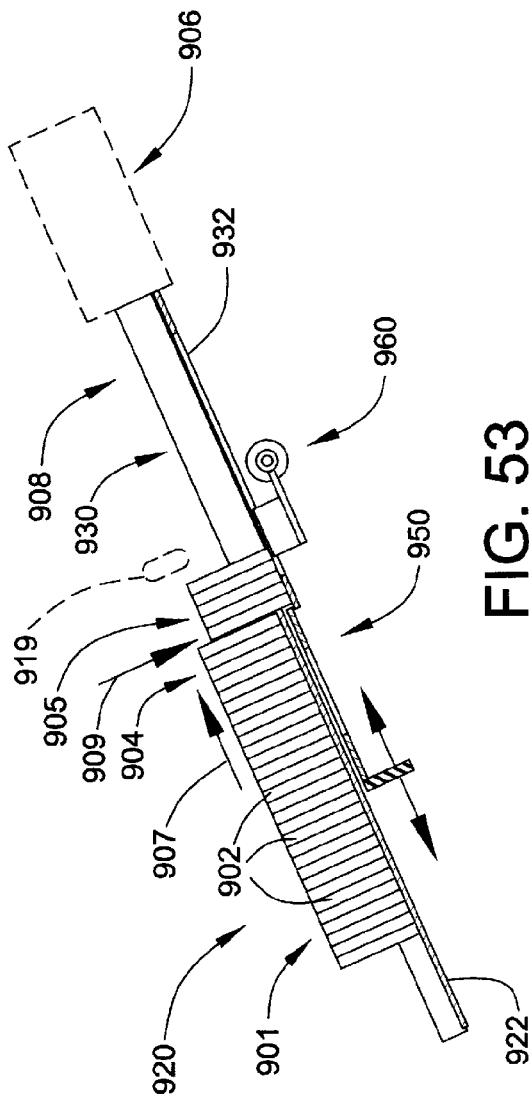

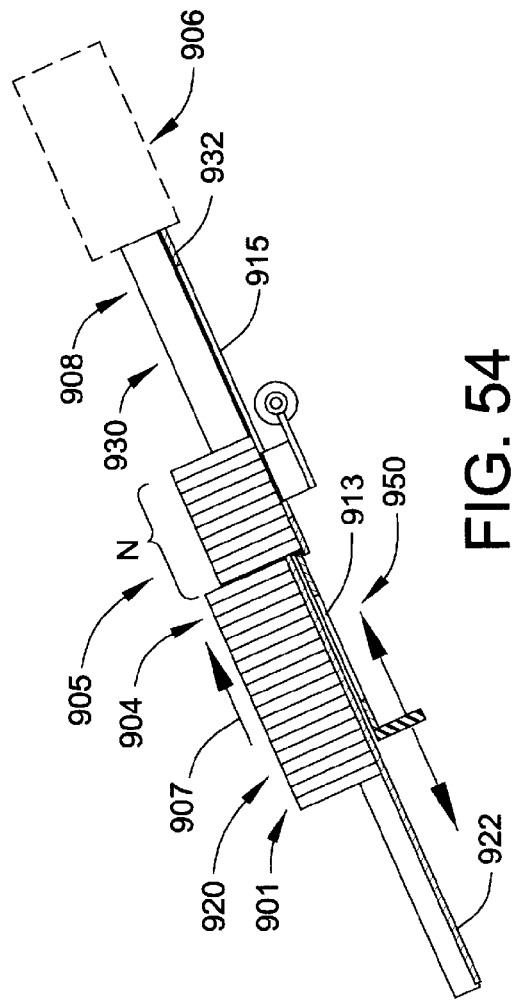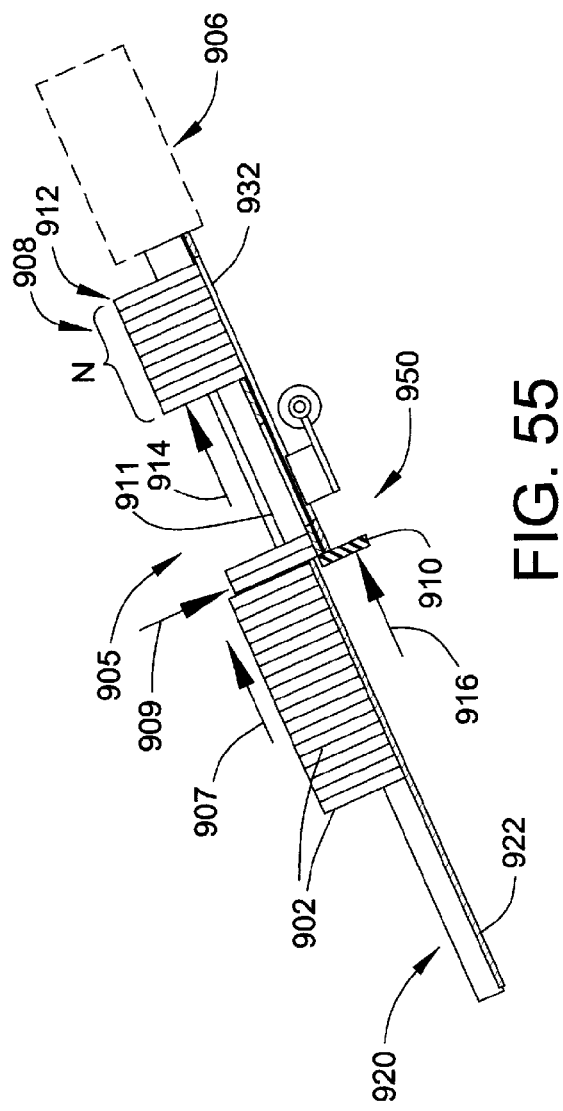

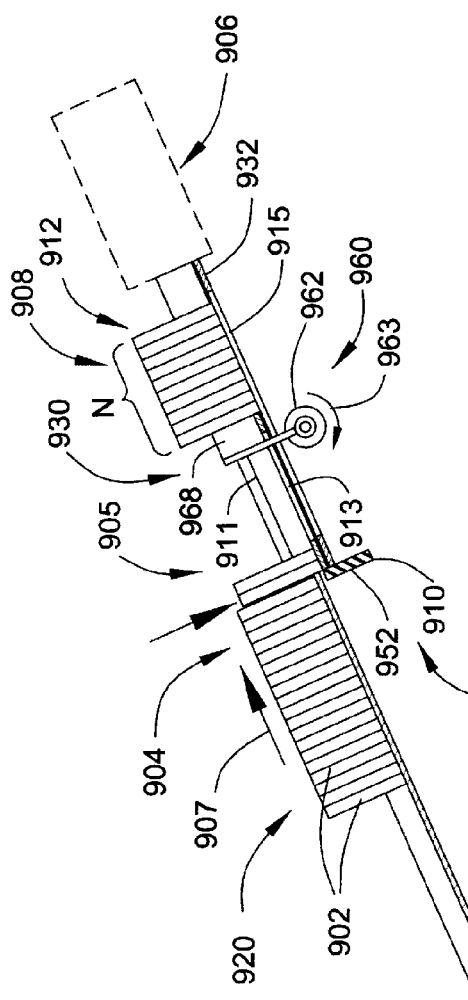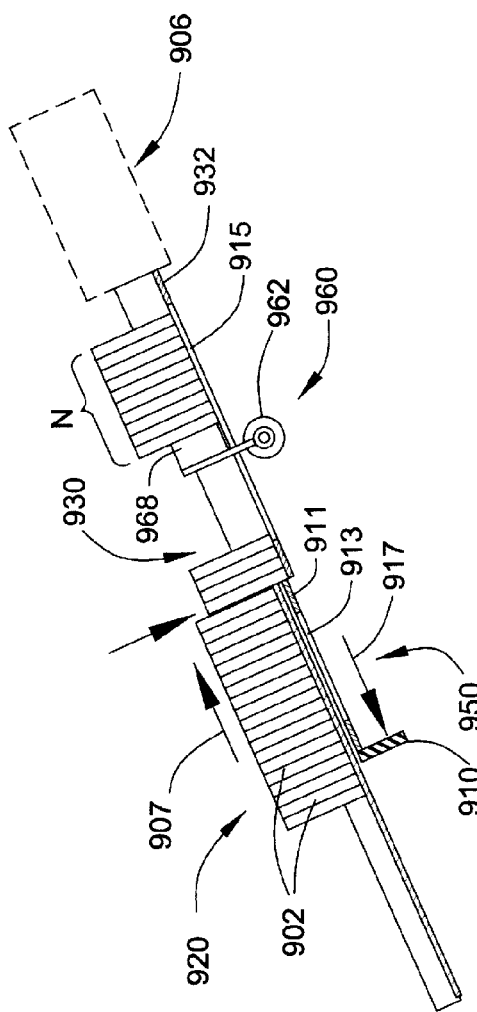

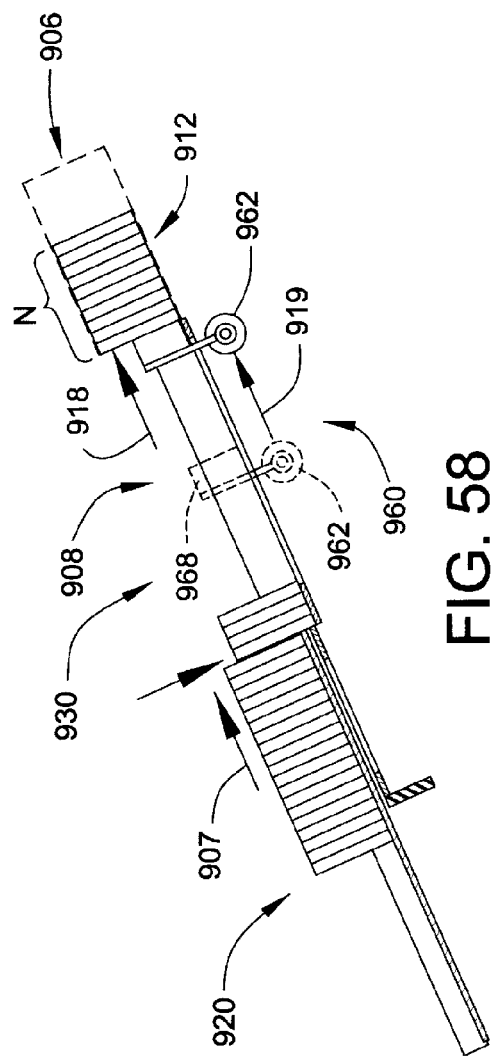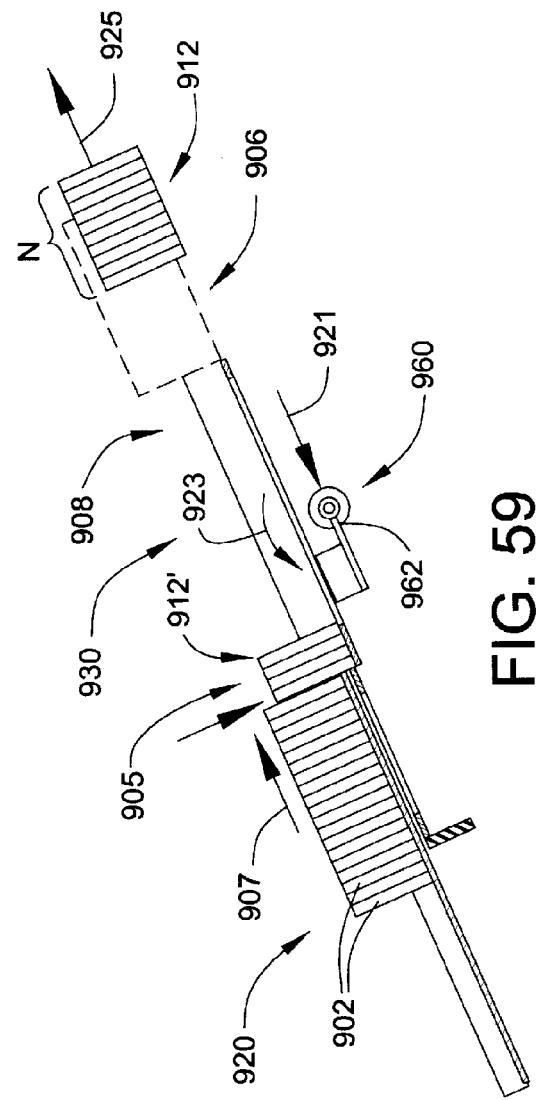

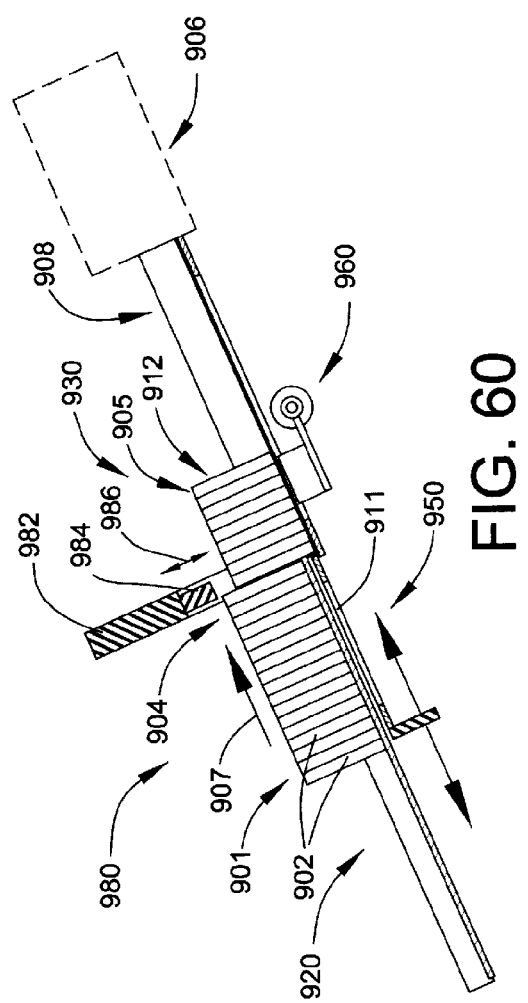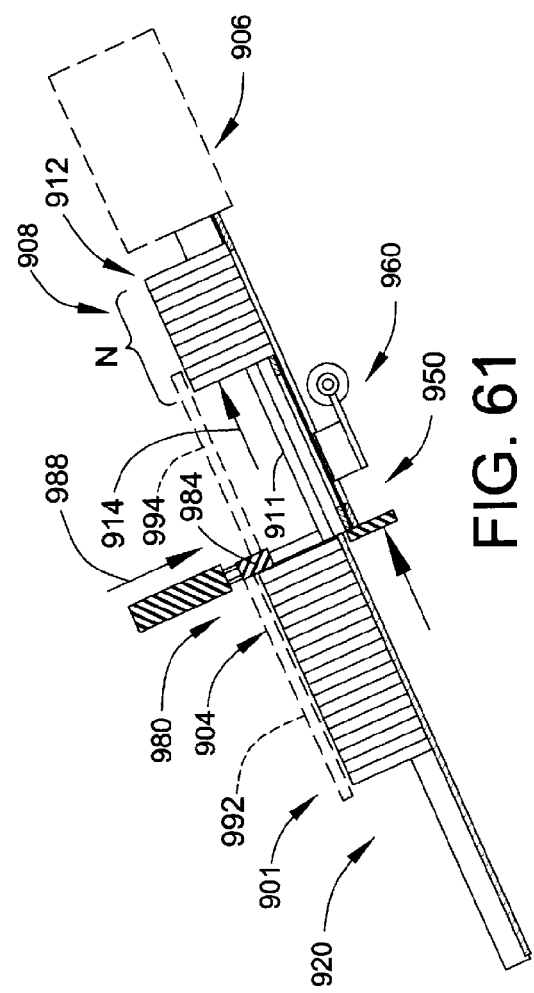

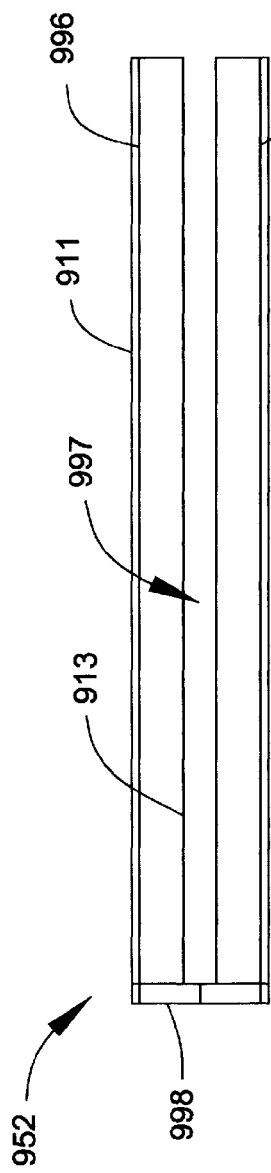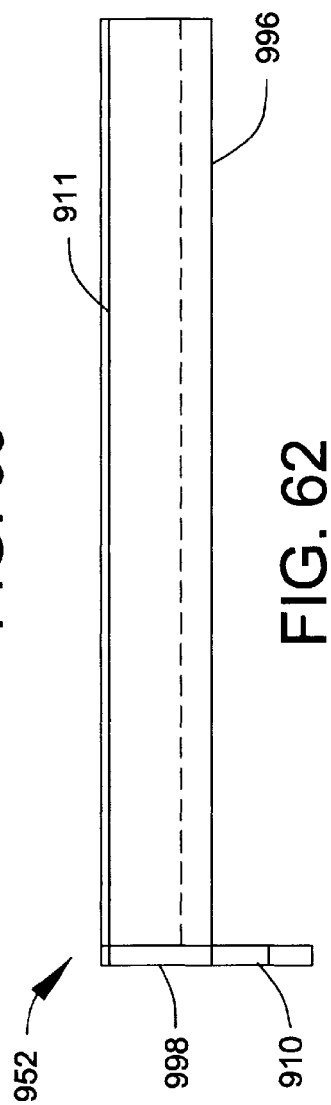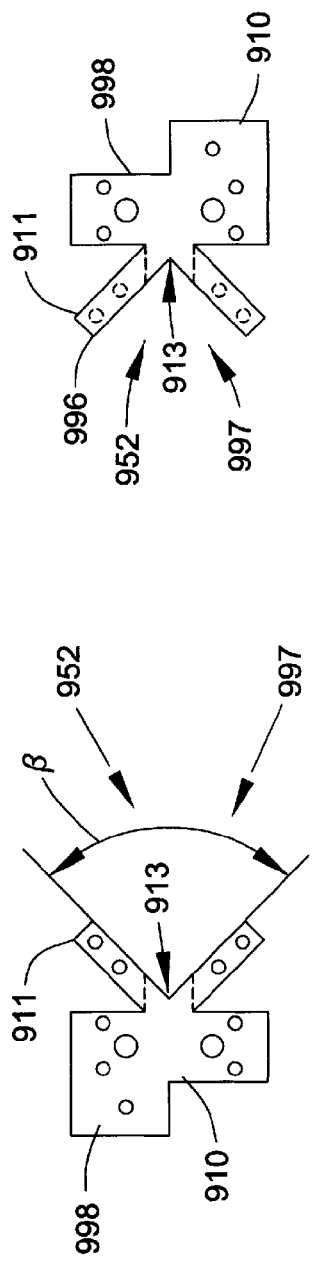

SYSTEMS AND METHODS FOR PROCESSING STACKABLE ARTICLES

CROSS-REFERENCE TO RELATED APPLICATION

This application claims priority from U.S. Provisional Patent Application 61/832,739, filed on Jun. 7, 2013, the disclosure of which is included by reference herein in its entirety.

BACKGROUND OF THE INVENTION

Technical Field

The present invention relates, generally, to methods and apparatus for handling articles, for example, stackable articles, such as, stackable food items. In particular, methods and apparatus are disclosed for handling stackable food items, such as, frozen hamburger patties, for efficient handling and packaging.

Description of Related Art

Many methods and apparatus have been provided in the art for efficiently handling food articles, for example, frozen hamburger patties.

However, prior art methods and apparatus have deficiencies that indicate that a need exists for improving the handling of stackable articles in general, and stackable food items in particular. For example, deficiencies of the existing art may include the inability of the systems to process and stack articles in a container without stopping a conveyor whereby such articles are supplied for stacking. As described in detail below, aspects of the present invention overcome these and other deficiencies of the prior art and provide the desired improved methods and apparatus.

SUMMARY OF THE INVENTION

Aspects of the present invention provide systems and methods for handling stackable articles, such as, food items, for example, frozen hamburger patties employing robotic actuators and gripping devices uniquely adapted to handle stackable articles. These systems and methods include translating and rotating handling devices that facilitate and accelerate the safe and efficient handling of articles.

One embodiment of the invention is a method of processing stackable articles transported on a receiver, where the receiver adapted to form a predetermined number of stacks of the articles, the method comprising or including: a) determining an attribute of the articles in at least one of the stacks of articles; b) when the attribute of the articles in the at least one of the stacks conforms to a predetermined attribute for the articles, transferring the at least one of the stacks of articles into a gripping device in a first position; c) retaining the at least one stack of articles in the gripping device in the first position; d) repeating steps a), b), and c) and thereby retaining multiple stacks of articles in the gripping device; e) transferring the gripping device having the multiple stacks of articles from the first position to a second position; and f) discharging the multiple stacks of articles from the gripping device at the second position. According to aspects of the invention, the attribute of the articles may be the number of articles, the weight of the articles and/or the length of the articles, for example, the over-all length of the articles. In one aspect, the method may further include: g) repeating steps d), e), and f) until a predetermined number of stacks are discharged at the second position.

In another aspect, the gripping device may be a gripping device having variable gripper mechanism spacing, and wherein d) repeating steps a), b), and c) and thereby retaining multiple stacks of articles in the transfer device comprises: e1) repeating steps a), b), and c) and thereby retaining multiple stacks of articles in the transfer device having a first gripper mechanism spacing; and wherein the method further comprises: e2) varying the gripper mechanism spacing in the gripping device from the first gripper mechanism spacing to a second gripper mechanism spacing. For example, in one aspect, the second position of the transfer device may have a container, for example, a carton or box, and wherein the second gripper mechanism spacing may be a gripper mechanism spacing compatible with a dimension of the container, for example, an inside dimension of a carton.

In another aspect, the step of b) transferring the at least one of the stacks of articles into a gripping device in the first position may be practiced by: b1) transferring at least some of the stacks of articles to a staging area; and b2) transferring at least some of the stacks of articles from the staging area to the gripping device in the first position. In addition, in another aspect, the step of b1) may be practiced by: b1a) transferring at least some of the stacks of articles to a cradle; and b1b) rotating the cradle from a first position, for example, substantially in alignment with the receiver to a second position, for example, substantially in alignment with the gripping device.

Another embodiment of the invention is a system of processing stackable articles transported on a receiver, the receiver adapted to form a predetermined number of stacks of the articles, the system comprising or including: means for determining an attribute of the articles in at least one of the stacks of articles, for example, a detector, such as, a counter or proximity detector, adapted to determine the number of articles; a transfer device adapted to transfer the articles from the receiver when the attribute of the articles in the at least one of the stacks conforms to a predetermined attribute of the articles; a gripping device in a first position, the gripping device adapted to receive the at least one of the stacks of articles from the transfer device and retain the at least one of the stacks of articles; an automated manipulator adapted to transfer the gripping device having the at least one of the stacks of articles from the first position to a second position; and means for discharging the at least one of the stacks of articles from the gripping device at the second position, for example, an actuator adapted to actuate the gripping device where the gripping device discharges the at least one stacks of articles from the gripping device to a container. According to aspects of the invention, the attribute of the articles may be the number of articles, the weight of the articles and/or the length of the articles, for example, the over-all length of the articles.

In one aspect, the gripping device may be a gripping device having variable gripper mechanism spacing. For example, the gripping device may have variable gripper mechanism spacing an be adapted to vary the gripper mechanism spacing from a first gripper mechanism spacing to a second gripper mechanism spacing, different from the first gripper mechanism spacing. For example, in one aspect, the system may include a container positioned in the second position, wherein the second gripper mechanism spacing comprises spacing compatible with a dimension of the container, for example, an inside dimension of the container.

According to another aspect, a gripping device having variable gripper mechanism spacing, for example, as described above, is also provided.

In another aspect of the invention, the system may include a staging area, for example, a staging area adapted to receive the at least one stack of articles from the receiver and then transfer the at least one stack of articles to the gripping device. In one aspect, the staging area may include a rotatable cradle adapted to rotate from a first position, for example, substantially in alignment with the receiver to a second position, for example, substantially in alignment with the gripping device. In another aspect, the staging area may include a movable shuttle adapted to receive the at least some stacks of articles and transfer the at least some stacks of articles to the gripping device. In one aspect, the shuttle may be adapted to provide variable trough spacing, wherein the shuttle is adapted to vary the shuttle trough spacing from a first trough spacing to a second trough spacing, different from the first trough spacing.

Another embodiment of the invention is a method of processing stackable articles transported in rows on a conveyor, the articles oriented on the conveyor in a predetermined number of columns, the method comprising: a) discharging the articles from the conveyor into a receiver to form stacks of the articles in the predetermined number of columns; b) determining an attribute of the articles in at least one of the stacks of articles; c) when the attribute of the articles in the at least one of the stacks conforms to a predetermined attribute of articles, for example, the number of articles, the weight of the articles and/or the length of the articles, transferring the at least one of the stacks of articles into a first transfer device in a first position; d) retaining the at least one stack of articles in the first transfer device in the first position; e) transporting the first transfer device having the at least one stack of articles from the first position to a second position; f) discharging the at least one stack of articles from the first transfer device to a third position; g) transporting the at least one stack of articles from the third position to a fourth position; h) repeating steps a) through g) until a predetermined number of stacks of articles are transported to the fourth position; i) transporting the predetermined number of stacks of articles from the fourth position to a gripping device in a fifth position; j) retaining the multiple stacks of articles in the gripping device in the fifth position; k) transporting the gripping device having the multiple stacks of articles from the fifth position to a sixth position; and l) discharging the multiple stacks of articles from the gripping device in the sixth position, for example, to a container.

In one aspect, the method may further include: m) repeating steps a) though l) until a predetermined number of stacks of articles are discharged from the gripping device in the sixth position. In another aspect, the fourth position may comprise a third transfer device having troughs with variable trough spacing, and wherein i) transporting the predetermined number of stacks of articles from the fourth position to the gripping device includes: i1) aligning the third transfer device with of the gripping device; and i2) transferring the predetermined stacks of articles from the third transfer device to the gripping device.

A further embodiment of the invention is a gripping device comprising or including: a plurality of gripping mechanisms, each of the plurality of gripping mechanism comprising: a plurality of elongated gripping arms, the plurality of elongated gripping arms defining an article retaining space, and each of the plurality of elongated gripping arms including: an elongated tube having an elongated cavity extending in a direction of elongation of the tube; an elongated rod positioned for reciprocal motion within the elongated cavity; and a lever pivotally mounted to the elongated tube and pivotally mounted to a distal end of the elongated rod, the lever having an end adapted to project into the article retaining space and retract from the article retaining space in response to the motion of the elongated rod; and an actuation assembly adapted to deflect each of the of rods of each of the plurality of gripping arms wherein each lever of the gripping arms pivotally projects or retracts from the article retaining space. In one aspect, the position of at least one of the plurality of gripping mechanisms may be variable with respect to the frame; for example, the position of each of the plurality of gripping mechanisms may be variable with respect to a frame of the gripping device.

A still further embodiment of the invention is a device for transferring articles, the device comprising or including: a plurality of elongated troughs adapted to receive a plurality of stacked articles, wherein at least some of the plurality of elongated troughs are positioned in a first position; means for varying a position of the least some of the plurality of elongated troughs from the first position to a second position, different from the first position; and a transfer device adapted to discharge the plurality of stacked articles from the least some of the plurality troughs in the second position. In one aspect, the means for varying the position of the least some of the plurality of elongated troughs from the first position to the second position comprises means for varying the position of each of plurality of troughs from the first position to a second position; and wherein the transfer device comprises a transfer device adapted to discharge the plurality of stacked articles from each of the plurality of troughs in the second position.

In one aspect of the invention, the process of transferring at least some of the stacks of articles to a staging area may be practiced by slidably transferring at least some of the stacks of articles to the staging area along a path. In addition, the method may further include retaining the at least some of the stacks of articles in the staging area. For example, in one aspect, retaining the at least some of the stacks of articles in the staging area may be practiced by supporting at least some of the stacks of articles with a moveable retainer. For instance, supporting at least some of the stacks of articles with a moveable support may be practiced by rotatably engaging the moveable retainer with at least some of the stacks of articles.

In another aspect of the invention, discharging the articles from the receiver system to a transfer system may be practiced by discharging the articles from the receiver system at an outlet having an elevation higher than an elevation of an inlet of a trough of the transfer system.

According to another aspect of the invention, when the attribute of the articles in the at least one of the stacks of articles conforms to a predetermined attribute of the articles, methods and systems disclosed herein may be adapted to forcibly separate an article defining a predetermined attribute from a subsequent article, for example, at the elevation of the outlet or discharge of the receiver system. For example, in one aspect, the forcible separation may be practiced by impacting the article defining the predetermined attribute with a movable barrier, for example, a translatable gate, or a rotatable gate. In one aspect, the movable barrier may also function to retain one or more subsequent article at the outlet or discharger of the trough of the receiver system, for instance, temporarily retain the one or more subsequent articles at the elevation of the outlet or discharge of the trough of the receiver system. Again, according to aspects of the invention, the attribute of the articles may be the number of articles, the weight of the articles and/or the length of the articles, for example, the over-all length of the articles.

In another aspect of the invention, the systems discloses herein may also include one or more first transfer devices adapted to transfer the at least one stack of articles to the staging area. For example, the one or more first transfer devices adapted to slidably transfer the at least some of the stacks of articles to the staging area along a path. The systems discloses herein may also include one or more second transfer devices adapted to transfer the at least one stack of articles from the staging area to the gripping device. For example, the one or more first transfer devices adapted to slidably transfer the at least some of the stacks of articles from the staging area to the gripping device along a path. In another aspect, the systems disclosed herein may include one or more retainers adapted to retain the at least some of the stacks of articles in the staging area. For example, in one aspect, the one or more retainers may be one or more moveable retainers, for instance, a rotatable retainer adapted to rotate into engagement with at least some of the articles.

According to another aspect of the invention, the systems disclosed herein may further include one or more transfer systems, for example, one or more transfer systems adapted to receive articles from the receiver system at an elevation lower than an elevation of an outlet or discharge of a trough of a receiver system.

A further embodiment of the invention is a method for processing stackable articles transported on a receiver system, the method comprising or including: a) discharging the stackable articles from the receiver system to a transfer system to form stacks of articles on the transfer system; b) determining an attribute of the articles in at least one of the stacks of articles transferred by the receiver system to the transfer system; c) when the attribute of the articles in the at least one of the stacks conforms to a predetermined attribute of the articles, transferring the at least one of the stacks of articles into a gripping device in a first position; d) retaining the at least one stack of articles in the gripping device in the first position; e) repeating steps a), b), c) and d) and thereby retaining multiple stacks of articles in the gripping device; f) transferring the gripping device having the multiple stacks of articles from the first position to a second position; and g) discharging the multiple stacks of articles from the gripping device at the second position.

In one aspect, the method may further comprise repeating steps d) through g) until a predetermined number of stacks are discharged at the second position. In another aspect, c) transferring the at least one of the stacks of articles into a gripping device in a first position comprises: c1) transferring at least some of the stacks of articles to a staging area; and c2) transferring at least some of the stacks of articles from the staging area to the gripping device in the first position. In one aspect, c1) transferring at least some of the stacks of articles to a staging area comprises slidably transferring at least some of the stacks of articles to the staging area along a path.

In another aspect of the invention, the method may further comprise retaining the at least some of the stacks of articles in the staging area. For example, retaining the at least some of the stacks of articles in the staging area may be practiced by supporting at least some of the stacks of articles with a moveable barrier, for example, translating a translating gate or rotating a rotatable gate.

A further embodiment of the invention is a system for processing stackable articles transported on a receiver system, the receiver system adapted to form a predetermined number of stacks of the articles, the system comprising or including: a transfer system adapted to receive the predetermined number of stack of articles transferred from the receiver system; means for determining an attribute of the articles in at least one of the stacks of articles transferred from the receiver system to the transfer system; a transfer device adapted to transfer the articles received by the transfer system when the attribute of the articles in the at least one of the stacks of articles received by the transfer system conforms to the predetermined attribute of the articles; a gripping device in a first position, the gripping device adapted to receive the at least one of the stacks of articles from the transfer system and retain the at least one of the stacks of articles; an automated manipulator adapted to transfer the gripping device having the at least one of the stacks of articles from the first position to a second position; and a mechanism for discharging the at least one of the stacks of articles from the gripping device at the second position.

In one aspect, the system may include a staging area adapted to receive the at least one of the stacks transferred by the transfer device prior to transferring the at least one of the stacks to the gripping device. The transfer system may further comprises a retaining device adapted to retain the at least some of the stacks of articles in the staging area, for example, the retaining device may be a movable retaining device, for instance, a translatable or a rotatable retaining device.

In another aspect, the receiver system may include a plurality of troughs, each of the plurality of troughs of the receiver system having a discharge at an elevation, and wherein the transfer system comprises a plurality of troughs, where each of the plurality of troughs of the transfer system may have a receiving position having an elevation lower than the elevation of the discharge of a mated trough of the plurality of troughs of the receiver system.

In another aspect, the systems disclosed herein may further include a movable barrier adapted to separate, for example, forcibly separate, an article discharged from one of the troughs of the receiver system from a subsequent article in the receiver system. The movable barrier may be a translatable gate or a rotatable gate. The moveable barrier may also be adapted to retain the subsequent article about the outlet or discharge of the trough of the receiver system.

These and other aspects, features, and advantages of this invention will become apparent from the following detailed description of the various aspects of the invention taken in conjunction with the accompanying drawings.

BRIEF DESCRIPTION OF THE DRAWINGS

The subject matter, which is regarded as the invention, is particularly pointed out and distinctly claimed in the claims at the conclusion of this specification. The foregoing features and other features and advantages of the invention will be readily understood from the following detailed description of aspects of the invention taken in conjunction with the accompanying drawings in which:

FIG. 4 is a plan view of one gripping device that may be used in aspects of the present invention.

FIG. 5 is a bottom view of the gripper device shown in FIG. 4 as viewed along view lines 5-5 shown in FIG. 4.

FIG. 6 is a detailed view of the working ends of two adjacent elongated gripper arms shown in FIG. 4 as identified by Detail 6 in FIG. 4 according to one aspect of the invention.

FIG. 7 is a detailed view of a portion of the actuation assembly shown in FIG. 4 as identified by Detail 7 in FIG. 4 according to one aspect of the invention.

FIGS. 15 through 22 illustrate a sequential series of schematic images illustrating one typical operation of the methods and apparatus disclosed herein.

FIG. 25 is a side elevation view of a cradle, a staging, and a shuttle, and their relationship to a receiver (partially shown in FIG. 25) and gripping device (partially shown in FIG. 25), shown in FIGS. 23 and 24 according to aspects of the invention.

FIG. 26 is a top plan view of the cradle, staging, and the shuttle shown in FIG. 25.

FIGS. 28 through 42 illustrate a sequential series of schematic images illustrating another typical operation of the methods and apparatus disclosed herein.

FIG. 46 is a schematic side elevation view of the single transfer of articles shown in FIG. 45 where the predetermined number of articles accumulated in the intermediate position are transferred to a staging area or position according to an aspect of the invention.

FIG. 47 is a schematic side elevation view of the single transfer of articles shown in FIG. 46 where the predetermined number of articles transferred to a staging position are transferred to the second position according to an aspect of the invention.

FIG. 48 is a schematic side elevation view of a system for processing a single set of articles according to another aspect of the invention, wherein aspects of the invent may comprise the processing of one or more sets of articles.

FIG. 49 is a top plan view of the system shown in FIG. 48.

FIG. 50 is detailed view of transfer mechanism shown in FIG. 48 as identified by Detail 48 shown in FIG. 48.

FIG. 51 is a top plan view of the transfer mechanism shown in FIG. 50.

FIG. 52 is a schematic side elevation view, partially in cross section, of one receiver system and one transfer system that may be used for receiver system and transfer system shown in FIGS. 50 and 51 according to an aspect of the invention.

FIG. 53 is a schematic side elevation view, partially in cross section, of the receiver system and the transfer system shown in FIG. 52 illustrating the transfer of articles from a first position to an intermediate position according to an aspect of the invention.

FIGS. 54 and 55 are schematic side elevation views, partially in cross section, of the receiver system and transfer system 930 shown in FIG. 53 illustrating accumulation of a predetermined number N of articles in am intermediate position according to an aspect of the invention.

FIGS. 56 and 57 are schematic side elevation views, partially in cross section, of the receiver system and the transfer system shown in FIG. 55 illustrating the retention of a stack having a predetermined number N of articles in an intermediate position, or staging position, according to an aspect of the invention.

FIGS. 58 and 59 are schematic side elevation views, partially in cross section, of the receiver system and the transfer system shown in FIG. 57 illustrating the transfer of a stack of articles from an intermediate position, or staging position, to the second position according to an aspect of the invention.

FIGS. 60 and 61 are schematic side elevation views, partially in cross section, of the receiver system and the transfer system shown in FIGS. 53 through 59 having a stack separating system, or "gate," according to another aspect of the invention.

FIG. 62 is a side elevation view of one transporter that may be used in the transport device shown in FIGS. 52 through 61 according to one aspect of the invention.

FIG. 63 is a top plan view of the transporter shown in FIG. 62.

FIG. 64 is a left side elevation view of the transporter shown in FIG. 62.

FIG. 65 is a right side elevation view of the transporter shown in FIG. 62.

DETAILED DESCRIPTION OF THE INVENTION

Figure 1:
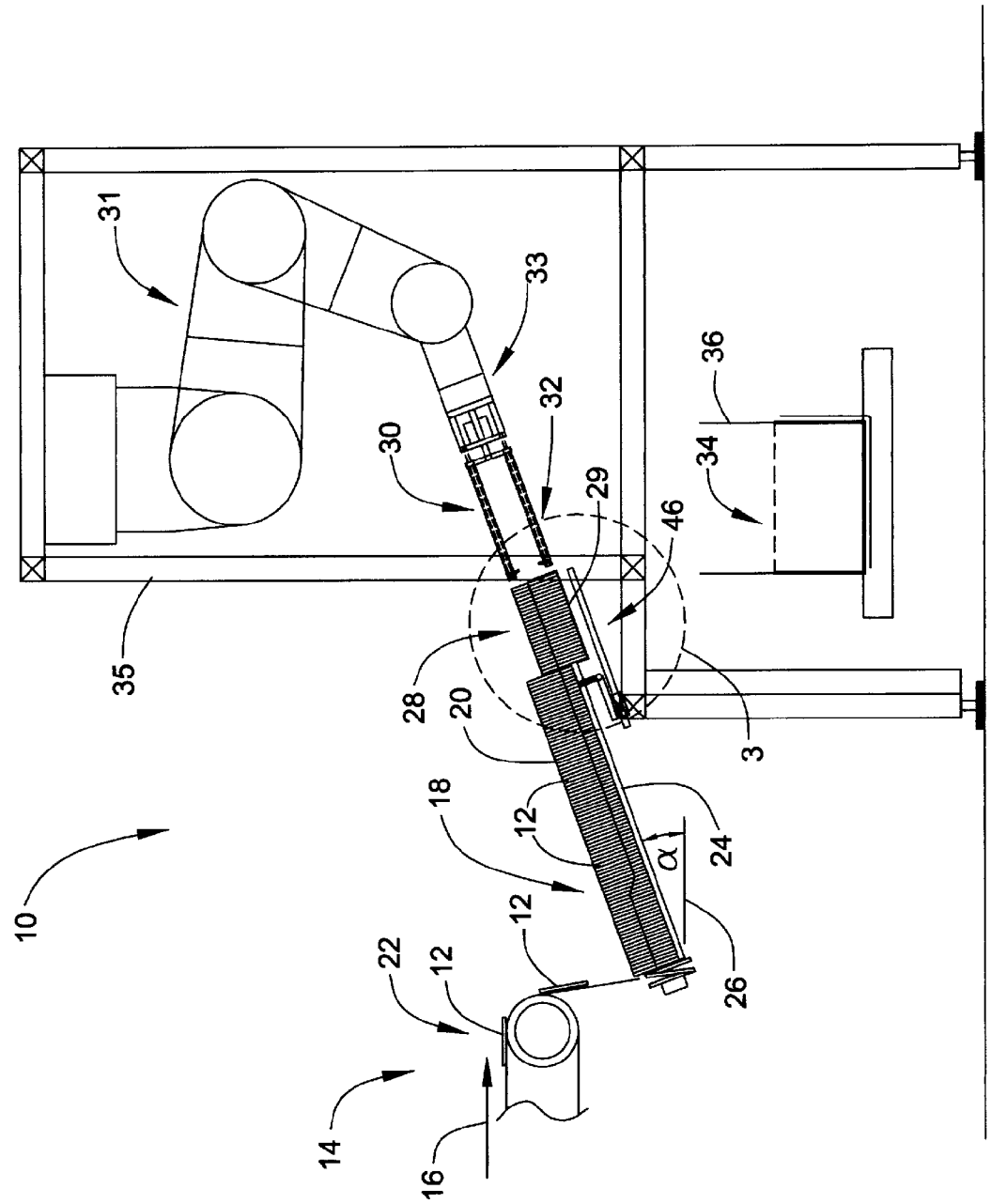
FIG. 1 is a schematic side elevation view of a system for processing articles, for example, stackable articles, according to one aspect of the invention.
Figure 2:
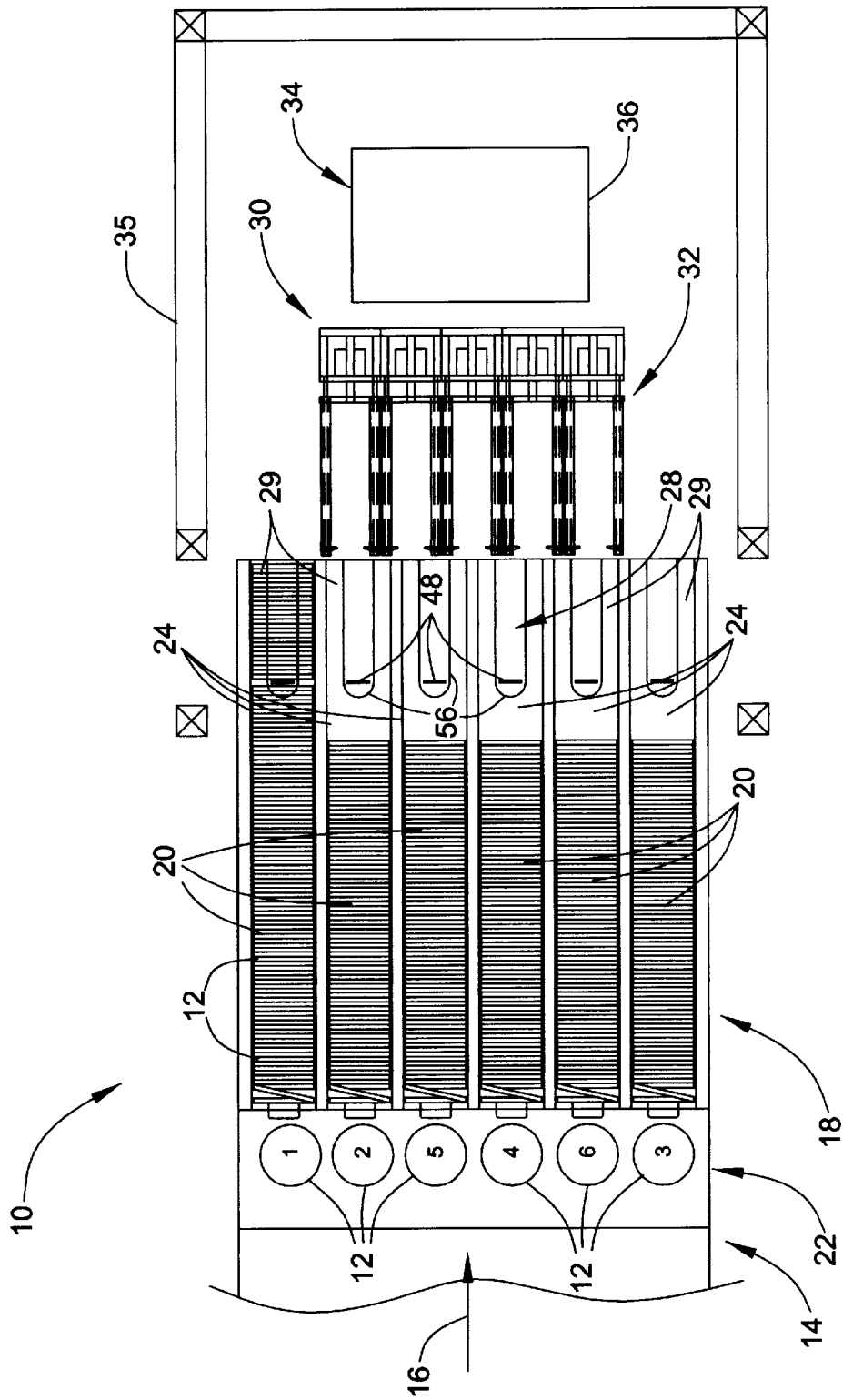
FIG. 2 is a top plan view of the system shown in FIG. 1

The details and scope of aspects of the present invention can best be understood upon review of the attached figures and their following descriptions. FIG. 1 is a schematic side elevation view of a system 10 for processing articles 12, for example, stackable articles, according to one aspect of the invention. FIG. 2 is a top plan view of the system 10 shown in FIG. 1. As shown in FIGS. 1 and 2, aspects of the invention include a gripping device 30 adapted to receive articles 12 from a receiver or receiver system or 18 when gripping device 30 is positioned in a first position 32. The gripping device 30 is then transferred to a second position 34, for example, where a container 36 is located, and then the articles are discharged from the gripping device 30 in the second position 34, for example, into the container 36. (In FIG. 2 second position, 34 and container 36 are shown displaced from their positions shown in FIG. 1 for ease of illustration.) Typically, the transfer of articles 12 to second position 34 is effected substantially continuously, for example, without significant interruption. After discharge of articles 12 in the second position 34, articles 12, for example, hamburgers, may be further handled, for instance, transferred to storage or to shipping.

Articles 12 may, for example, be a plurality of frozen hamburgers, bagels, waffles, chicken breasts, compact disks, and the like. In one aspect, article 12 may be a food item, that is, an article meant ultimately for human or animal consumption. However, articles 12 may also be non-food items. According to aspects of the invention, the gripping device 30 is adapted to execute the desired function while articles 12, for example, rows of article, are substantially continuously introduced to receiver 18, for example, from conveyor 14.

Articles 12 may typically be provided on a conveyor 14, for example, a conveyor traveling in the direction of arrow 16. Only a representative portion of conveyor 14 from which articles 12 are discharged is shown in FIGS. 1 and 2. In one aspect, articles 12 are "stackable" articles, that is, the articles 12 can be laid one on top of the other to form a generally vertically column 20 of articles 12. It is to be understood that, in some aspects, the number of articles 12 that may be "stacked" may be limited by the shape of the article. For example, frozen chicken breasts may have a limited capability to be "stacked" one on top of the other, but can still be handled by aspects of the invention.

In the following discussion, articles 12 will be referred to as "hamburgers 12," for example, frozen hamburgers, in order to facilitate the discussion of aspects of the invention. However, it will be understood that aspects of the invention are not limited to "frozen hamburgers," but articles 12 may be any form of food or non-food item that may be handled by aspects of the present invention.

As shown most clearly in FIG. 1, gripping device 30 may typically be mounted to an automated manipulator 31, for example, robotic manipulator. For example, as is typical in the art, automated manipulator 31 may typically have an "arm end" 33 adapted to engage gripping device 30 and interface with gripping device 30, for example, providing appropriate power, operation, and control of gripping device 30, for instance, electronic, pneumatic, hydraulic, and/or mechanical interfaces with gripping device 30. Automated manipulator 31 may typically be mounted to a structure 35, for example, a frame, support structure, or superstructure appropriately designed to withstand the weight and operation of automated manipulator 31, gripping device 30, and hamburgers 12. Structure 35 may also be adapted to support one or more other devices in system 10, for example, adapted to support two or more automated manipulators 31, and/or one or more conveyors 14 and/or one or more receivers 18.

As shown in FIGS. 1 and 2, conveyor 14 is adapted to discharge hamburgers 12 to a receiver 18 to form one or more stacks 20 of hamburgers 12. In FIGS. 1 and 2, conveyor 14 is shown as a conventional belt conveyor, for example, for ease of illustration; however, according to aspects of the invention, conveyor 14 may be a belt conveyor or any other type of conveyor adapted to introduce hamburgers 12 to receiver 18. In one aspect, conveyor 14 may comprise a belt conveyor provided by RMF Steel Products Company of Grandview, Mo., or its equivalent. In another aspect, conveyor 14 may not be a moving conveyor, for example, conveyor 14 may be a chute, a slide, a hopper, or any other stationary means of introducing hamburgers 12 to receiver 18. Conveyor 14 may typically be a conveyor adapted to transfer hamburgers 12 at a rate of between about 100 articles per minute to about 2,000 articles per minute, for example, between about 800 articles per minute to about 1,000 articles per minute.

In one aspect of the invention, as shown most clearly in FIG. 2, conveyor 14 may transport hamburgers 12 in rows 22, typically multiple successive rows 22. Conveyor 14 may typically transport a predetermined number of rows 22 of hamburgers 12, for example, in the aspect shown in FIG. 2, conveyor 14 transports 6 rows of hamburgers 12, where "6" comprises a "predetermined number" of rows in this aspect. According to aspects of the invention, the predetermined number of rows 22 may vary from 1 to 24 rows 422, but is typically, between about 3 and 12, for example, 4, 5, or 6 rows 22 of hamburgers 12.

According to aspects of the invention, hamburgers 12 are introduced to receiver 18 and receiver 18 is adapted to receive hamburgers 12 and produce stacks or columns 20 of hamburgers 12 on receiver 18, for example, in a series of cavities or troughs 24. Troughs 24 are typically shaped to receive the shape of articles 12 introduced to receiver 18, for example, when articles 12 comprise frozen circular cylindrical hamburgers, troughs 24 may have an angled or v-shaped sides adapted to minimize friction between the hamburgers 12 and troughs 24 as the hamburgers 12 accumulate and translate along troughs 24. According to aspects of the invention, the shape of troughs 24 may vary depending upon the shape of the article being handled by system 10. In one aspect, the troughs 24 may be arcuate, circular, or semicircular; in another aspect, troughs 24 may by polygonal or ellipsoidal.

The stacks or columns 20 produced on receiver or receiver system 18 may be oriented in a broad range of directions; for example, stacks 20 may be substantially vertical stacks or stacks 20 may be substantially horizontal stacks. In one aspect, as shown most clearly in FIG. 1, the troughs 24 in which stacks 20 are received may be inclined from the horizontal, for example, inclined from the horizontal (indicated by phantom line 26) by an inclination angle $\alpha$. The inclination angle $\alpha$ may range from about 0 degrees to about 45 degrees, but is typically, between about 10 degrees and about 30 degrees, for instance, about 20 degrees.

According to aspects of the invention, receiver or receiver system 18 may comprise any conventional receiver 18 adapted to receive hamburgers 12 from a conveyor 14. However, in one aspect of the invention, receiver 18 may comprise a receiver provided by RVIF Steel Products Company, or its equivalent. For example, in one aspect, receiver 18 may comprise an RMF "Patty Stacker" or its equivalent. The brochure entitled "RMF Patty Stacker" is incorporated by reference herein.

According to one aspect of the invention, hamburgers 12 may be transferred from receiver 18 directly to gripping device 30. That is, in one aspect, one or more stacks 20 of hamburgers 12 in troughs 24 of receiver 18 may be transferred by appropriate means, for example, by a pneumatically-driven or hydraulically-driven piston, from one or more troughs 24 in receiver 18 directly into the receiving portion of gripping device 30. However, in another aspect, hamburgers 12 may first be transferred to one or more "staging" or "buffer" locations or areas, or transfer systems, 28 prior to being introduced to gripping device 30. The use of 1 or more staging or buffer areas 28 in one aspect enhances the flexibility and operability of aspects of the invention while minimizing miss-feeds or other undesirable complications.

As shown most clearly in FIG. 1, system 10 may include a staging area or position 28 adapted to receive hamburgers 12. In one aspect, staging area 28 may comprise an end portion of receiver 18; for example, staging area 28 may comprise the ends of the one or more troughs 24 of receiver 18. In another aspect, staging area 28 may comprise an extension or an addition to the troughs 24 of receiver 18. In one aspect, as shown most clearly in FIG. 1, staging area 28 may comprise one or more troughs 29 displaced from troughs 24, for example, whereby hamburgers 12 are discharged at one elevation from troughs 24 and received at another, typically lower, elevation, for example, under the force of gravity, in one or more troughs 29. According to aspects of the invention, staging area 28 provides a position whereby hamburgers 12 can accumulate and be positioned for transfer into gripping device 30.

Figure 3:
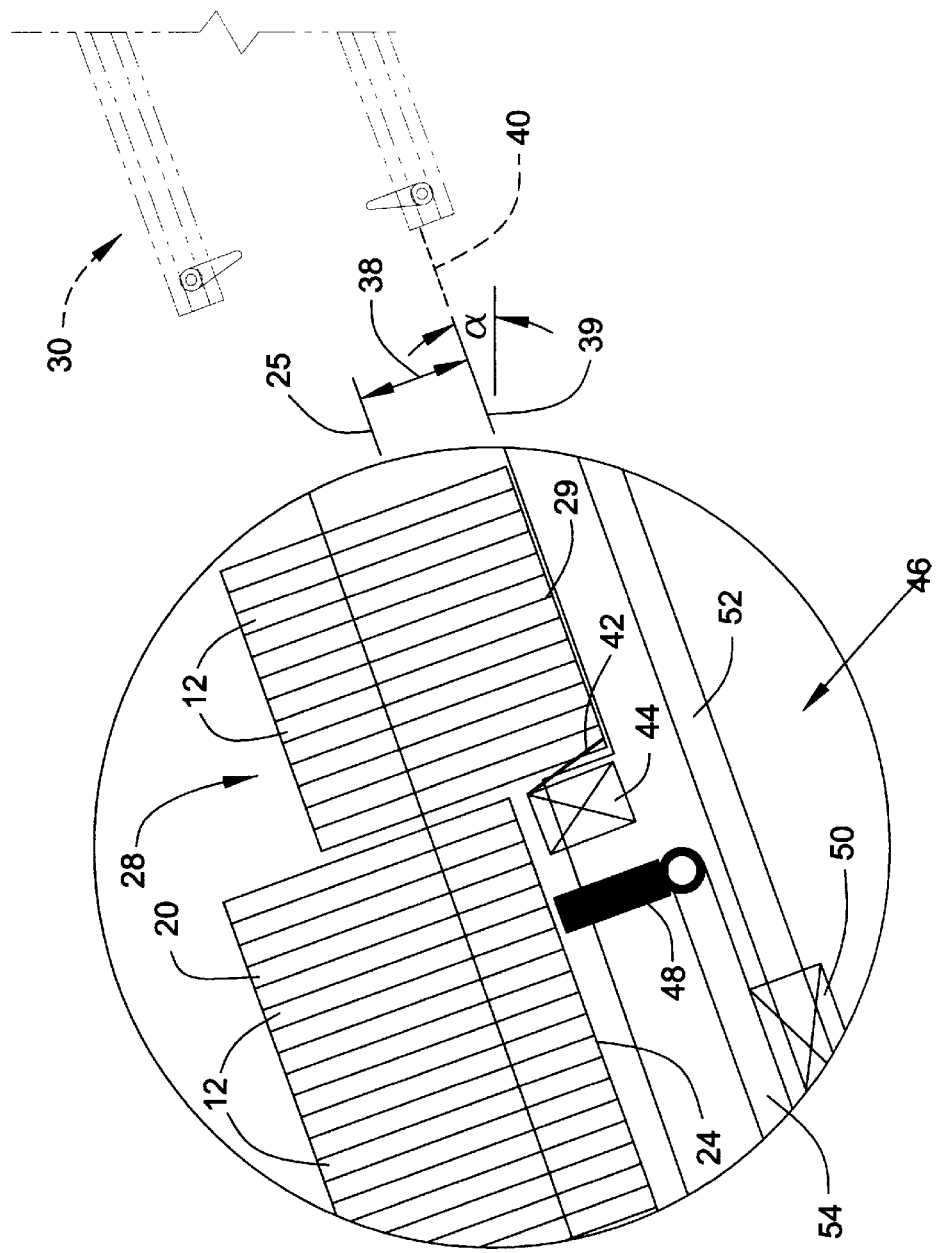
FIG. 3 is a detailed view of the staging area shown in FIG. 1 as identified by Detail 3 in FIG. 1 according to one aspect of the invention.

FIG. 3 is a detailed view of the staging area or position 28 shown in FIG. 1 as identified by Detail 3 in FIG. 1 according to one aspect of the invention. As shown in FIG. 3, in this aspect, staging area 28 includes one or more troughs 29 positioned below one or more troughs 24 of receiver 18. For example, in one aspect, troughs 29 may be displaced a distance 38 from troughs 24. Specifically, in one aspect, the elevation of the working surface 39 of troughs 29 may be displaced, for example, vertically displaced in a plane substantially perpendicular to the plane defined by the angle α, from the elevation of the working surface 25 of troughs 24. In one aspect, the distance 38 may range from about 0 inches, that is, troughs 29 may be co-linear or line-to-line with troughs 24, to about 6 inches, for example, depending upon the size and the nature of articles 12. In one aspect, when articles 12 comprise hamburgers, distance 38 may range from 0 to 3 inches, for example, about 1 inch.

According to one aspect of the invention, the elevation of working surface 39 of troughs 29 of staging area 28 may be substantially collinear with the elevation of the working surface 40 (shown in phantom in FIG. 3) of gripper device 30 (shown in phantom). That is, in one aspect, staging area 28 may be adapted to align the hamburgers 12 for proper insertion and/or acceptance in gripping device 30.

As also shown in FIG. 3, staging area 28 may also be adapted to detect, count, or otherwise measure the presence of hamburgers 12 introduced to staging area 28, and then the hamburgers are transferred when the hamburgers 12 in staging area 28 conform to a predetermined attribute. In one aspect, and in any aspect of disclosed herein, an attribute of the hamburgers 12 may be detected and compared to a predetermined attribute of the hamburgers 12. For example, an attribute may be the number of hamburgers 12, the weight of hamburgers 12, and/or the over-all length of the hamburgers 12, among other attributes that may be detected. For example, as shown in FIG. 3, staging area 28 may include a sensor 44 adapted to detect the presence of hamburgers 12. In one aspect, sensor 44 may include a switch 42, for example, a lever switch, adapted to deflect under load, for example, under the dynamic load of incoming hamburgers 12 from troughs 24, where sensor 44 is adapted to detect or count the number of hamburgers 12 based upon the deflection of switch 42. According to aspects of this invention, and of any invention disclosed herein, an attribute of a stack of hamburgers may "conform" to a predetermined attribute by substantially equaling the predetermined attribute, for example, equaling a predetermined number of hamburgers 12, or equally or exceeding a predetermined attribute, for example, equaling or exceeding a predetermined weight or overall length of hamburgers 12.

As also shown in FIG. 3 (and shown in FIG. 1), staging area or position 28 may typically include one or more transfer devices 46, that is, one or more devices adapted to transfer hamburgers 12 from staging area 28, for example, to gripping device 30. Though any conventional transfer device adapted to transfer hamburgers may be used according to aspects of the invention, in the aspect shown in FIG. 3, transfer device 46 comprises one or more actuators, for example, one or more linear actuators, liner displacement transducers, and the like, for instance, an actuator referred to as a "cross pusher" in the art. Transfer device 46 may be hydraulically driven, pneumatically driven, electrically driven and/or mechanically driven. As shown in FIG. 3, transfer device 46 may typically include a pawl 48 positioned to engage hamburgers 12 and mounted to a housing 50 mounted to translate along rail or rod 52. In one aspect, pawl 48 may be pivotally mounted to a bar or rod 54 which is mounted to housing 50. The function of the pivotal mounting of pawl 48 will be apparent from the description of its operation below.

As shown most clearly in FIG. 2, in one aspect, transfer device 46 (more specifically the pawl 48 of transfer device 46) may access hamburgers 12 through openings 56 in troughs 29 of staging area 28. For example, as shown, pawls 48 of transfer device 46 may extend through openings 56 to engage hamburgers 12. In one aspect, each opening 56 may comprise an elongated slot have a closed end, for example, a radiused closed end, and an opposite open end, for example, adapted to permit passage of pawl 48, for example, in transit to gripper device 30.

FIG. 4 is a plan view of one gripping device 30 that may be used in aspects of the present invention. FIG. 5 is a bottom view of the gripper device shown in FIG. 4 as viewed along view lines 5-5 shown in FIG. 4. As shown, the gripping device 30 may comprise one or more, but typically, a plurality of, gripper mechanisms 60 and one or more gripper actuation assemblies 62. According to aspects of the invention, gripping device 30 may include one or more gripper mechanisms 60, for example, 3 or more gripper mechanisms, or 5 or more gripper mechanisms; for instance, depending upon the number and arrangement of hamburgers 12 intended to be handled by gripping device 30. Representative hamburgers 12 appear (in phantom) in the upper most gripper mechanism 60 illustrating a typical retention of hamburgers 12 in gripper mechanism 60.

As shown in FIGS. 4 and 5, each gripper mechanism 60 includes at least three (3), but typically, at least four (4) elongated gripper arms 64 having pivotally mounted levers or pawls 66. As shown most clearly in FIG. 5, elongated gripper arms 64 may typically be equally spaced about gripper mechanism 60, for example, equally spaced about an article retaining space 61 adapted to receive hamburgers 12. As shown in FIG. 4, elongated gripper arms 64 may be mounted to the one or more actuation assemblies 62, for example, rigidly mounted, for instance by mechanical fasteners or welding. The actuation assembly 62 may typically be adapted to mount to an automated manipulator, such as, to automated manipulator 31 shown in FIG. 1, for instance via arm end 33.

FIG. 6 is a detailed view of the working ends of two adjacent elongated gripper arms 64 shown in FIG. 4 as identified by Detail 6 in FIG. 4 according to one aspect of the invention. As shown in FIG. 6, in this aspect, gripper arms 64 may comprise elongated rods, bars, or tubes 68 having an elongated internal passage or opening 70. Passage or opening 70 may typically be elongated in the direction of elongation of rod, bar, or tube 68. According to one aspect, passage 70 is adapted to receive an elongated rod 72 and adapted to allow rod 72 to translate axially, for example, reciprocate in a direction of elongation of tubes 68 as indicated by double arrows 74. As shown, gripper arms 64 include levers or pawls 66 which may be pivotally mounted to elongated tubes 68, for example, by means of pin 76, for example, pin 76 mounted for rotation in tubes 68. According to aspects of the invention, the elongated rod 72 is also mounted to pawl 66, for example, pivotally mounted, for instance, eccentrically pivotally mounted, to pawl 66 by pin 76, wherein the axial deflection of rod 72 causes the rotation of pawl 66, as indicated by curved arrows 67, wherein pawl 66 may engage and disengage hamburgers 12 (shown in phantom in FIG. 6). In one aspect, pawl 66 may comprise a camming surface wherein the axial deflection of rod 72 causes the camming surface of pawl 66 to contact an adjacent surface and deflect pawl 66 into engagement with hamburgers 12. As shown in FIG. 6, in one aspect, the camming surface of pawl 66 may engage one or more camming pins 77 mounted in tubes 68 and positioned to contact the camming surface of pawl 66 whereby pawl 66 rotates into engagement with hamburgers 12. Another camming mechanism that may be used to deflect pawl 66 according to an aspect of the invention is disclosed in US Patent Application Publication 2012/0216490, which is included by reference herein.

FIG. 7 is a detailed view of a portion of the actuation assembly 62 shown in FIG. 4 as identified by Detail 7 in FIG. 4 according to one aspect of the invention. As shown in FIG. 7, actuation assembly 62 includes a housing 80 which may typically mounted to automated manipulator 31 (see, for example, FIG. 1, but not shown in FIG. 7), for example, by conventional means, for instance, by mechanical fasteners. Housing 80 may typically include one or more actuators 82 adapted to couple and engage one or more rods 72 of elongated gripper arms 64 (shown in FIG. 6). Actuators 82 in housing 80 may comprise conventional actuators, for example, pneumatic, hydraulic, mechanical, and/or electrical actuators. In one aspect, as shown in FIG. 7, actuators 82 may comprise one or more pneumatic actuators each having a piston 84 mounted for displacement in a piston housing 86 and actuated by one or more pneumatic lines 88. In one aspect, one or more piston housings 86 may be in fluid communication with one or more pneumatic lines 88. Pneumatic lines 88 may comprise one or more conduits in communication with a pneumatic controller or valve assembly mounted in or associated with automated manipulator 31. The one or more pistons 84 may be coupled, for example, mounted directly to, an actuation plate 90 which may be coupled to rods 72 of elongated gripper arms 64. For example, as shown in FIG. 7, the one or more tubes 68 of elongated gripper arms 74 may be mounted to housing 80, for example, by mechanical fasteners, and the one or more rods 72 of gripper arms 64 may pass through at least a portion of housing 80 and mount to actuation plate 90 whereby the deflection of actuation plate 90 thereby deflects rods 72 as indicated by double arrow 74 in both FIGS. 6 and 7. According to aspects of the invention, with the actuation of actuators 82, for example, via pneumatic pressure applied to one or more pneumatic lines 88 and pistons 84, actuation plate 90 and rods 72 may move in substantial unison (as shown by double arrow 92 in FIG. 7) relative to housing 80, actuators 82, and tubes 68 to effect the deflection of rods 72 and pawls 66 to engage and disengage hamburgers 12 in gripping device 60.

According to one aspect of the invention, gripping device 60 is adapted to receive hamburgers 12 from receiver or receiver system 18 (see FIGS. 1 and 2) at a first predetermined spacing and deliver hamburgers 12 to the second position 34, for example, into container 36, in a second predetermined spacing, for example, different from the first predetermined spacing. For example, in one aspect of the invention, receiver 18 may provide hamburgers 12 with a first horizontal spacing; for example, about 4.25 inches centerline-to-centerline of hamburgers 12, where the second desired spacing in container 36 may be about 4.00 inches centerline-to-centerline. According to aspects of the invention, this desired change in spacing between hamburgers 12 in receiver 18 and the spacing of hamburgers 12 in second position 34 may be provided by multiple means.

Figure 8:
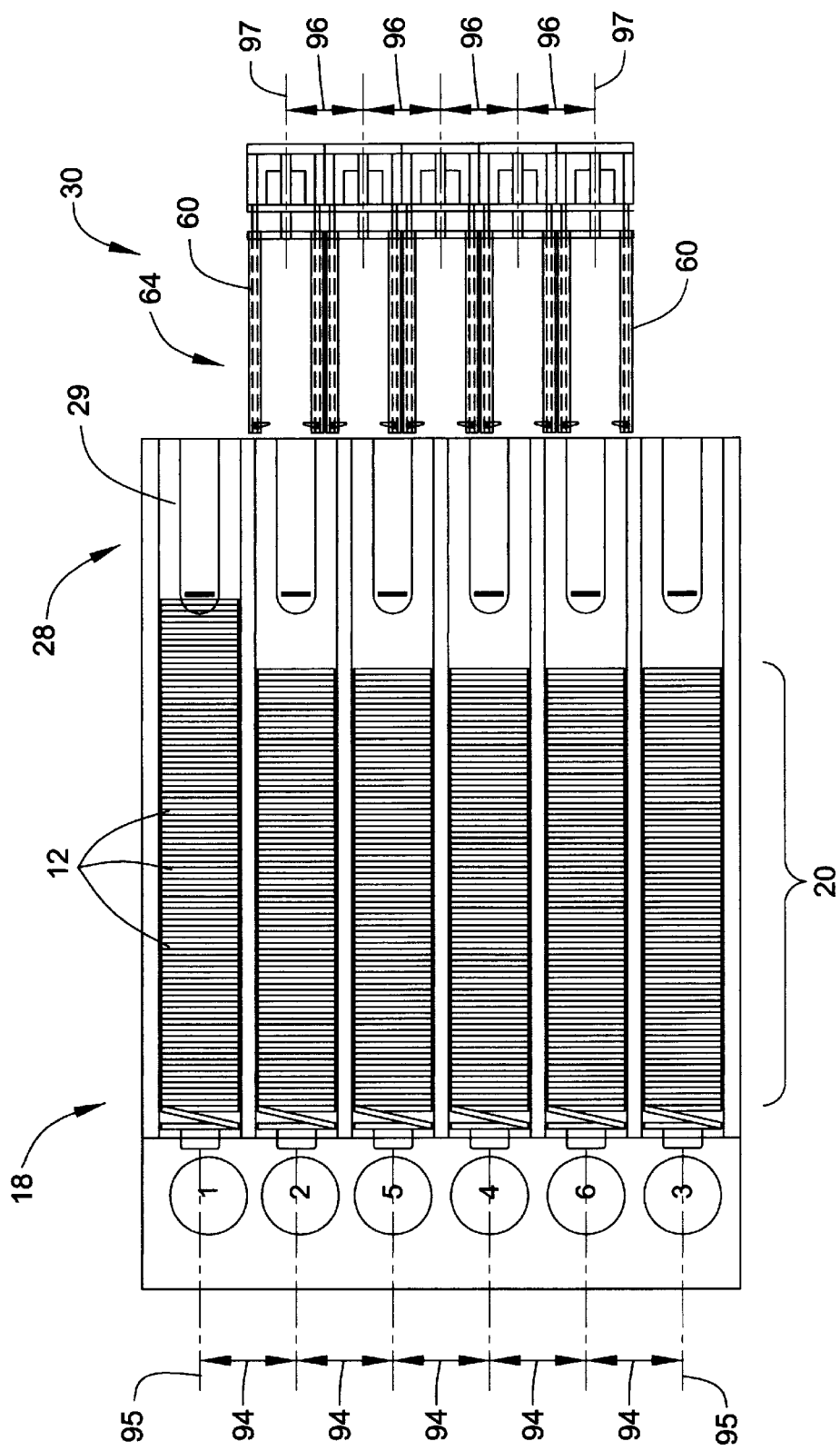
FIG. 8 is a top plan view of a receiver and a gripping device according to one aspect of the invention.
Figure 9:
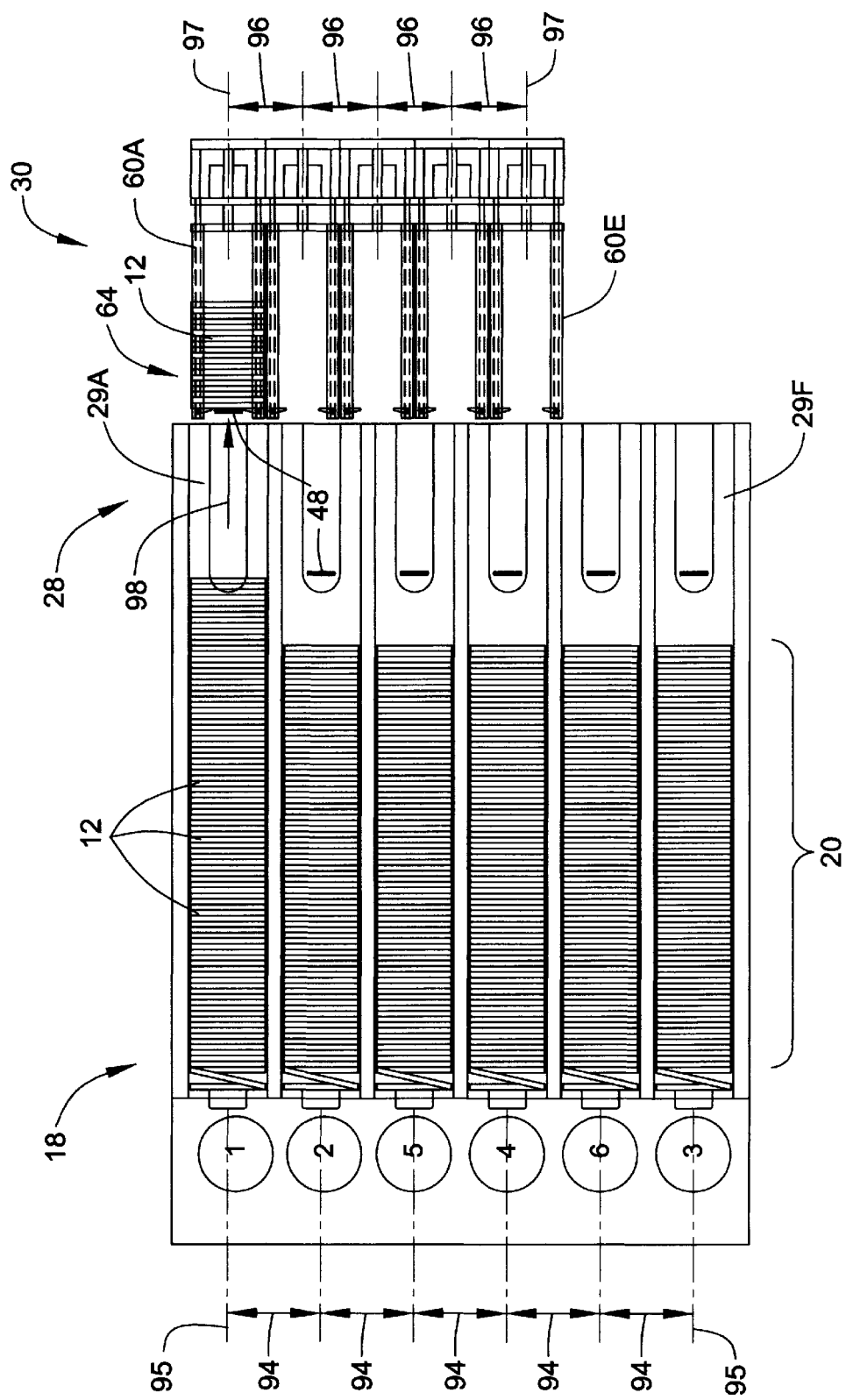
FIG. 9 is top plan view of the receiver and the gripping device shown in FIG. 8 upon alignment according to one aspect of the invention.
Figure 10:
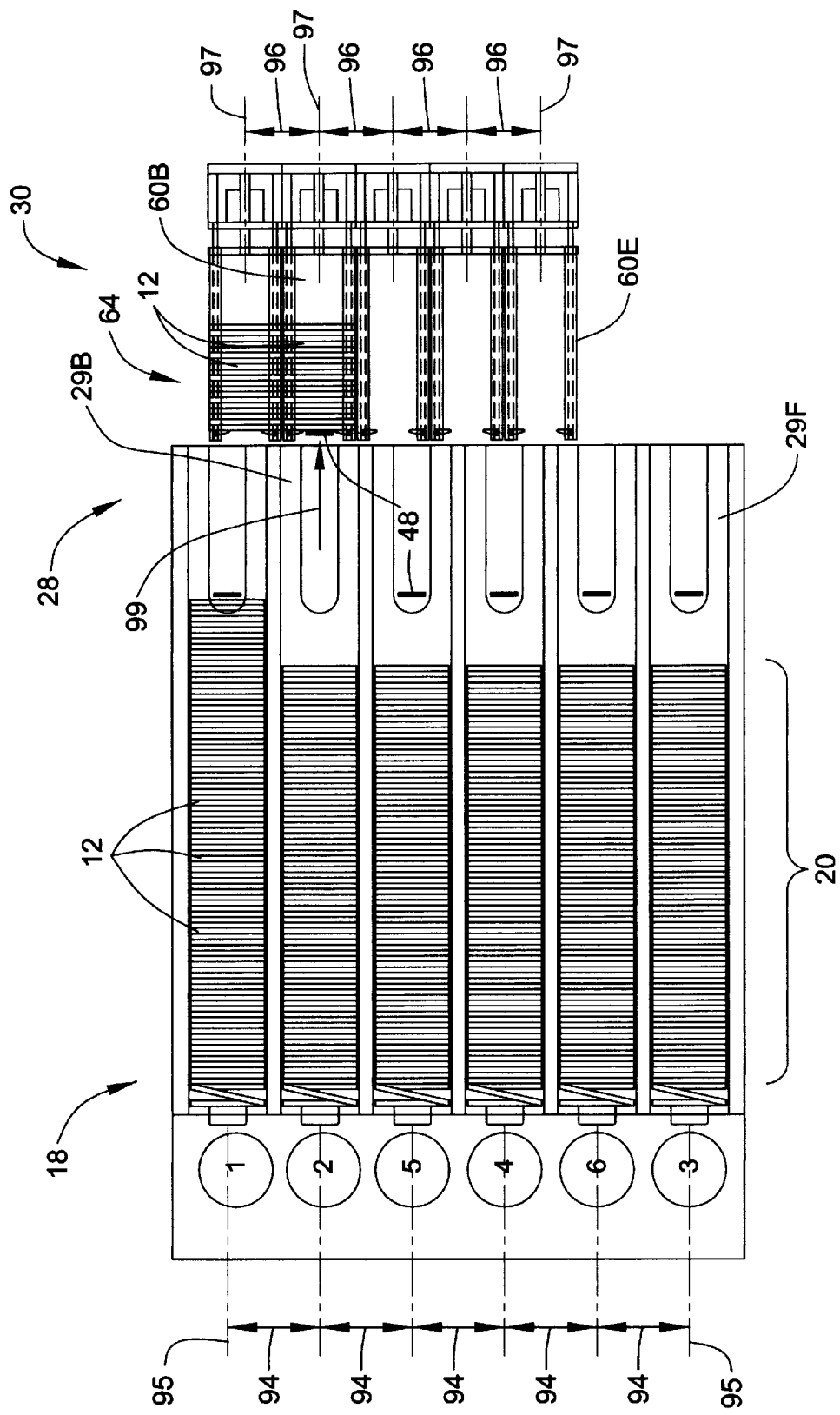
FIG. 10 is top plan view of the receiver and the gripping device shown in FIG. 9 upon subsequent alignment according to another aspect of the invention.

FIGS. 8 through 10 illustrate one method of varying the spacing between hamburgers 12 in receiver 18 and the spacing of hamburgers 12 delivered to second position 34 according to one aspect of the invention. According to aspects of the invention, the method and apparatus shown and described in FIGS. 8 through 10 may be referred to as the "fixed tool" method. In contrast, the method and apparatus shown and described with respect to FIGS. 11 through 14 may be referred to as the "collapsible tool" method.

FIG. 8 is a top plan view of a receiver 18 and a gripping device 30 according to one aspect of the invention. As shown in FIG. 8, according to one aspect, receiver 18 may provide hamburgers 12 in multiple stacks or columns 20 in troughs 24 where each of the stacks 20 are spaced at a predetermined spacing 94. For example, stacks 20 in troughs 24 may have equally spaced centerlines 95 at spacing 94, though the spacing 94 may not be equally spaced, but may vary between stacks 20. In addition, the gripping mechanism 60 of gripping device 30 shown in FIG. 8 may accept hamburgers 12 in multiple stacks or columns (not shown) where each of the stacks received by gripping device 30 are spaced at a predetermined spacing 96, for example, different from spacing 94. For example, the stacks (not shown) in each gripping mechanism 60 of gripping device 30 may have equally spaced centerlines 97 at spacing 96, though the spacing 96 may also not be equally spaced, but may vary between stacks. According to this aspect of the invention, gripping device 30 is movable or translatable, where gripping device 30 may be moved, for example, by automated manipulator 31, to align with the troughs 24 of receiver 18 or with the troughs 29 of staging area 28 and with the gripping mechanisms 60 of gripping device 30, that is, where the centerlines 97 of at least one of the gripping mechanisms 60 in gripping device 30 substantially aligns with the centerline 94 of at least one of the stacks 20 in receiver 18 and/or staging area 28.

FIG. 9 is top plan view of receiver 18 and gripping device 30 shown in FIG. 8 upon alignment according to one aspect of the invention. As shown in FIG. 9, in this aspect, gripping device 30 is moved, for example, with automated manipulator 31, to align the centerline 97 of gripping mechanism 60A (where the gripping mechanisms 60 in gripping device 30 are designated "60A, 60B, etc." for ease of illustration) with the centerline 95 of stack 20 or the centerline of trough 29A (where the troughs 29 of staging area 28 are designated "29A, 29B, etc." for ease of illustration). According to this aspect, after alignment, the hamburgers in trough 29A of staging 28 may be transferred to gripping mechanism 60A, as indicated by arrow 98. For example, as shown in FIG. 9, the hamburgers 12 in trough 29A may be transferred by a transfer device 46 (see FIG. 3) having pawl 48.

FIG. 10 is top plan view of receiver 18 and a gripping device 30 shown in FIG. 9 upon subsequent alignment according to another aspect of the invention. As shown in FIG. 10, gripping device 30 may then be moved to align the centerline 97 of gripping mechanism 60B (or any other gripping mechanism 60C, 60D, etc.) with the centerline 95 of trough 29B (or any other trough 29C, 29D, etc.). According to this aspect, after alignment, the hamburgers in trough 29B of staging 28 may be transferred to gripping mechanism 60B, as indicated by arrow 99. For example, again, as shown in FIG. 10, the hamburgers 12 in trough 29B may be transferred by a transfer device 46 (see FIG. 3) having pawl 48.

According to one aspect of the invention, the procedure illustrated and described with respect to FIGS. 8 through 10 may be repeated until the desired stacks of hamburgers 12 are received by gripping device 30. Accordingly, the gripping device 30 may receive one or more stacks of hamburgers 12, for example, one or more stacks that may be sufficient to provide each of the gripping mechanisms 60 of gripping device 30 with hamburgers 12. In one aspect, gripping device 30 may include one or more gripping mechanisms 60, but as shown in FIGS. 8 through 10, may typically have 4 to 8 gripping mechanisms 60, in this case 5 gripping mechanisms 60.

FIGS. 11 through 14 illustrate another method of varying the spacing between hamburgers 12 in receiver 18 and/or staging area or position 28 with the spacing of hamburgers 12 delivered to second position 34 (see FIGS. 1 and 2) according to another aspect of the invention. In contrast to the method and apparatus shown and described with respect to FIG. 8 through 10, the method and apparatus described with respect to FIGS. 11 through 14 may be referred to as the "collapsible tool" method.

Figure 11:
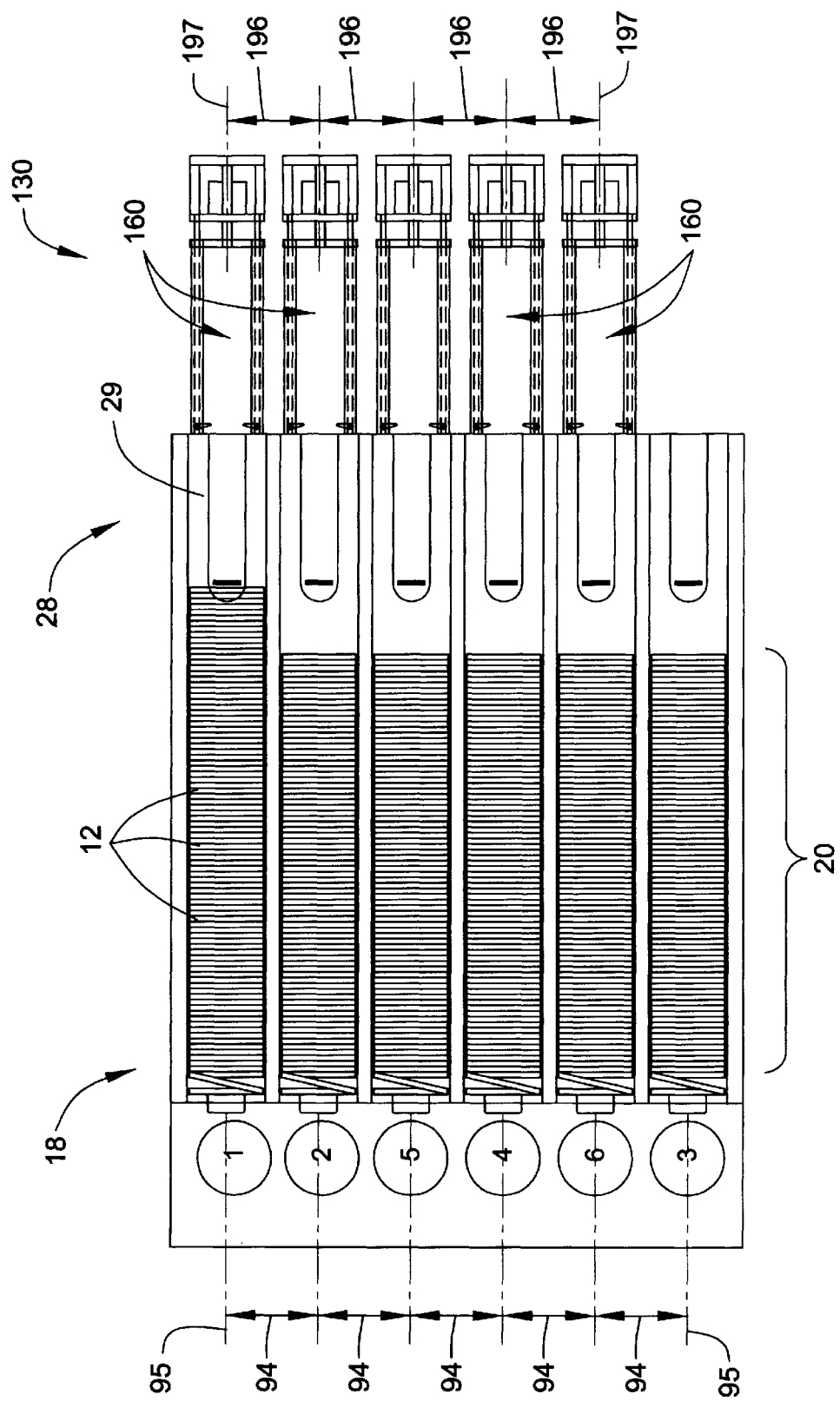
FIG. 11 is a top plan view of a receiver and a gripping device having a gripping mechanism according to another aspect of the invention.

FIG. 11 is a top plan view of a receiver 18 and a gripping device 130 having a gripping mechanism 160 according to another aspect of the invention. As shown in FIG. 11, according to one aspect, receiver 18 and/or staging area 28 may provide hamburgers 12 in multiple stacks or columns 20 where each of the stacks 20 are spaced at a predetermined spacing 94. For example, stacks 20 may have equally spaced centerlines 95 at spacing 94, though the spacing 94 may not be equally spaced, but may vary between stacks. In addition, the gripping mechanism 160 of gripping device 130 shown in FIG. 11 may accept hamburgers 12 in multiple stacks or columns (not shown) where each of the stacks received by gripping device 130 are spaced at a predetermined spacing 196, for example, different from spacing 94. For example, the stacks (not shown) in each gripping mechanism 160 of gripping device 130 may have equally spaced centerlines 197 at spacing 196, though the spacing 196 may also not be equally spaced, but may vary between gripping mechanisms 160. According to this aspect of the invention, the gripping mechanisms 160 of gripping device 130 are movable or translatable with respect to each other where one ore more gripping mechanism 160 may be moved, for example, individually or collectively moved, to align with the troughs 24 of receiver 18 or troughs 29 of staging area 28, that is, where the centerlines 197 of at least one of the gripping mechanisms 160 in gripping device 130 substantially align with the centerline 94 of at least one of the stacks 20 in receiver 18 and/or staging area 28. In one aspect of the invention, the relative movement of gripping mechanisms 160 may be referred to as "collapsing" the gripping mechanisms 160.

Figure 12:
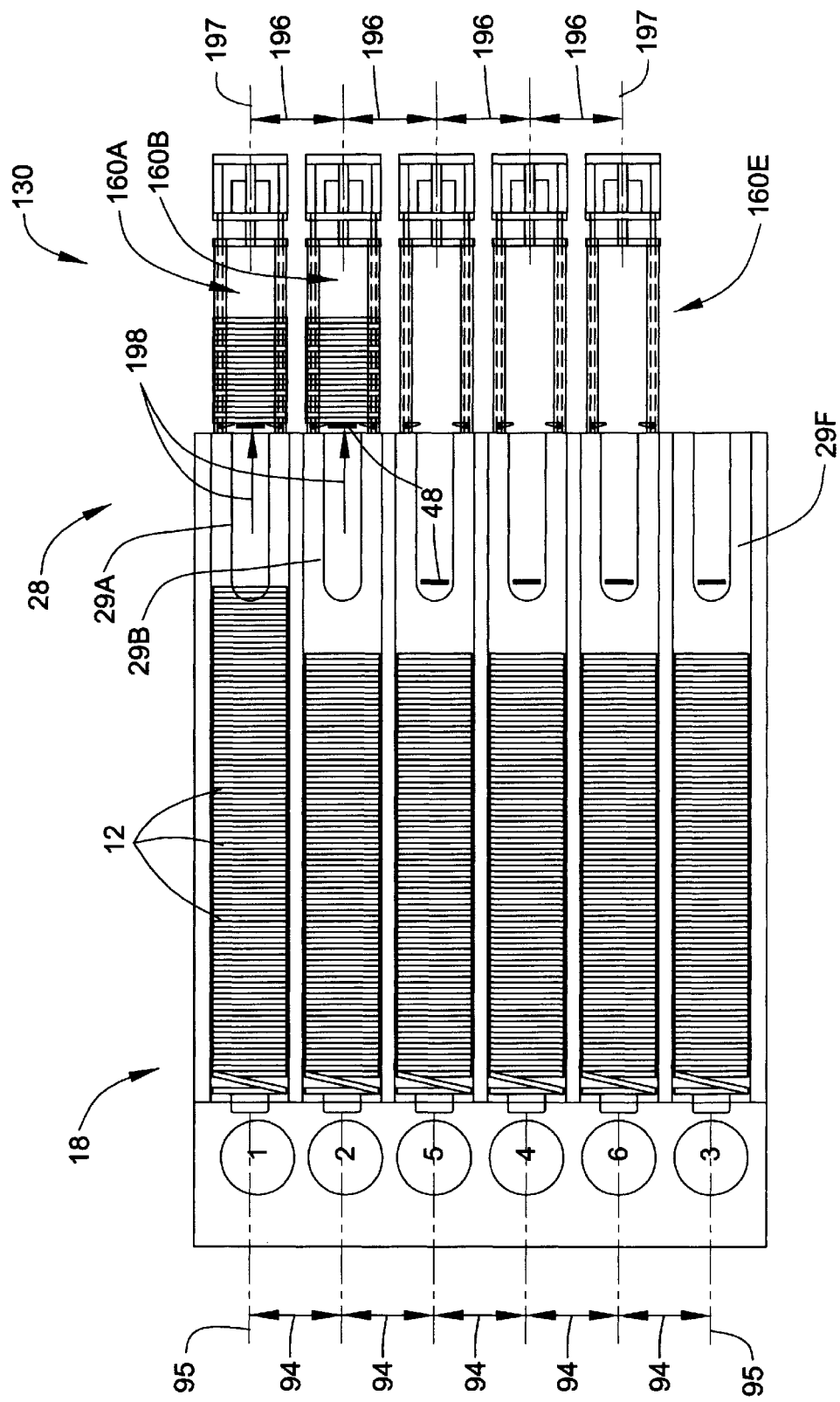
FIG. 12 is a top plan view of the receiver and the gripping device shown in FIG. 11 upon alignment according to one aspect of the invention.

FIG. 12 is top plan view of receiver 18 and a gripping device 130 having gripping mechanisms 160 shown in FIG. 11 upon alignment with troughs 29A, 29B, 29C, etc. of staging area or position 28 according to one aspect of the invention. As shown in FIG. 12, in this aspect, the gripping mechanisms 160A, 160B, etc. (Where the gripping mechanisms 160 in gripping device 130 are designated "160A, 160B, etc." for ease of illustration) are movable or translatable where the centerlines 197 of gripping mechanisms 160A, 160B, etc. May be moved and, for example, individually, aligned with the centerlines 95 of troughs 29A, 29B, etc. (where the troughs 29 of staging area 28 are designated "29A, 29B, etc." for ease of illustration). According to this aspect, with the individual alignment of gripping mechanisms 160A, 160B, etc. with troughs 29A, 29B, etc. the hamburgers in troughs 29A, 29B, etc. of staging area 28 may be individually or collectively transferred to gripping device 130, as indicated by arrows 198. For example, as shown in FIG. 12, the hamburgers 12 in trough 29A and 29B may be transferred individually or together by transfer devices 46 (see FIG. 3) each having a pawl 48.

Figure 13:
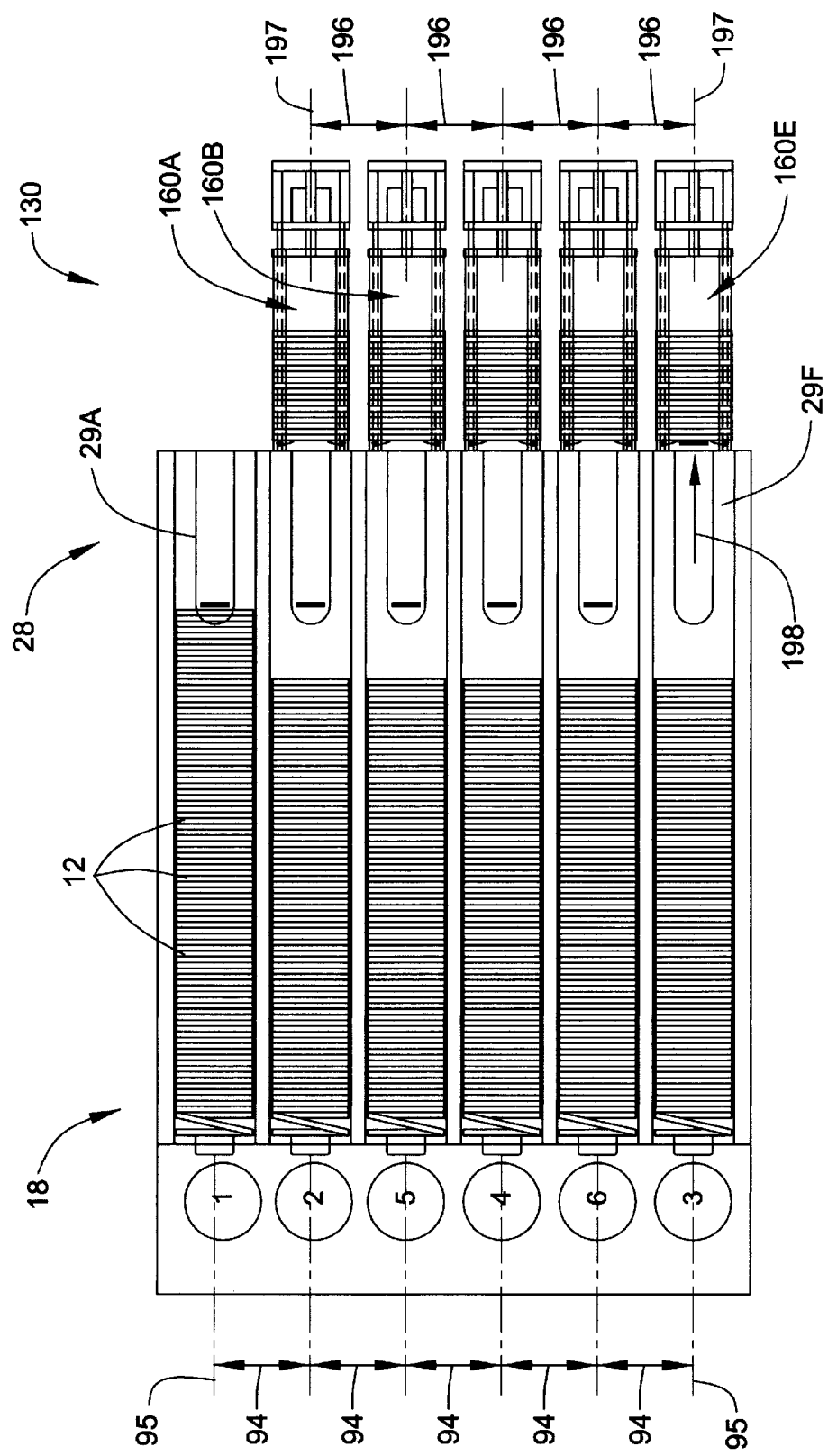
FIG. 13 is a top plan view of the receiver and the gripping device shown in FIG. 12 upon subsequent alignment according to one aspect of the invention.

FIG. 13 is top plan view of receiver 18 and a gripping device 130 having gripping mechanisms 160 shown in FIG. 12 upon subsequent alignment with troughs 29B, 29C . . . 29F of staging area or position 28 according to one aspect of the invention. As shown in FIG. 13, in this aspect, the gripping mechanisms 160B, 160C . . . 160E are movable or translatable where the centerlines 197 of gripping mechanisms 160B, 160C, 160E may be moved and, for example, individually, aligned with the centerlines 95 of troughs 29B, 29C . . . 29F. According to this aspect, with the individual alignment of gripping mechanisms 160B, 160C . . . 160E with troughs 29B, 29C . . . 29F, the hamburgers 12 in one or more of troughs 29B, 29C . . . 29F of staging area 28 may be individually or collectively transferred to gripping device 130, as indicated by arrow 198. For example, as shown in FIG. 13, the hamburgers 12 in trough 29F may be transferred by transfer devices 46 (see FIG. 3) each having a pawl 48. In the aspect shown in FIG. 13, all of the gripper mechanisms 160A . . . 160E of gripping device 130 have received at least some hamburgers 12, though, in some aspects of the invention, not all of the gripper mechanisms 160A . . . 160E may receive hamburgers 12.

Figure 14:
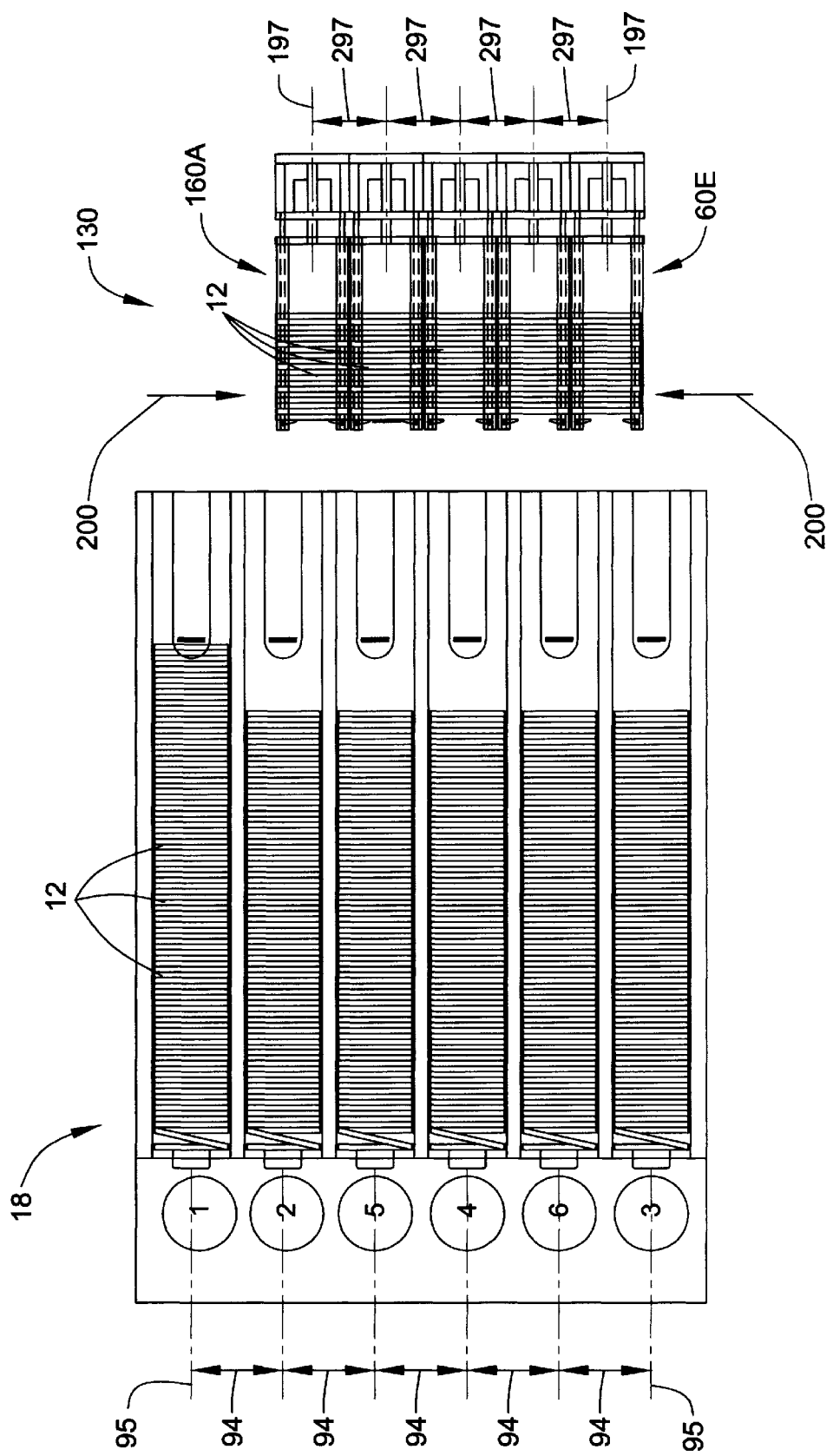
FIG. 14 is top plan view of the receiver and the gripping device shown in FIG. 13 upon subsequent realignment or "collapse" according to another aspect of the invention.

FIG. 14 is top plan view of receiver 18 and a gripping device 130 having gripper mechanisms 160A . . . 160E shown in FIG. 13 upon subsequent realignment or "collapse" of the gripper mechanisms 160A . . . 160E according to another aspect of the invention. This realignment or "collapse" is as indicated by arrows 200. As shown in FIG. 14, in comparison to what is shown in FIG. 13, at least one (but typically substantially all) of the spacings 196 of the centerlines 197 of the gripper mechanism 160A . . . 160E shown in FIG. 13 are varied as shown in FIG. 14 to yield centerline spacing 297 shown in FIG. 14, for example, smaller than the spacing 197 shown in FIG. 13. According to aspects of the invention, centerline spacing 297 may be different from centerline spacing 197, and is typically less than the spacing 196 shown in FIG. 13, though spacing 197 may be greater. In one aspect, centerline spacing 297 is substantially equal to a predetermined centerline spacing of stacks of hamburgers 12 desired when the hamburgers are transferred to second position 34 (see FIG. 1), for example, having container 36.

The variation or "collapse" of centerline spacing 197 to yield spacing 297 may be effected manually, pneumatically, hydraulically, and/or mechanically, for example, by means of cams, levers, belts, and/or pulleys, and the like.

According to one aspect of the invention, the procedures illustrated and described with respect to FIGS. 11 through 14 may be repeated until the desired stacks of hamburgers 12 are received by gripping device 130, and then gripper device 130 may be transferred to second position 34, for example, by means of automated manipulator 31. According to aspects of the invention, the gripping device 130 may receive one or more stacks of hamburgers 12, for example, one or more stacks that may be sufficient to provide each of the gripping mechanisms 60 of gripping device 30 with hamburgers 12. In one aspect, gripping device 130 may include one or more gripping mechanisms 160, but as shown in FIGS. 11 through 14, may typically have 4 to 8 gripping mechanisms 160, in this case 5 gripping mechanisms 160.

According to aspects of the present invention, the loading or transfer of hamburgers 12 to gripping devices 30 and 130 shown in FIGS. 10 and 14, respectively, is subsequently followed by the transfer of devices 30 and 130, respectively, from a position adjacent to receiver 18, that is, a first position, to a position adjacent to container 36, for example, a second position. The second position 34 may comprise a hopper, a tray, a shelf, a platform, a surface, or a retaining device, among other structures. Container 36 may comprise, for example, a box, a crate, a bin, or any other receptacle adapted to receive hamburgers 12. This transfer and its relationship to the methods and apparatus shown and described with respect to FIGS. 8 through 14 will be described below in FIGS. 15 to 22.

Figure 15:
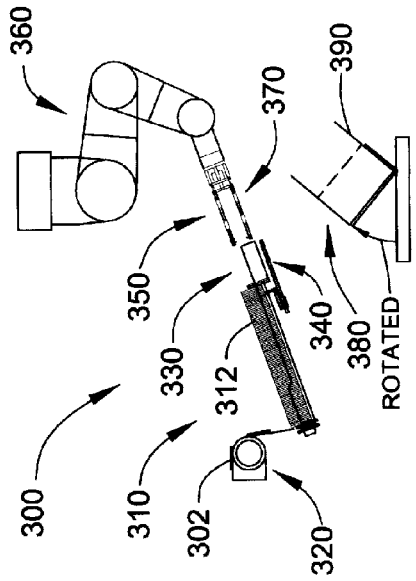

FIGS. 15 through 22 illustrate a sequential series of schematic images illustrating one typical operation of the methods and apparatus disclosed herein. FIG. 15 is a schematic side elevation view of a system 300 for processing articles, for example, stackable articles according to one aspect of the invention. Again in the following discussion, the articles will be referred to as "hamburgers 302"; however, it is envisioned that the articles handled may comprise any one or more of the articles, for example, the food items or non-food items, referenced previously.

As shown in FIG. 15, system 300 may typically include a receiver or receiver system 310 adapted to receive hamburgers 302, for example, from a conveyor 320 and form one or more stacks or columns 312 of hamburgers 302 on receiver 310, for example, receiver 18 disclosed herein. Though FIGS. 15 through 22 illustrate the handling of a single stack 312 of hamburgers 302, it will be understood by those of skill in the art that multiple stacks 312 may typically be handled according to aspects of the invention, for example, as indicated by the multiple or plurality of stacks of hamburgers illustrated and handled in FIGS. 1 through 14, among other figures provided herein. The receiver 310 may be an RMF "Patty Stacker" or its equivalent. System 300 may also include a staging or buffer area, or transfer system, 33 having a transfer device 340, and a gripping device 350, as described herein, mounted to an automated manipulator 360, for example, a programmable robot. According to aspects of the invention, manipulator 360 is adapted to transfer gripping device 350, after gripping device 350 has received hamburgers 302 that confirm to the desired attribute of hamburgers 302, for example, a desired number of hamburgers 302, for example, stacks of hamburgers 302, from a first position 370 to a second position 380, for example, having a container 390.

Figure 16:
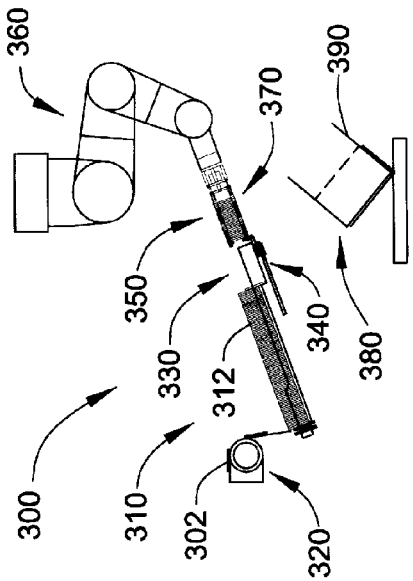

FIG. 16 is a schematic view of system 300 shown in FIG. 15 according to an aspect of the invention in which container 390 in the second position 380 is received and then rotated, or otherwise positioned, to an appropriate orientation to receive the hamburgers 302 transferred to the second position 380 with gripping device 350. In one aspect, this rotation of container 390 may be omitted or postponed to a later stage of the following sequence. In one aspect, hamburgers 302 may substantially continuously be conveyed by conveyor 320 and accumulate on receiver 310 before, during, or after container 390 is positioned rotated as desired.

Figure 17:
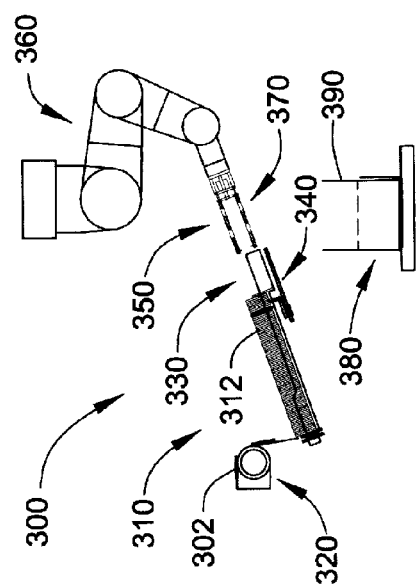

FIG. 17 is a schematic view of system 300 shown in FIG. 16 according to an aspect of the invention in which hamburgers 302 continue to accumulate on receiver 310 and/or accumulate in staging area or position 330. As shown in FIG. 17, the hamburgers 302 accumulated on staging area 330 have conformed to a predetermined attribute, for example, number, of hamburgers 302 on staging area 330, for example, 20 hamburgers, and are ready to be transferred to gripping device 350. The determination of when or how many of the predetermined attribute of hamburgers 302 are positioned in receiver 310 or staging area 330 may be determined by a means for determining an attribute of the articles in at least one of the stacks of the articles. Such means may comprise conventional sensor technology, for example, by detection of a predetermined weight, such, as a weight detector; detection of a predetermined length, such as, a length detector; and/or detection of a predetermined number of hamburgers 302, such as, a number detector or counter. Though FIG. 17 illustrates the accumulation of one stack of hamburgers 302 in staging area 330 for ease of illustration, it is understood that, based upon the nature and operation of the receiver 310 disclosed herein, a plurality of stacks 312 of hamburgers 302, for example, of varying number of hamburgers 302, may accumulate in staging area 330 shown in FIG. 17.

FIG. 18 is a schematic view of system 300 shown in FIG. 17 according to an aspect of the invention in which one or more stacks 312 of hamburgers 302 are transferred from receiver 310, staging area, or position 330 to gripping device 350 and are received by gripping device 350 as disclosed herein. As shown in FIG. 18, the one or more stacks 312 of hamburgers 302 may be transferred from staging area 330 by one or more transfer devices 340, for example, having translatable pawls. Though FIG. 18 illustrates the transfer of a single stack of hamburgers 302 from staging area 330 to gripping device 350 for ease of illustration, it is understood that, based upon the nature and operation of the receivers 310, staging areas 330, and gripping devices 350 disclosed herein, a plurality of stacks 312 of hamburgers 302, for example, of substantially the same number of hamburgers 302, may be transferred from staging area 330 to gripping device 350 shown in FIG. 18.

Figure 19:
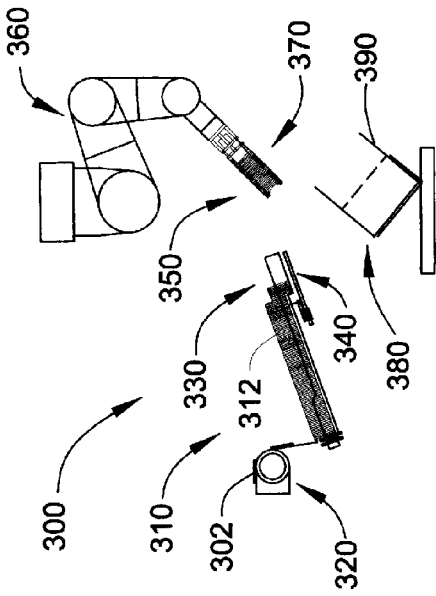

FIG. 19 is a schematic view of system 300 shown in FIG. 18 according to an aspect of the invention in which the pawl of the transfer device 340 is retracted in preparation for the subsequent transfer of another one or more stacks 312 of hamburgers 302 from staging area or position 330 to gripping device 350. Though FIG. 19 illustrates the retraction of a pawl of a single transfer device 340 for ease of illustration, it is understood that, based upon the nature and operation of the transfer devices 340 and gripping devices 350 disclosed herein, a plurality of pawls of transfer devices 340 may be retracted in the system shown in FIG. 19.

In one aspect, the sequence of processes illustrated in FIGS. 17-19 may be repeated numerous times wherein the gripping device 350 shown in FIG. 19 has received and retained the desired number of stacks 312 of hamburgers 302.

Figure 20:
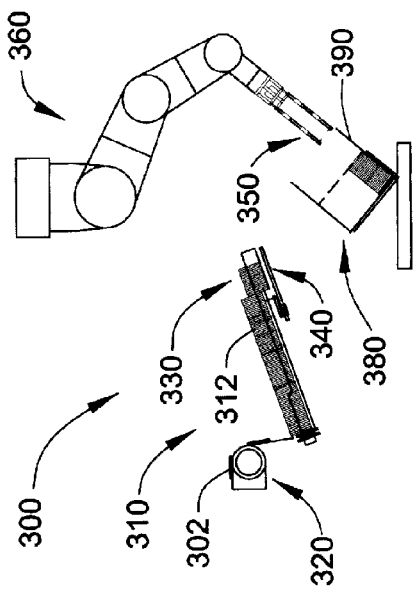

FIG. 20 is a schematic view of system 300 shown in FIG. 19 according to an aspect of the invention in which gripping device 350, having received and retained the desired number of stacks 312 of hamburgers 302, is initially moved to begin the transfer from first position 370 to second position 380 by automated manipulator 360. The retention of hamburgers 302 in gripping device 350 may be affected by the actuation of the actuation assembly of gripping device 30 or gripping device 130, as disclosed herein. According to aspects of the invention, while the transfer shown in FIG. 20 takes place, hamburgers 302 may substantially continuously be conveyed by conveyor 320, accumulate on receiver 310, and accumulate in staging area 330 before, during, or after gripping device 350 is transferred by automated manipulator 360.

Figure 21:
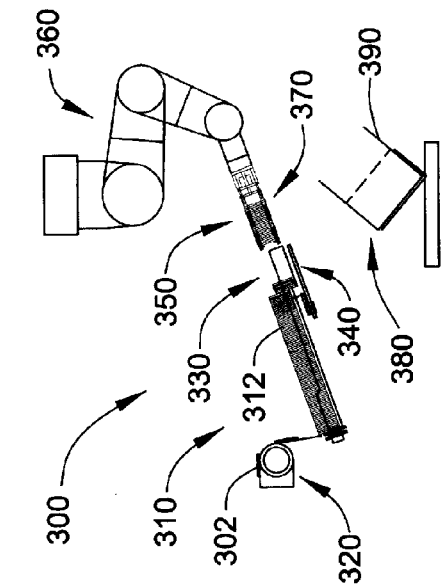

FIG. 21 is a schematic view of system 300 shown in FIG. 20 according to an aspect of the invention in which griping device 350 continues to be transferred from first position 370 to second position 380 by automated manipulator 360, and subsequently arrives at second position 380.

Figure 22:
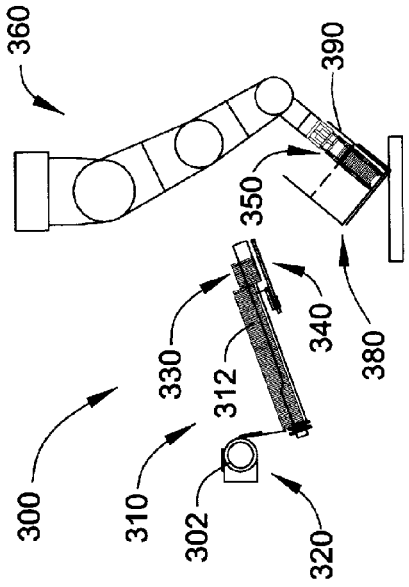

FIG. 22 is a schematic view of system 300 shown in FIG. 21 according to an aspect of the invention in which griping device 350 releases the hamburgers 302 transferred with gripping device 350 in second position 380. The release of hamburgers 302, for example, the means for discharging the at least one of the stacks of hamburgers 302 from the gripping device 350 at the second position 380, may comprise or be effected by conventional actuators, or by the actuation of the actuation assembly 62 of gripping device 30 or gripping device 130, respectively, as disclosed herein. The automated manipulator 360 may then return the gripper device 350 to first position 370 to repeat the processes shown and described with respect to FIGS. 15 through 22. Accordingly, the processes shown and described with respect to FIGS. 15 through 22 may be repeated a predetermined number of times until the desired number of stacks 312 of hamburgers 302 are delivered to the second position 380, for example, into container 390. Again, according to aspects of the invention, while the transfer shown in FIGS. 15 though 22 takes place, hamburgers 302 may substantially continuously be conveyed by conveyor 320, accumulate on receiver 310, and accumulate in staging area 330 before, during, or after gripping device 350 is transferred by automated manipulator 360 and hamburgers 302 are delivered to the second position 380.

Figure 23:
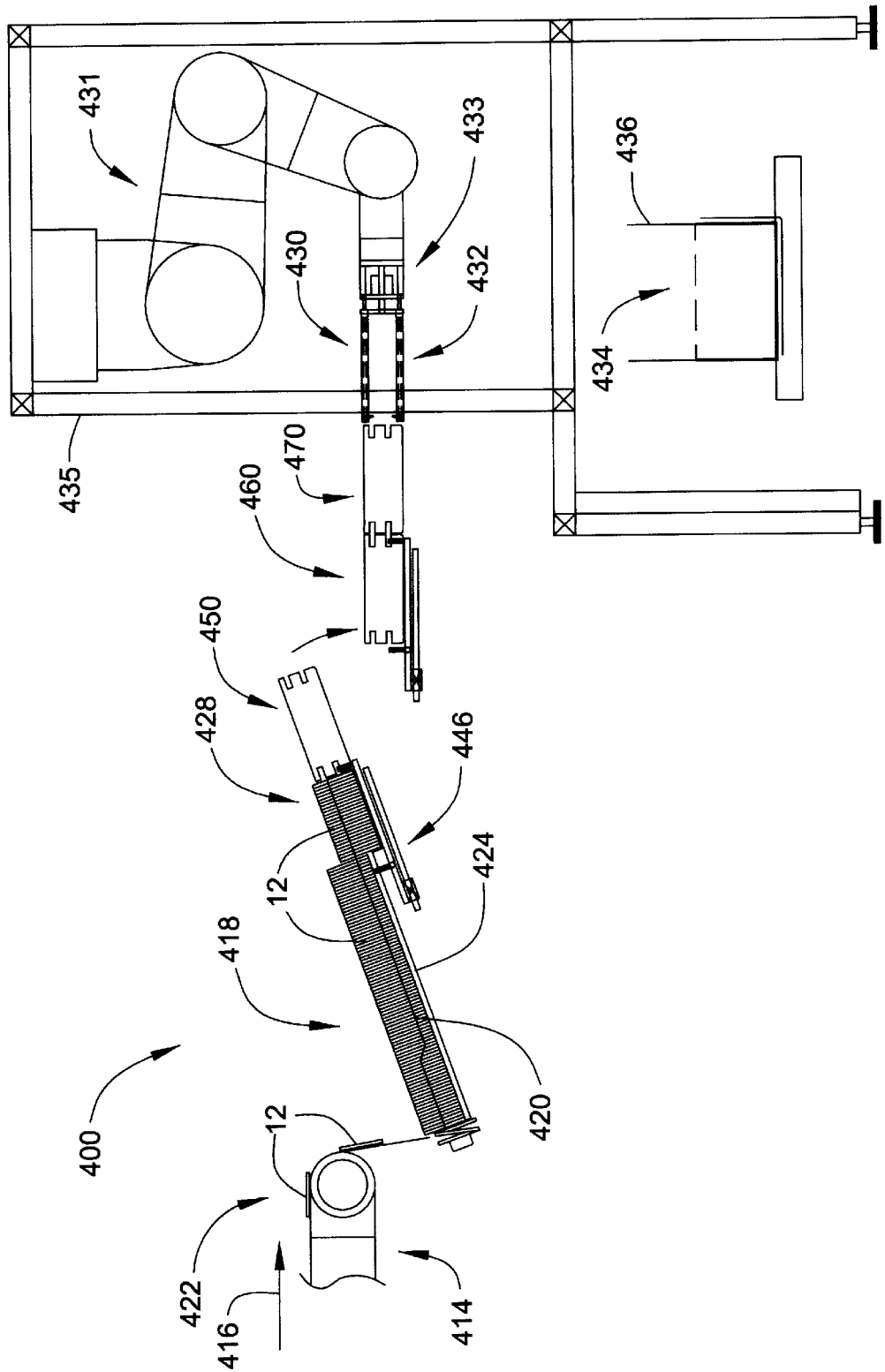
FIG. 23 is a side elevation view of a system for processing articles, for example, stackable articles, according to another aspect of the invention.
Figure 24:
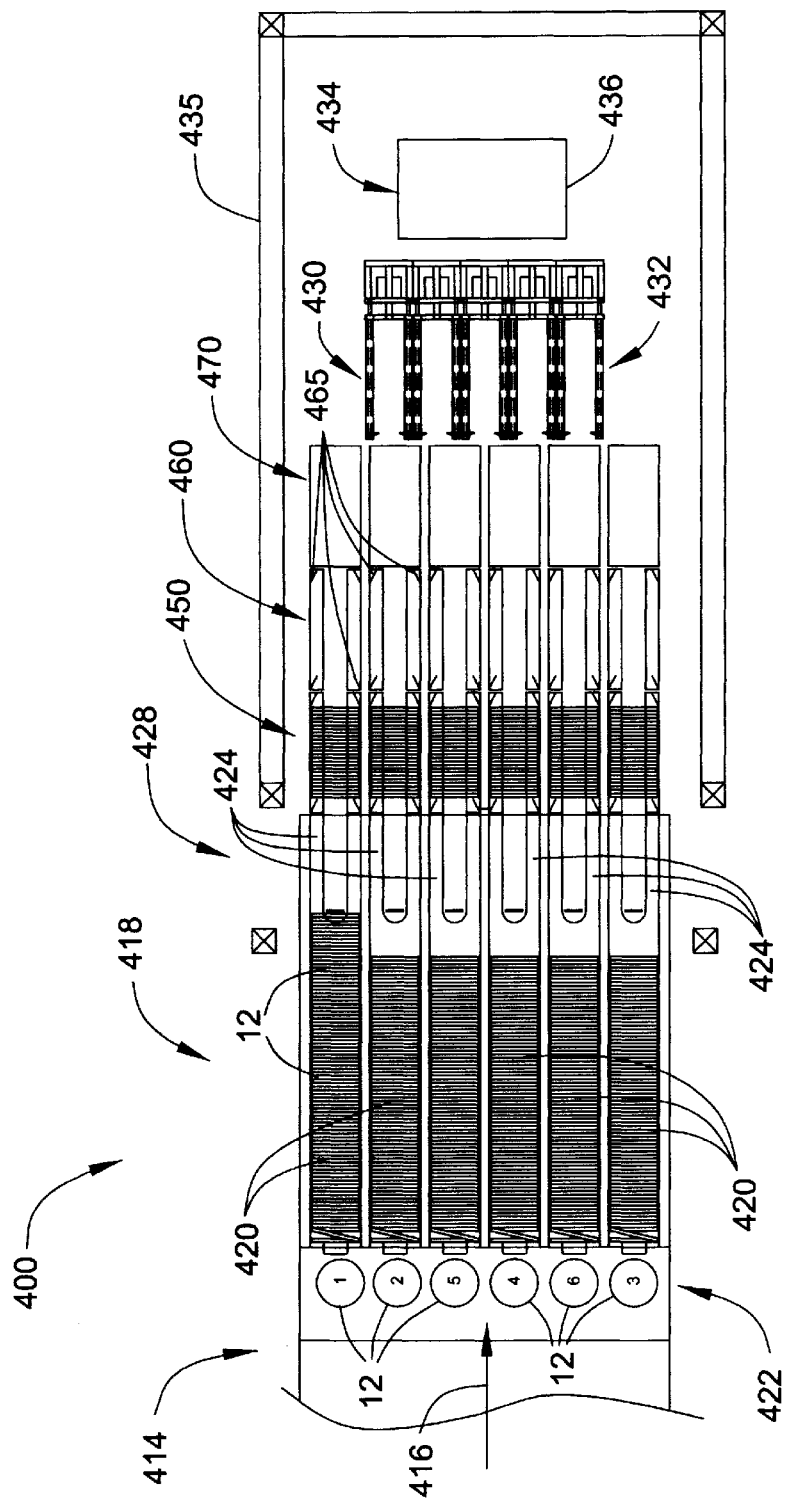
FIG. 24 is a top plan view of the system shown in FIG. 23.

FIG. 23 is a side elevation view of a system 400 for processing articles 12, for example, stackable articles, according to another aspect of the invention. FIG. 24 is a top plan view of the system 400 shown in FIG. 23. As shown in FIGS. 23 and 24, aspects of the invention include a gripping device 430 adapted to receive articles 12 from a receiver or receiver system 418 and/or staging area or position 428 and staging devices 450, 460, and 470 adapted to transfer articles 12 from receiver 418 and/or staging area 428 to gripping device 430 as positioned in a first position 432. The gripping device 430 is then transferred to a second position 434, for example, where a container 436 is located, and then the articles 12 are discharged from the gripping device 430 in the second position 434, for example, into the container 436. (In FIG. 24 second position, 434 and container 436 are shown displaced from their positions shown in FIG. 23 for ease of illustration.) Articles 12 may comprise any one or more of the food items or non-food items disclosed herein, but, again, for the ease of discussion, in the following discussion, articles 12 will be referred to as "hamburgers 12."

According to aspects of the invention, the gripping device 430 is adapted to execute the desired function while rows of hamburgers 12 are substantially continuously introduced to receiver 418, for example, from conveyor 414.

Hamburgers 12 may typically be provided on a conveyor 414, for example, a conveyor traveling in the direction of arrow 416. Only a representative portion of conveyor 414 from which articles 12 are discharged is shown in FIGS. 23 and 24. In one aspect, as discussed herein, articles 12 may be "stackable" articles, that is, the articles 12 can be laid one on top of the other to form a generally vertically column 420 of articles 12.

As shown most clearly in FIG. 23, gripping device 430 may typically be mounted to an automated manipulator 431, for example, robotic manipulator. For example, as is typical in the art, automated manipulator 431 may typically have an "arm end" 433 adapted to engage gripping device 430 and interface with gripping device 430, for example, providing appropriate power, operation, and control if gripping device 430, for instance, electronic, pneumatic, hydraulic, and/or mechanical interfaces with gripping device 430. Automated manipulator 431 may typically be mounted to a structure 435, for example, a frame, support structure, or superstructure appropriately designed to withstand the weight and operation of automated manipulator 431, the gripping device 430, and the stacks of hamburgers 12 in gripping device 430. Structure 435 may also be adapted to support one or more other devices in system 400, for example, adapted to support conveyor 414 and/or receiver 418

As shown in FIGS. 23 and 24, conveyor 414 is adapted to discharge hamburgers 12 to a receiver or receiver system 418 to form one or more stacks 420 of hamburgers 12. In FIGS. 23 and 24 conveyor 414 is shown as a conventional belt conveyor, for example, for ease of illustration; however, according to aspects of the invention, conveyor 414 may be a belt conveyor or any other type of conveyor adapted to introduce hamburgers 12 to receiver 418. In one aspect, conveyor 414 may comprise a belt conveyor provided by RMF Steel Products Company, or its equivalent. The brochure entitled "RMF Belt Conveyor" is incorporated by reference herein. In another aspect, conveyor 414 may not be a moving conveyor, for example, conveyor 414 may be a chute, a slide, a hopper, or any other means stationary means of introducing hamburgers 12 to receiver 418.

In one aspect of the invention, as shown most clearly in FIG. 24, conveyor 414 may transport hamburgers 12 in rows 422, typically multiple successive rows 422. Conveyor 414 may typically transport a predetermined number of rows 422, for example, in the aspect shown in FIG. 24, conveyor 414 transports 6 rows of hamburgers 12, where "6" comprises a "predetermined number" of rows in this aspect. According to aspects of the invention, the predetermined number of number of rows 422 may vary from 1 to 24 rows, but is typically, between about 3 and 12, for example, 4, 5, or 6 rows 422 of hamburgers 12.

According to aspects of the invention, hamburgers 12 are introduced to receiver 418 and receiver 418 is adapted to receive hamburgers 12 and produce stacks or columns 420 of hamburgers 12 on receiver 418, for example, in a series of cavities or troughs 424. Receiver 418 shown in FIGS. 23 and 24 may be similar to and have all the attributes of receiver 18 shown and described with respect to FIGS. 1, 2, and 3.

According to aspects of the invention, receiver 418 may comprise any conventional receiver 418 adapted to receive hamburgers 12 from a conveyor 414. However, in one aspect of the invention, receiver 418 may comprise a receiver provided by RMF Steel Products Company, or its equivalent. For example, in one aspect, receiver 418 may comprise an RMF "Patty Stacker" or its equivalent.

According to one aspect of the invention, hamburgers 12 may be transferred from receiver 418 directly to gripping device 430. That is, in one aspect, one or more stacks 420 of hamburgers 12 in troughs 424 of receiver 418 may be transferred by appropriate means, for example, by a hydraulically-driven piston, from one or more troughs 424 in receiver 418 directly into the gripping mechanism of gripping device 430. However, in another aspect, hamburgers 12 may first be transferred to a buffer or staging location or area 428 prior to being introduced to gripping device 430. As shown in FIGS. 23 and 24, system 400 may include a transfer device 446 adapted to transfer hamburgers 12 from staging area 428 to subsequent handling. The use of a staging area 428 in one aspect enhances the flexibility and operability of aspects of the invention while minimizing miss-feeds or other undesirable complications. Staging area 428 and transfer device 446 shown in FIGS. 23 and 24 may be similar to and have all the attributes of staging area 28 (having trough 29) and transfer device 46 (having translating pawl 48), respectively, shown and described with respect to FIGS. 1, 2, and 3.

In contrast to system 10 shown in FIGS. 1, 2, and 3 and in contrast to system 300 shown in FIGS. 15-22, system 400 shown in FIGS. 23 and 24 includes additional staging devices, including a receiving assembly or "cradle" 450, a receiving assembly or "staging" 460, and a receiving and alignment assembly or "shuttle" 470. According to aspects of the invention, cradle 450 is adapted to receive hamburgers 12 from receiver 418 (or from staging area 428) and transfer the hamburgers 12 received to staging 460. Staging 460 is adapted to receive hamburgers 12 from cradle 450 and transfer the hamburgers 12 received to shuttle 470. Shuttle 470 is adapted to receive hamburgers 12 from staging 460 and, typically, align the hamburgers 12 with gripping device 430. Gripping device 430 may be substantially the same as gripping device 30 or gripping device 130 disclosed in FIGS. 1 through 14. According to aspects of the invention, once hamburgers 12 are received and retained in gripping device 430 in first position 432, the gripping device 430 with hamburgers 12 may be transferred to second position 434, for example, where container 436 may be located, and then the hamburgers are discharged from gripping device 430 in second position 434, for example, in a manner to similar, if not identical, to that shown with respect to system 300 shown in FIGS. 15-22. Details of a cradle 450, a staging 460, and a shuttle 470 according to aspects of the invention are illustrated and described with respect to FIGS. 25, 26, and 27.

FIG. 25 is side elevation view the cradle 450, staging 460, and a shuttle 470, and their relationship to the receiver 418 (partially shown in FIG. 25) and gripping device 430 (partially shown in FIG. 25), shown in FIGS. 23 and 24 according to aspects of the invention. FIG. 26 is a top plan view of the cradle 450, staging 460, and a shuttle 470 shown in FIG. 25. As shown, in one aspect, cradle 450 may comprise one or more troughs 452 positioned and sized to receive hamburgers 12 from receiver 418 and/or from staging area 428. The one or more troughs 452 may have the shape and characteristics of troughs 24 of receiver 18 and/or the troughs of staging area 428, for example, troughs 452 may have angled sides or v-shaped to receive hamburgers 12 and allow hamburgers 12 to translate along troughs 452. As shown most clearly in FIG. 25, in one aspect, troughs 452 may be oriented at substantially the same angle α (see FIG. 3) with the horizontal as the troughs of receiver 418 or the troughs of staging area 428. According to other aspects, troughs 452 of cradle 450 may be substantially horizontal. Cradle 450 may have 1 or more troughs 452, for example, 3 to 24 troughs 452, for instance, as shown in FIG. 26, 6 troughs.

According to aspects of the invention, cradle 450 may also include one or more transfer devices 454, for example, a transfer device similar to transfer device 46 shown in FIGS. 1-3, for example, having a translatable pawl 456. In one aspect, as shown in FIG. 25, cradle 450 may share a common transfer device with staging area 428.

According to one aspect of the invention, cradle 450 may be rotatably mounted, for example, rotatably mounted to receiver 418 and/or staging area 428 and/or to an adjacent structure [not shown]. As indicated by arrow 458, cradle 450 may be rotated from a first position 457 (for example, in alignment with receiver 418 and/or staging area 428) to a second position 459 (for example, into alignment with staging 460).

As shown in FIGS. 25 and 26, in one aspect, staging 460 may comprise one or more troughs 462 positioned and sized to receive hamburgers 12 from cradle 450. The one or more troughs 462 may have the shape and characteristics of the troughs of receiver 418 and/or the troughs of staging area or position 428, for example, troughs 462 may have angled sides or v-shaped to receive hamburgers 12 and allow hamburgers 12 to translate along troughs 462. As shown most clearly in FIG. 25, in one aspect, troughs 452 may be oriented to align with shuttle 470, that is, troughs 462 may be substantially horizontal. Staging 460 may have 1 or more troughs 462, for example, 3 to 24 troughs 462, for instance, as shown in FIG. 26, 6 troughs.

According to aspects of the invention, staging 460 may also include one or more transfer devices 464, for example, a transfer device similar to transfer device 46 shown in FIGS. 1-3, for example, having a translatable pawl 466.

According to one aspect of the invention, staging 460 may also be rotatably mounted, for example, wherein staging 460 may be rotated from a first position (for example, in alignment with cradle 450) to a second position (for example, in alignment with shuttle 470).

As shown in FIGS. 25 and 26, in one aspect, shuttle 470 may comprise one or more troughs 472 positioned and sized to receive hamburgers 12 from staging 460. The one or more troughs 472 may have the shape and characteristics of the troughs of receiver 418 and/or the troughs 29 of staging area 428, for example, troughs 472 may have angled sides or v-shaped to receive hamburgers 12 and allow hamburgers 12 to translate along troughs 472. As shown most clearly in FIG. 25, in one aspect, troughs 472 may be oriented to align with gripping device 430, that is, troughs 472 may be substantially horizontal, though troughs 472 may oriented any suitable angle to accommodate unencumbered transfer from troughs 472 to gripping device 430. Shuttle 470 may have 1 or more troughs 472, for example, 3 to 24 troughs 472, for instance, as shown in FIG. 26, 6 troughs.

According to aspects of the invention, shuttle 470 may also include one or more transfer devices (not shown), for example, a transfer device similar to transfer device 46 shown in FIGS. 1-3, for example, having a translatable pawl (not shown). In one aspect, as shown in FIG. 25, shuttle 470 may share a common transfer device 464 with staging 460.

According to one aspect of the invention, shuttle 470 may also be rotatably mounted, for example, wherein shuttle 470 may be rotated from a first position (for example, in alignment with staging 460) to a second position (for example, in alignment with gripping device 430).

According to one aspect of the invention, shuttle 470 is adapted to vary the spacing of hamburgers 12 from the horizontal spacing defined, for example, by receiver 418 to the horizontal spacing desired in second position 434 (see FIG. 23), for example, in container 436. According to one aspect of the invention, as shown in FIG. 26, shuttle 470 may be translatable and/or the individual troughs 472 may be translatable, for example, horizontally translatable as indicated by double arrow 475 in FIG. 26, so that troughs 472 of shuttle 470 may be aligned, for example, individually aligned, with the gripping mechanisms of gripping device 430. In another aspect, shuttle 470 may be "collapsible," as discussed herein, as illustrated in FIG. 27.

Figure 27:
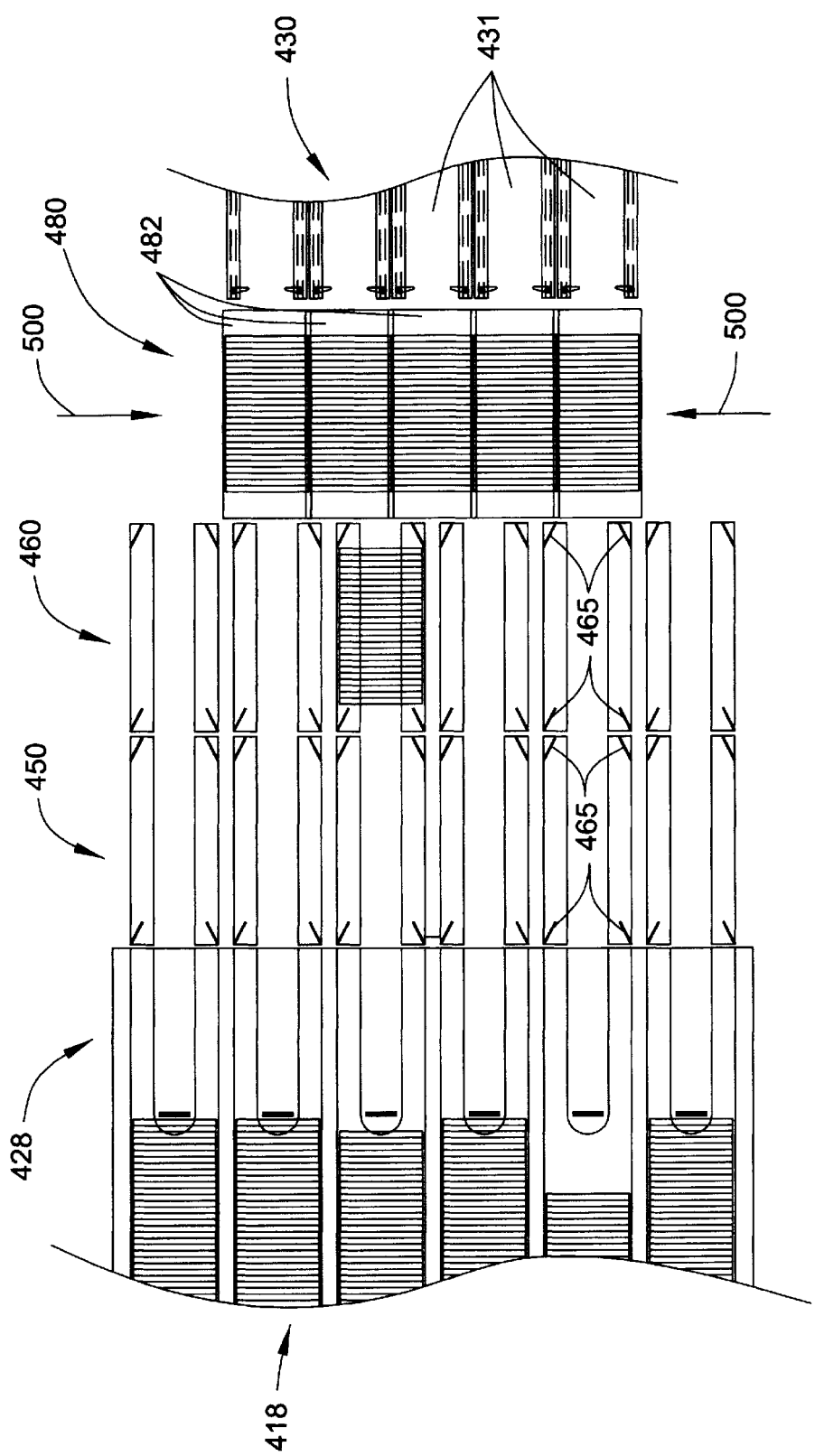
FIG. 27 is a top plan view, similar to FIG. 26, of the cradle and staging shown in FIGS. 25 and 26, and their relationships to a receiver (partially shown in FIG. 27) and a gripping device (partially shown in FIG. 27) and a shuttle according to another aspect of the invention.

FIG. 27 is a top plan view, similar to FIG. 26, of the cradle 450 and staging 460 shown in FIGS. 25 and 26, and their relationships to the receiver 418 (partially shown in FIG. 27) and gripping device 430 (partially shown in FIG. 27) and a shuttle 480 according to another aspect of the invention. According to this aspect, shuttle 480 comprises troughs 482 (for example, similar to troughs 472 of shuttle 470). However, according to this aspect, troughs 482 of shuttle 480 may be realigned, for example, individually realigned, or "collapsed" according to another aspect of the invention as indicated by arrows 500. As shown in FIG. 27, in comparison to what is shown in FIG. 26, the position of at least one (but typically substantially all) of the troughs 482 of shuttle 480 may be are varied to yield a centerline spacing for troughs 482 that substantially conform to the centerline spacing of the gripping mechanisms 431 of gripping device 430, for example, the desired spacing of hamburgers for container 436. According to aspects of the invention, centerline spacing of the troughs 462 in staging 460 may be different from the centerline spacing of the troughs 482 of shuttle 480, which is typically less than centerline spacing of the troughs 462, though the spacing may be greater. In one aspect, centerline spacing of the troughs 462 in staging 460 may be substantially equal to a predetermined centerline spacing of stacks of hamburgers 12 received by receiver 418. However, according to aspects of the invention, the centerline spacing of the hamburgers 12 in the "collapsed" troughs 482 of shuttle 480, and the centerline spacing of the gripping mechanism 431 of gripper 430 may comprise the desired centerline spacing of the hamburgers 12 transferred to second position 434 (see FIG. 23), for example, into container 436.

The variation of centerline spacing of the troughs 482 of shuttle 480 to yield the desired spacing in gripping device may be effected manually, pneumatically, hydraulically, and/or mechanically, for example, by means of cams, levers, belts, and/or pulleys, among other devices.

As shown in FIGS. 24, 26, and 27, aspects of the invention may include one or more devices adapted to maintain a desired orientation and/or retain a position of the hamburgers 12, for example, when positioned for temporary placement. In one aspect, the devices adapted to maintain an orientation and/or position of the hamburgers may comprise "stack retainers," that is, devices adapted to prevent the hamburgers in stacks of hamburgers from toppling over, falling over, falling out, or otherwise assuming an undesirable orientation and/or position. According to one aspect, as shown in FIGS. 24, 26, and 27, the stack retainers may comprise two or more biased levers or pawls 465, for example, cooperating, biased levers or pawls 465. In one aspect, biased levers or pawls 465 may be spring-biased; in another aspect, levers or pawls 465 may comprise a resilient material, for example, a metallic resilient material, a plastic resilient material, or an elastomeric resilient material. According to aspects of the invention, biased levers or pawls 465 may be adapted to allow passage of hamburgers in a stack, for example, at the entry end of a trough, and then deflect under a biasing force to a position where the stack is retained in a desired orientation, for example, substantially perpendicular to the axis of a trough. In another aspect, biased levers or pawls 465 may be adapted to allow passage of hamburgers in a stack from a trough, for example, at the exit end of a trough, and then deflect under a biasing force to a retain the stack where the stack is retained in a desired orientation, for example, substantially perpendicular to the axis of a trough. As shown in FIGS. 24, 26, and 27, one or more levers or pawls 465 may be positioned along cradle 450, and staging 460, but, though not shown, may also be positioned along staging area 428 and shuttle 480. In addition, according to aspects of the invention, one or more devices adapted to maintain a desired orientation and/or retain a position of the hamburgers, such as, biased levers or pawls 465, may be employed throughout aspects of the present invention, for example, anywhere in FIGS. 1 through 42, where there is a benefit to maintaining a desired orientation and/or retention of hamburgers in stacks.

According to one aspect of the invention, the procedures illustrated and described with respect to FIGS. 23 through 27 may be repeated until the desired stacks of hamburgers 12 are received by gripping device 430, and transferred to second position 434, for example, by means of automated manipulator 431. According to aspects of the invention, the gripping device 430 may receive one or more stacks of hamburgers 12, for example, one or more stacks that may be sufficient to provide each of the gripping mechanisms 431 of gripping device 430 with hamburgers 12. In one aspect, gripping device 430 may include one or more gripping mechanisms 431, but, as shown in FIGS. 23 through 27, may typically have 4 to 8 gripping mechanisms 431, in this case 5 gripping mechanisms 431.

According to aspects of the present invention, the loading or transfer of hamburgers 12 to gripping devices 430 shown in FIGS. 23 through 27 is subsequently followed by the transfer of gripping devices 430 from a first position 432, for example, adjacent to shuttle 470 or 480, to a second position 434, for example, adjacent to container 436. This transfer and its relationship to the methods and apparatus shown and described with respect to FIGS. 23 through 27 will be described below in FIGS. 28 through 42

FIGS. 28 through 42 illustrate a sequential series of images illustrating one typical operation of the methods and apparatus disclosed herein. FIG. 28 is a schematic side elevation view of a system 600 for processing articles 12, for example, stackable articles according to one aspect of the invention. Again in the following discussion, the articles 12 will be referred to as "hamburgers 602"; however, it is envisioned that the articles handled may comprise any one or more of the articles, for example, the food items or non-food items, referenced previously.

As shown in FIG. 28, system 600 may typically include a receiver or receiver system 610 adapted to receive hamburgers 602, for example, from a conveyor 620 and form one or more stacks or columns 612 of hamburgers 602 on receiver 610. The receiver 610 may be an RMF "Patty Stacker" or its equivalent. System 600 may also include a staging area or position 630 having a transfer device 640 and a gripping device 650; for example, gripping device 30 or 130 as described herein, mounted to an automated manipulator 660, for example, a programmable robot. According to aspects of the invention, manipulator 660 is adapted to transfer gripping device 650, after gripping device 650 has received the desired number of hamburgers 602, from a first position 670 to a second position 680, for example, having a container 690.

According to the aspect shown in FIG. 28, system 600 typically also includes a cradle 635, a staging 645, and a shuttle 655, for example, as shown and described with respect to FIGS. 23 through 27.

FIG. 29 is a schematic view of system 600 shown in FIG. 28 according to an aspect of the invention in which container 690 in the second position 680 is positioned and rotated, or otherwise positioned, to an appropriate orientation to receive the hamburgers 602 transferred to the second position 680 with gripping device 650. In one aspect, this rotation of container 690 may be omitted or postponed to a later stage of the following sequence. In one aspect, hamburgers 602 may substantially continuously be conveyed by conveyor 620 and accumulate on receiver 610 before, during, or after container 690 is rotated as desired.

FIG. 30 is a schematic view of system 600 shown in FIG. 29 according to an aspect of the invention in which hamburgers 602 continue to accumulate on receiver 610 and accumulate in staging area 630. As shown in FIG. 30, the hamburgers 602 accumulated on staging area 630 have achieved a predetermined attribute for hamburgers 602 (for example, predetermined number of hamburgers 602) on staging area 630, for example, 20 hamburgers, to be transferred to cradle 635. The determination of when the predetermined attribute of hamburgers 602 are positioned in staging area 630 may be determined by conventional sensor technology, for example, by detecting a predetermined weight, a predetermined length, or a predetermined number of hamburgers 602. Though FIG. 30 illustrates the accumulation of one stack of hamburgers 602 in staging area 630 for ease of illustration, it is understood that, based upon the nature and operation of the receivers 610 disclosed herein, a plurality of stacks of hamburgers 602, for example, of varying number of hamburgers 602, may accumulate in staging area 630 shown in FIG. 30.

FIG. 31 is a schematic view of system 600 shown in FIG. 30 according to an aspect of the invention in which one or more stacks of hamburgers 602 are transferred from staging area 630 to cradle 635 as disclosed herein. As shown in FIG. 31, the one or more stacks of hamburgers 602 may be transferred from staging area 630 by one or more transfer devices 640, for example, having translatable pawls. Though FIG. 31 illustrates the transfer of a single stack of hamburgers 602 from staging area 630 to cradle 635 for ease of illustration, it is understood that, based upon the nature and operation of the staging areas 630 and cradle 635 disclosed herein, a plurality of stacks of hamburgers 602, for example, of substantially the same number of hamburgers 602, may be transferred from staging area 630 to cradle 635 shown in FIG. 31.

FIG. 32 is a schematic view of system 600 shown in FIG. 31 according to an aspect of the invention in which the pawl of the transfer device 640 is retracted in preparation for the subsequent transfer of another one or more stacks of hamburgers 602 from staging area or position 630 to cradle 635. Though FIG. 32 illustrates the retraction of a pawl of a single transfer device 640 for ease of illustration, it is understood that, based upon the nature and operation of the transfer devices 340 and cradle 635 disclosed herein, a plurality of pawls of transfer devices 640 may be retracted in the system shown in FIG. 32. In one aspect, the sequence of processes illustrated in FIGS. 28-32 may be repeated numerous times wherein the cradle 635 shown in FIG. 32 receives and retains a desired number of stacks of hamburgers 602.

FIG. 33 is a schematic view of system 600 shown in FIG. 32 according to an aspect of the invention in which to cradle 635, having received the desired number of stacks of hamburgers 602 is rotated, as indicated by arrow 675 from a position of alignment with staging area 630 to a position of alignment with staging 645. According to aspects of the invention, this rotation may be effected electronically, pneumatically, hydraulically, and/or mechanically. According to aspects of the invention, while the rotation shown in FIG. 33 takes place, hamburgers 602 may substantially continuously be conveyed by conveyor 620, accumulate on receiver 610, and accumulate in staging area 630 before, during, or after rotation of cradle 635.

FIG. 34 is a schematic view of system 600 shown in FIG. 33 according to an aspect of the invention in which one or more stacks of hamburgers 602 are transferred from cradle 635 to staging 645 as disclosed herein. As shown in FIG. 34, the one or more stacks of hamburgers 602 may be transferred from cradle 635 by one or more transfer devices (not shown) for example, having translatable pawls. As shown, in one aspect, cradle 635 may share a common transfer device 640 with staging area or position 650. Though FIG. 34 illustrates the transfer of a single stack of hamburgers 602 from cradle 635 to staging 645 for ease of illustration, it is understood that, based upon the nature and operation of cradle 635 and staging 645 disclosed herein, a plurality of stacks of hamburgers 602, for example, of substantially the same number of hamburgers 602, may be transferred from cradle 635 to staging 645 shown in FIG. 34.

FIG. 35 is a schematic view of system 600 shown in FIG. 34 according to an aspect of the invention in which the pawl of the transfer device 640 is retracted from cradle 635 in preparation for the subsequent transfer of another one or more stacks of hamburgers 602 from staging area 630 to cradle 635. Though FIG. 32 illustrates the retraction of a pawl of a single transfer device 640 for ease of illustration, it is understood that, based upon the nature and operation of the transfer devices 340 and cradle 635 disclosed herein, a plurality of pawls of transfer devices 640 may be retracted in the system shown in FIG. 35.

FIG. 36 is a schematic view of system 600 shown in FIG. 35 according to an aspect of the invention in which to cradle 635 is rotated, as indicated by arrow 685 from a position of alignment with staging 645 to a position of alignment with staging area 630. According to aspects of the invention, this rotation may be effected electronically, pneumatically, hydraulically, and/or mechanically. According to aspects of the invention, while the rotation shown in FIG. 33 takes place, hamburgers 602 may substantially continuously be conveyed by conveyor 620, accumulate on receiver 610, and accumulate in staging area 630 before, during, or after rotation of cradle 635.

FIG. 37 is a schematic view of system 600 shown in FIG. 36 according to an aspect of the invention in which one or more stacks of hamburgers 602 are transferred from staging 645 to shuttle 655 as disclosed herein. As shown in FIG. 37, the one or more stacks of hamburgers 602 may be transferred from staging 645 by one or more transfer devices 641 (which may be similar to transfer device 640), for example, having translatable pawls. Though FIG. 37 illustrates the transfer of a single stack of hamburgers 602 from staging 645 to shuttle 655 for ease of illustration, it is understood that, based upon the nature and operation of staging 645 and shuttle 655 disclosed herein, a plurality of stacks of hamburgers 602, for example, of substantially the same number of hamburgers 602, may be transferred from staging 645 to shuttle 655 shown in FIG. 37.

FIG. 38 is a schematic view of system 600 shown in FIG. 37 according to an aspect of the invention in which the pawl of the transfer device 641 of the staging 645 is retracted in preparation for the subsequent transfer of another one or more stacks of hamburgers 602 from staging 645 to shuttle 655. Though FIG. 38 illustrates the retraction of a pawl of a single transfer device 641 for ease of illustration, it is understood that, based upon the nature and operation of the transfer devices 641 and staging 645 disclosed herein, a plurality of pawls of transfer devices 640 may be retracted in the system shown in FIG. 38.

FIG. 39 is a schematic view of system 600 shown in FIG. 38 according to an aspect of the invention in which one or more stacks of hamburgers 602 are transferred from shuttle 655 to gripping device 650 as disclosed herein. As shown in FIG. 39, the one or more stacks of hamburgers 602 may be transferred from shuttle 655 by one or more transfer devices (not shown), for example, having translatable pawls. Though FIG. 39 illustrates the transfer of a single stack of hamburgers 602 from shuttle 655 to gripping device 650 for ease of illustration, it is understood that, based upon the nature and operation of shuttle 655 and gripping device 650 disclosed herein, a plurality of stacks of hamburgers 602, for example, of substantially the same number of hamburgers 602, may be transferred from shuttle 655 to gripping device 650 shown in FIG. 39.

In addition, though not shown in FIG. 39, according to aspects of the invention shuttle 655 may translate, as illustrated by shuttle 470 shown in FIG. 26, and/or collapse, as illustrated by shuttle 480 shown in FIG. 27, prior to transferring hamburgers 602 to gripping device 650.

FIG. 40 is a schematic view of system 600 shown in FIG. 39 according to an aspect of the invention in which griping device 650, having received and retained the desired number of stacks of hamburgers 602, is initially transferred from first position 670 to second position 680 by automated manipulator 660. The retention of hamburgers 12 may be affected by the actuation of actuation assembly of gripping device 650, for example, in a manner described above for gripping device 30 or gripping device 130. According to aspects of the invention, while the transfer shown in FIG. 40 takes place, hamburgers 602 may substantially continuously be conveyed by conveyor 620, accumulate on receiver 610, accumulate in staging area 630, accumulate in cradle 635, accumulate in staging 645, and accumulate in shuttle 655 before, during, or after gripping device 650 is transferred by automated manipulator 660.

FIG. 41 is a schematic view of system 600 shown in FIG. 40 according to an aspect of the invention in which griping device 650 continues to be transferred from first position 670 to second position 680 by automated manipulator 660 and arrives at second position 680.

FIG. 42 is a schematic view of a system 600 shown in FIG. 41 according to an aspect of the invention in which griping device 650 releases the hamburgers 602 transferred with gripping device 650 in second position 680. The release may be affected by the actuation of an actuation assembly of gripping device 650, for example, in a fashion described above for gripping device 30 or gripping device 130. Then the automated manipulator 660 returns [not shown] the gripper device 650 to first position 670 to repeat the processes shown and described with respect to FIGS. 28 through 42.

Accordingly, the processes shown and described with respect to FIGS. 28 through 42 may be repeated a predetermined number of times until the desired number of stacks of hamburgers 602 are delivered to the second position 680, for example, into container 690. Again, according to aspects of the invention, while the transfer shown in FIGS. 28 though 42 takes place, hamburgers 602 may substantially continuously be conveyed by conveyor 620, accumulate on receiver 610, accumulate in staging area 630, accumulate in cradle 635, accumulate in staging 645, and accumulate in shuttle 655 before, during, or after gripping device 650 is transferred by automated manipulator 660 and hamburgers are delivered to the second position 680.

According one aspect of the invention, the devices and systems 400 and 600 shown in FIGS. 23 through 42 may be adapted to handle and/or process articles, such as, hamburgers 602, at a relatively higher rate of speed than, for example, the devices and systems 10 and 300 shown in FIGS. 1 through 22. For example, the devices and systems 400 and 600 shown in FIGS. 23 through 42 may be adapted to handle and/or process articles at a rate of at least 500 items per minute, for instance, at a rate of between about 500 items per minute and about 2000 items for minute. In contrast, the devices and systems 10 and 300 shown in FIGS. 1 through 22 may be adapted to handle and/or process articles at a rate of at most 500 items per minute, for instance, at a rate of between about 5 items per minute and about 500 items for minute.

FIGS. 43 through 47 illustrate a typical sequence of transferring articles 702 from a first position 704, for example, the outlet of a receiver, to a second position 706, for example, a position within a gripping device, according to aspects of the present invention. For example, the sequence shown in FIG. 43 may characterize the handling and direction of advancement of articles 12 from the outlet of receiver 18 to the gripping device 30 shown and described with respect to FIGS. 1 through 3 above.

Figure 43:
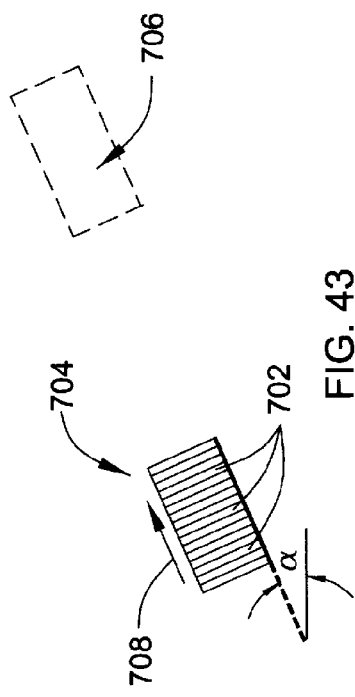
FIG. 43 is a schematic side elevation view of a single transfer of articles from a first position to a second position according to an aspect of the invention, wherein aspects of the invention may comprise one or more transfers of articles from a one or more first positions to one or more second positions.

FIG. 43 is a schematic side elevation view of a single transfer of articles 702, for example, frozen hamburger patties, from a first position 704, for example, at the discharge of a receiver, to a second position 706, for example, within a gripping device, according to an aspect of the invention. Specifically, first position 704 may comprise the location of the discharge of articles 702 from a receiver (for example, an RMF Patty Stacker) as the articles 702 progress along a trough of a receiver as indicated by arrow 708. As shown in FIG. 43, the position, and direction of advancement of articles 702 may be defined by an angle $\alpha$, for example, as shown and described with respect to FIGS. 1 and 3 above.

Though in FIG. 43 a single transfer of articles 702 is shown, it is to be understood that in aspects of the present invention disclosed throughout this specification typically one or more transfers of articles 702 from a one or more first positions 704 to one or more second positions 706 may typically be provided according to aspects of the invention. The single transfer shown and descried with respect to FIG. 43, and the single transfers shown and described with respect to also shown in FIGS. 44 through 61, are presented as representative of the multiple transfers and handling of articles and stacks of articles that characters aspects of the present invention. For example, multiple transfers of stacks of articles according to aspects of the invention are shown and described with respect to, for example, FIGS. 62 through 64, among other locations herein.

Figure 44:
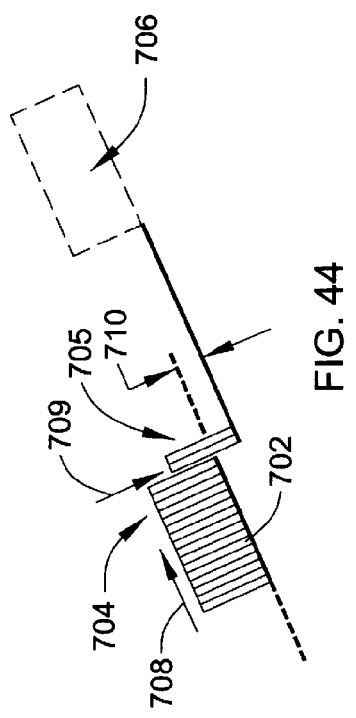
FIG. 44 is a schematic side elevation view of the single transfer of articles shown in FIG. 43 from a first position to an intermediate position according to an aspect of the invention.

FIG. 44 is a schematic side elevation view of the single transfer of articles 702 shown in FIG. 43 from first position 704 to an intermediate position 705 prior to advancing to second position 706 according to an aspect of the invention. As shown in FIG. 44, in this aspect, intermediate position 705 may typically be lower in elevation than first position 704 where articles 702 drop or fall or are repositioned (for example, under the influence of gravity) from first position 704 to intermediate position 705, as indicated by arrow 709. For example, in one aspect, intermediate position 705 may be displaced a distance 710 from first position 704. Specifically, in one aspect, the elevation of intermediate position 705 may be displaced, for example, vertically displaced, for instance, in a plane substantially perpendicular to the plane defined by the angle α. In one aspect, the distance 710 may range from about 1 inch to about 12 inches, for example, depending upon the size and the nature of articles 702. In one aspect, when articles 702 comprise frozen hamburgers, distance 710 may range from about zero inches to about 3 inches, for example, about 1 inch.

Figure 45:
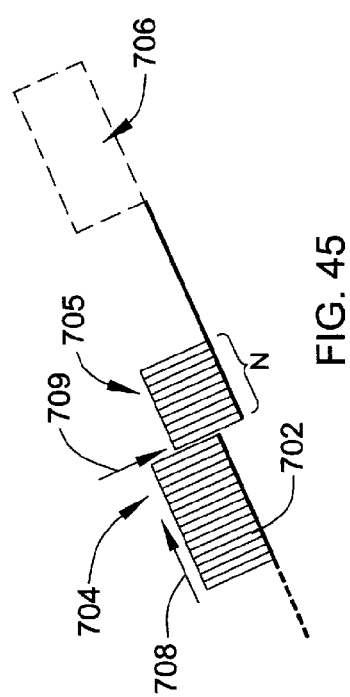
FIG. 45 is a schematic side elevation view of the single transfer of articles shown in FIG. 44 from a first position to an intermediate position where a predetermine number of articles have been accumulated in the intermediate position according to an aspect of the invention.

FIG. 45 is a schematic side elevation view of the single transfer of articles 702 shown in FIG. 44 from first position 704 to intermediate position 705 where a predetermine number, N, of articles 702 have accumulated in the intermediate position 705 according to an aspect of the invention. The predetermined number N may vary from 2 to 60, but is typically between about 12 and 30. The detection of the predetermined attribute of the articles 702, for example, the number of articles 702, in intermediate position 705 may be practiced by conventional means, for example, visually, or tactilely (that is, by hand) by a human attendant or by conventional sensors or detectors.

FIG. 46 is a schematic side elevation view of the single transfer of articles 702 shown in FIG. 45 where the predetermined attribute (in this case, the number) of articles N accumulated in the intermediate position 705 are transferred to an intermediate or staging area or staging position 712 prior to advancing to the second position 706 according to an aspect of the invention. In one aspect, the transfer from intermediate position 705 to staging position or area 712 comprises transfer along a path from intermediate position 705 to staging position or area 712, for example, along the path defined by a channel or trough. The transfer from intermediate position 705 to staging position 712 is indicated by arrow 714 in FIG. 46. According to aspects of the invention, prior to, during, and after the transfer indicated by arrow 714 takes place, articles 702 may typically continue to advance from first position 704 to intermediate position 705 as indicated, for example, by arrow 709. As discussed below, the transfer of articles 702 from intermediate position 705 to staging position 712 indicated by arrow 714 may be practiced by conventional means, for example, conventional electrical, mechanical, pneumatic and/or hydraulic actuators.

FIG. 47 is a schematic side elevation view of the single transfer of articles 702 shown in FIG. 46 where the predetermined number of articles N that are transferred to staging position 712 are then transferred to the second position 706 according to an aspect of the invention. The transfer of articles 702 from staging position 712 to second position 706 is indicated by arrow 716 in FIG. 47. Again, according to aspects of the invention, prior to, during, and after the transfer indicated by arrow 716 takes place, articles 702 may typically continue to advance from first position 704 to intermediate position 705 as indicated, for example, by arrow 709. As discussed below, the transfer from staging position 712 to second position 706 indicated by arrow 716 may be practiced by conventional means, for example, conventional electrical, mechanical, pneumatic, and/or hydraulic actuators.

The transfer of articles 702 from first position 704 to second position 706 may be affected by a broad range of systems and devices according to aspects of the present invention. One system for practicing this desired transfer is illustrated and described with respect to the system shown in FIGS. 48 through 61.

According to aspects of the invention, the transfer of articles 702 from first position 704 to second position 706 (for example, into a gripping device) illustrated and described with respect to FIGS. 43 through 47 may be practiced by any conventional means, for example, conventional electrical, mechanical, pneumatic, and/or hydraulic actuators, and by any conventional sensing, detection, and control devices. However, according to one aspect, the transfer that characters the aspects of the invention shown in FIGS. 43 through 47 may be practiced by the devices, methods, and systems disclosed and described with respect to FIGS. 48 through 65.

FIG. 48 is a schematic side elevation view of a system 800 for processing a single set of articles 802 according to another aspect of the invention. Again, as noted previously, system 800 represents a single transfer of what typically comprises multiple transfers provided by multiple parallel devices according to aspects of the invention. Each of the multiple parallel devices substantially appears and functions as shown a described with respect to FIGS. 48 and 49. FIG. 49 is a top plan view of system 800 shown in FIG. 48. System 800 shown in FIGS. 48 and 49 was designed and built by the present inventor in order to evaluate aspects of the present invention. System 800 was designed and built to provide and handle a single row of articles 802; however, the arrangement, operation, and performance of the single-row system 800 shown in FIGS. 48 and 49 is understood to be readily adaptable to the handling of multiple, typically, parallel and simultaneous streams of articles 802, as consistent with other aspects of the invention disclosed herein. Accordingly, though system 800 shown in FIGS. 48 and 49 may illustrate the transfer of a single row or set of articles 802, for example, hamburgers 802, it is to be understood that aspects of the present invention typically receive and efficiently and effectively handle one or more rows or sets of articles 802.

As shown in FIGS. 48 and 49, system 800 may typically include an article feed system 810 and an article receiver system 820, where article feed system 810 is adapted to feed articles 802, for example, hamburgers 802, to article receiver system 820. System 800 may also typically include an article transfer system 830 and an article-gripping device 840, where article transfer system 830 is adapted to receive articles 802 from receiver system 820 and transfer the received articles to the gripping device 840. Gripping device 840 may be any gripping device adapted to receive articles 802, for example, a gripping device mounted to an arm end of an articulating robotic manipulator (not shown). In one aspect, gripping device 840 may be similar or identical to gripping device 30 or gripping device 130 shown and described with respect to FIGS. 1 through 14 herein.

According to aspects of the invention, feed system 810 may comprise any conventional article feed system adapted to introduce articles 802 to receiver system 820. For example, where feed system 810 in FIGS. 48 and 49 provides a single row of articles 802 to receiver system 820, according to aspects of the invention, system 800 may include a feed system 810 adapted to feed a plurality of rows of articles 802, for example, 2 to 24 rows of articles 802.

In the aspect of the invention shown in FIGS. 48 and 49, feed system 810 comprises a belt conveyor 811 mounted on supports 812 and driven by motor 813 and chain drive 814. As shown, for the evaluation purposes, belt conveyor 811 receives articles 802 via a column-feeding device 815 adapted to introduce articles 802 to belt conveyor 811. Though other types of column feeding devices 815 may be used for aspects of the invention, for this evaluation system 800, column-feeding device 815 included a plurality of spaced vertical bars or rods 816 adapted to receive and retain articles 802 inserted, for example, manually, to column feeding device 815 and discharge articles 802 to belt conveyor 811. The articles 802 introduced to the belt of belt conveyor 811 are discharged from belt conveyor 811, for example, under the force of gravity, to receiver 820 as indicated at 818.

One receiver system 820 and one transfer system 830 that may be used according to aspects of the invention are shown and described in detail with respect to FIGS. 50 through 61.

FIG. 50 is detailed view of the discharge of receiver 820 and transfer system 830 shown in FIG. 48 as identified by Detail 50 shown in FIG. 48. FIG. 51 is a top plan view of the discharge of receiver 820 and transfer system 830 shown in FIG. 50. A representative gripping device 840 is shown in phantom in FIGS. 50 and 51.

According to aspects of the invention, receiver 820 may comprise any conventional receiver 820 adapted to receive articles 802, for example, hamburgers 802, from a conveyor feed system 810. For example, receiver 820 may typically receive articles 802 and produce one or more columns or stacks 805 articles 802, for instance, columns or stacks 805 positioned and advanced through troughs or channels 822 as disclosed herein. However, in one aspect of the invention, receiver 820 may comprise a receiver provided by RMF Steel Products Company, or its equivalent, for example, in one aspect, receiver 18 may comprise an RMF "Patty Stacker," or its equivalent. For the sake of illustration, only a portion of the one or more columns or stacks 805 is shown in FIG. 50, and the remainder of the one or more columns 805 is represented by dashed line 807 of indeterminate number and length.

As shown in FIGS. 50 and 51, transfer system 830 is adapted to receive the one or more columns 805 of articles 802 from receiver system 820. As shown, transfer system 830 may comprise an extension or an addition to the troughs 822 of receiver system 820. In one aspect, as shown most clearly in FIG. 50, transfer system 830 may comprise one or more troughs 832 displaced from troughs 24, for example, whereby hamburgers 802 are discharged at one elevation from troughs 822 and received at another, typically lower, elevation, for example, under the force of gravity, in one or more troughs 832. Specifically, in one aspect, the elevation of the working surface of troughs 832 may be displaced, for example, vertically displaced in a plane substantially perpendicular to the plane defined by the angle α, from the elevation of the working surface of troughs 822. In one aspect, distance between the working surfaces of trough 822 and trough 832 in a plane substantially perpendicular to the angle α may range from about 0 inches, that is, troughs 832 may be co-linear or line-to-line with troughs 822, to about 6 inches, for example, depending upon the size and the nature of articles 802. In one aspect, when articles 802 comprise hamburgers, the distance between the working surfaces may range from 0 to 3 inches, for example, about 1 inch.

According to aspects of the invention, transfer system 830 provides a location in which hamburgers 802 may accumulate and be positioned for transfer into gripping device 840 (shown in phantom). For example, according to one aspect of the invention, the elevation of working surface of troughs 832 of transfer system 830 may be substantially collinear with the elevation of the working surface of gripper device 840 (shown in phantom). That is, in one aspect, transfer system 830 may be adapted to align the hamburgers 802 for proper transfer and/or insertion and/or acceptance in gripping device 840.

As shown in FIGS. 50 and 51, transfer system 830 may typically include one or more transfer devices 850, that is, one or more devices adapted to transfer hamburgers 802 along trough 832 of transfer system 830 to gripping device 840. Though any conventional transfer device adapted to transfer hamburgers may be used according to aspects of the invention, in the aspect shown in FIGS. 50 and 51, transfer device 840 comprises one or more actuators, for example, one or more linear actuators, liner displacement transducers, and the like, for instance, an actuator referred to as a "cross pusher" in the art. Transfer device 850 may be hydraulically driven, pneumatically driven, electrically driven, and/or mechanically driven. Some examples or transfer devices that may be used with aspects of the invention are described and illustrated with respect to FIGS. 52-61.

FIG. 52 is a schematic side elevation view, partially in cross section, of one receiver system 920 and one transfer system 930 that may be used for receiver system 820 and transfer system 830 shown in FIGS. 50 and 51 according to an aspect of the invention. Again, as noted previously, the transfer system 930 shown in FIG. 52 may comprise one transfer of one or more transfer systems 930 that may be used according to aspects of the invention. With respect to the aspect of the invention shown in FIGS. 43 through 49, the transfer system 930 shown in FIG. 52 may be used to transfer articles 902 received from a first position 904 (position 704 as shown in FIGS. 43 through 47) to an intermediate position 905 (position 705 as shown in FIGS. 43 through 47), then to a staging or intermediate position 908 (position 712 as shown in FIGS. 43 through 47), and then to second position 906 (position 706 as shown in FIGS. 43 through 49).

As shown in FIG. 52, transfer system 930 is adapted to receive the one or more columns or stacks 901 of articles 902 from receiver system 920 as articles 902 advance along channel or trough 922 as indicated by arrow 907. As shown, transfer system 930 may comprise one or more troughs 932 displaced from troughs 922, for example, whereby articles 902 are discharged at one elevation from troughs 922 and received at another, typically lower, elevation, for example, under the force of gravity, in one or more troughs 932, as discussed previously.

As shown in FIG. 52, transfer system 930 may typically include one or more transfer devices 950 and 960, that is, one or more devices adapted to transfer hamburgers 902 along trough 932 of transfer system 930 to second position 906, for example, to a gripping device (not shown). Though any conventional transfer devices adapted to transfer hamburgers may be used for transfer devices 950 and 960 according to aspects of the invention, in the aspect shown in FIG. 52, transfer device 950 may typically comprise a translatable transporter or "pusher" 952 adapted to engage articles 902 positioned in intermediate position 905 and transfer articles 902 along trough 932 at least partially toward second position 906. (See FIGS. 62-65 for a detailed view of one transporter 952 that may be used.) Transporter 952 may be a reciprocating device, as indicated by double arrow 954. According to the aspect of the invention, transporter 950 is positioned and shaped to contact the lower most of articles 902 positioned in position 905 and push or advance the one or more articles 902 along trough 932. For example, in one aspect, as shown, transporter 905 includes a main body 911 and one or more projections 910 from main body 911. In the aspect shown, main body 911 includes a working surface adapted to contact the lower most of articles 902 positioned in position 905 and push or advance the one or more articles 902 along trough 932.

According to aspects of the invention, one or more projections 910 may be adapted to engage a moving device, for example, coupled to a hydraulic or pneumatic piston or a solenoid to translate projection 910 and main body 911 where, for example, main body 911 contacts and translates one or more articles 902 along trough 932. In one aspect, the shape of the working surface of main body 911 may be shaped to conform to the surface of trough 932, for example, the working surface of main body 911 may be v-shaped, rectangular, actuate, or semi-circular, among other shapes, whereby the working surface conforms to the shape of trough 932. In another aspect of the invention, the cross sectional shape of the main body 911 may be shaped to conform to the surface of trough 932, for example, the cross sectional shape of main body 911 may be v-shaped, rectangular, actuate, or semi-circular, among other shapes, whereby the main body conforms and is at least partially guided by the shape of trough 932. Accordingly, it is envisioned that at least one of the cooperating surfaces of main body 911 and trough 932 may be provided with a friction reducing material, for example, a polytetrafluoroethylene (PTFE), such as, DuPont's TEFLON® PTFE, or a Saint-Gobain's RULON® PTFE, or their equivalent.

As also shown in FIG. 52, transfer device 960 may typically comprise a translatable transporter or "pusher" 962 adapted to engage articles 902 positioned in an intermediate, or staging, position 908 along trough 932 and transfer articles 902 along trough 932 at least partially toward second position 906. In one aspect, transporter 962 is adapted to transfer articles 902 to second position 906, for example, into a gripping device (not shown in FIG. 2). Transporter 962 may be a reciprocating device, as indicated by double arrow 964, and a rotating device, as indicated by double arcuate arrow 966. According to this aspect of the invention, transporter 962 is positioned and shaped to contact the lower most article of articles 902 positioned in staging area or position 908 and push or advance the one or more articles 902 along trough 932 and, for example, into second position 906.

For example, in one aspect, as shown, transporter 962 includes a main body 968 mounted to a rotatably mounted arm 970. In the aspect shown, main body 911 includes a working surface adapted to contact the lower-most article of the articles 902 positioned in position 908, and push or advance the one or more articles 902 along trough 932. In this aspect, transporter 962 is adapted to rotate about an axis whereby main body 968 passes through an opening or slot 933 in trough 932 to engage articles 902, and then transporter 962 is adapted to translate in the direction of arrow 964 and thereby transfer articles 902 to second position 906. According to aspects of the invention, transporter 962 may be adapted to engage a moving device, for example, coupled to a hydraulic or pneumatic piston or a solenoid to translate and/or rotate transporter 962 to contact and translate one or more articles 902 along trough 932. This movement and operation of transfer devices 950 and 960 are elaborated upon in FIGS. 53 to 61.

FIG. 53 is a schematic side elevation view, partially in cross section, of the receiver system 920 and transfer system 930 shown in FIG. 52 illustrating the transfer of articles 902 from first position 904 to intermediate position 905 according to an aspect of the invention. According to aspects of the invention, prior to, during, and after the transfer indicated by arrow 907 in FIG. 53 takes place, articles 902 may typically continue to advance from first position 904 to intermediate position 905 as indicated, for example, by arrow 909. This transfer from the end of trough 922 of receiver system 920 at one elevation to trough 932 at a typically lower elevation may typically be effected by the force of gravity as the articles advance along trough 922, though other means of transferring articles 902 from trough 922 to trough 932 may be used.

FIG. 53 also illustrates the optional use of one or more retainers 919 (shown in phantom in FIG. 53) that may be used according aspects of the invention. One or more retainers 919 may be positioned along or adjacent intermediate position 905 to minimize or prevent the likelihood of articles 902 toppling over while progressing along transfer system 930. For example, when the angle of inclination a (see FIG. 50) of receiver system 920 is shallow, for example, less than 30 degrees, the position of the center gravity of articles 902 while articles 902 progress along transfer system 30 may be sufficiently forward that articles 902 may be prone to topple over from their desired erect position shown in FIG. 53. According to one aspect, one or more retainers 919 may be positioned along or adjacent intermediate position 905 or along or adjacent transfer system 930 to minimize or prevent articles 902 from toppling. Retainers 919 may be flexible, resilient, or biased projections adapted to maintain articles 902 in their desired erect orientation. For example, one or more retainers 919 may contact articles 902 and prevent articles 902 from toppling, while allowing articles 902 to progress along transfer system 930, either while being advanced with the advancement of adjacent articles 902 or advanced by a transfer mechanism, such as, transfer device 950. Retainers 919 may comprise flexible plastic or elastomeric projections or "flaps" mounted adjacent or along transfer system 930, or retainers 919 may comprise spring-biased metal or plastic projections or "fingers" mounted adjacent or along transfer system 930.

FIGS. 54 and 55 are schematic side elevation views, partially in cross section, of the receiver system 920 and transfer system 930 shown in FIG. 53 illustrating the accumulation of articles having a predetermined attribute (for example, a predetermined number N, weight W, and/or length L) of articles 902 in intermediate position 905 according to an aspect of the invention. As the articles 902 continue to advance in trough 922 of receiver system 920—as indicated by arrow 907—and are discharged to transfer system 930, the articles 902 accumulate in position 905. According to aspects of the invention, once a predetermined attribute (N, W, and/or L) of articles 902 are positioned in intermediate position 905, the stack 912 of articles 902 is transferred to intermediate or staging position or area 908. In one aspect, the transfer from intermediate position 905 to staging position or area 908 comprises transfer along a path from intermediate position 905 to staging position or area 908, for example, along the path defined by a channel or trough 932. This transfer of stack 912 to intermediate position 908 is represented by the arrow 914 shown FIG. 55. The predetermined attribute, in this case number N, of articles 902 in transferred stack 912 may vary from a number of articles 902 from 2 to 60, but is typically between about 12 to 30 articles 902. As shown in FIG. 55, the transfer of the stack 912 having predetermined number N of articles 902 may be practiced through the deflection of transfer device 950 as indicated by arrow 916. For example, in the aspect shown in FIG. 55, the deflection of transfer device 950 may be practiced by engaging and deflecting projection 910, thereby deflecting main body 911 of transporter 952, and contacting and deflecting the lower most article 902 of stack 912. According to aspects of the invention, the engagement and deflection of projection 910 and the deflection of main body 911 may be effected by conventional means, for example, manually, pneumatically, hydraulically, and/or mechanically, for example, by means of cams, levers, belts, and/or pulleys, and the like. As shown in FIGS. 50 and 51, the deflection of transporter 952 may be practiced using one or more pneumatic or hydraulic pistons coupled to transporter 952 by conventional means and actuated in response to user input and/or a programmable controller.

The counting, sensing, or detection of the presence of a predetermined attribute (N, W, and/or L) of articles 902 in intermediate position 905 may be practiced by conventional sensor technology, for example, conventional sensors or detectors. In one aspect, the detection of the attribute of articles 902 at intermediate position 905 may be by detection of a predetermined weight, detection of a predetermined length of stack 912, and/or detection of a predetermined number N of articles 902. In one aspect, the predetermined number N of articles 902 may be sensed or detected by means of one or more biased levers or pawls, for example, one or more spring-biased or weight-biased levers or pawls, positioned to contact articles 902, adapted to deflect in the presence or passage of articles 902, and operatively connected to one or more electrical contacts or electrical devices. The electrical contacts or electrical devices may be adapted to detect and/or record and/or transmit a signal based upon the contact and/or deflection of the one or more levers or pawls.

As also shown in FIG. 55, during and after the transfer of stack 912 from intermediate position 905 to intermediate or staging position 908, articles 902 may continue to advance along trough 922 of receiver system 920—as indicated by arrow 907—and be discharged to transfer system 930—as indicated by arrow 909. Therefore, in one aspect, main body 911 of transporter 952 may be adapted to receive articles 902 while transporter 952 is deflected as shown in FIG. 55. Specifically, in one aspect, main body 911 may be shaped or positioned to receive articles 902. For example, main body 911 may be elongate and have a cross sectional shape in a plane perpendicular to the axis of elongation having an arcuate, a circular, or a semicircular shape; in another aspect, the cross section of main body 911 may by polygonal or ellipsoidal. According to aspects of the invention, the shape of main body 911 of transporter 952 may vary depending upon the shape of the article 902 being handled by aspects of the invention. See FIGS. 62-65 for one example of a transporter 952 that may be used with aspects of the invention.

FIGS. 56 and 57 are schematic side elevation views, partially in cross section, of the receiver system 920 and transfer system 930 shown in FIG. 55 illustrating the retention of stack 912 having a predetermined attribute (N, W, and/or L) of articles 902 in intermediate or staging position 908 according to an aspect of the invention. As shown in FIG. 56, after transfer of stack 912 to intermediate position 908, stack 912 may be at least momentarily retained in intermediate position 908 prior to transfer to second position 906 (shown in phantom) as shown in FIG. 58. In one aspect, the transfer from staging position 908 to second position 906 may take place substantially immediately after transfer of stack 912 to staging position 908; in other aspects, stack 912 may be retained in staging position 908 for a delay time of about 0.5 seconds to about 1 minute, for example, to await the appropriate positioning of a gripping device in second position 906, among other reasons for delay.

As shown in FIG. 56, stack 912 may be retained in intermediate or staging position or area 908 by means of a retainer, for example, a moveable retainer, such as, by means of transfer device 960. Specifically, in one aspect, transporter 962 of transfer device 960 may be rotated into engagement with stack 912 as indicated by curved arrow 963. According to this aspect, with rotation of transporter 962, main body 968 of transporter 962 may contact the lower-most article of stack 912 and retain stack 912 in intermediate position 912. This rotation of transporter 962 indicated by curved arrow 963 may be effected by conventional means, for example, manually, pneumatically, hydraulically, and/or mechanically, for example, by means of cams, levers, belts, and/or pulleys, and the like. As shown in FIGS. 50 and 51, the deflection and rotation of transporter 962 may be practiced using one or more pneumatic or hydraulic pistons coupled to transporter 962 by conventional means and actuated in response to user input and/or a programmable controller.

As shown in FIG. 56, in order to allow this rotation of transporter 962 and engagement with stack 912, main body 911 of transporter 952 may typically include an opening or slot 913 sized and positioned to permit passage of main body 968 of transporter 962. (See FIGS. 62-65 for detailed views of transporter 952.) In addition, in one aspect, trough 932 of transfer system 930 may also include an opening or slot 915 sized and positioned to permit passage of main body 968 of transporter 962.

As shown in FIG. 57, while stack 912 is retained in intermediate position 908, for example, due to rotational engagement of transporter 962, transporter 952 of transfer device 950 may be deflected or retracted—as indicated by arrow 917—to an original position. For example, in the aspect shown in FIG. 57, the deflection or retraction of transfer device 950 may be practiced by engaging and deflecting projection 910. According to aspects of the invention, the engagement and deflection of projection 910 may be effected by conventional means, for example, manually, pneumatically, hydraulically, and/or mechanically, for example, by means of cams, levers, belts, and/or pulleys, and the like. As shown in FIGS. 50 and 51, the deflection of transporter 952 may be practiced using one or more pneumatic or hydraulic pistons coupled to transporter 952 by conventional means and actuated in response to user input and/or a programmable controller.

FIGS. 58 and 59 are schematic side elevation views, partially in cross section, of the receiver system 920 and transfer system 930 shown in FIG. 57 illustrating the transfer of stack 912 of articles 902 from intermediate or staging position 908 to the second position 906 according to an aspect of the invention. As noted above, this transfer to second position 906—as indicated by arrow 918—may occur substantially immediately after transfer of stack 912 to staging position 908 or after a time delay.

As shown in FIG. 59, after transfer of stack 912 to second position 906, and typically subsequent retention by a gripping device (not shown), transfer device 960 may be adapted to retract from a position of engagement with stack 912 in second position 906 to a position in preparation for engagement and transfer of a subsequent stack 912. For example, as shown in FIG. 59, in one aspect, the transporter 962 of transfer device 960 may be retracted—as indicated by arrow 921—and rotated—as indicated by curved arrow 923—in preparation for subsequent engagement with a stack 912' accumulating in intermediate position 905. According to aspects of the invention, the rotation indicated by curved arrow 923 and the translation indicated by arrow 921 may be practiced in any time sequence, for example, where rotation occurs first, then translation; or with translation first, then rotation; or with rotation and translation at substantially at the same time. Again, as in other to aspects of the invention, the rotation and translation of transporter 962 may be effected by conventional means, for example, manually, pneumatically, hydraulically, and/or mechanically, for example, by means of cams, levers, belts, and/or pulleys, and the like. As shown in FIGS. 50 and 51, the rotation and translation of transporter 952 may be practiced using one or more pneumatic or hydraulic pistons coupled to transporter 962 by conventional means and actuated in response to user input and/or a programmable controller.

As also illustrated in FIG. 59, stack 912 that was positioned in second position 906, for example, into a gripping device, may be moved from second position 906 as indicated by arrow 925. According to aspects of the invention, the movement indicated by arrow 925 may be practiced substantially immediately after stack 912 is positioned in second position 906; however, in one aspect, stack 912 may be retained in second position 906 for a length of time, for example, predetermined amount of time. In one aspect, stack 912 may be retained in a general position 906 while subsequent stacks 912 are introduced to second position 906, for example, while the position of a gripping device (not shown) is varied to accept subsequent stacks 912 prior to transferring the one or more stacks 912 as indicated by arrow 925, for example, to a container—as illustrated, for example, in FIGS. 62 through 64, among other figures.

After retraction of transfer device 960 as indicated in FIG. 59, the sequence of operations illustrated and described with respect to FIGS. 52 through 59 may be repeated, as needed, to accumulate the desired number of stacks 512 in second position 906, for example, retained by a gripping device (not shown), such as, gripping device 30 or 130 disclosed herein.

FIGS. 60 and 61 are schematic side elevation views, partially in cross section, of the receiver system 920 and transfer system 930 shown in FIGS. 53 through 59 having a stack separating system or "gate" system 980 according to another aspect of the invention. The aspect of the invention shown in FIGS. 60 and 61 may typically include all the structures and devices disclosed and described with respect FIGS. 53-59, for example, a receiver system 920, transfer system 930, and transfer devices 950 and 960, but also includes one or more stack separating systems 980. As the articles 902 in stack 901 continue to advance in receiver system 920—as indicated by arrow 907—and are discharged to transfer system 930, the articles accumulate in position 905. According to this aspect of the invention, stack separator system or "gate" system 980 may be used for aspects of the invention to assist in separating or isolating the stack 901 in first position 904 from the stack 912 in intermediate position 905. Again, as disclosed herein, according to aspects of the invention, once a predetermined attribute (N, W, and/or L) of articles 902 are positioned in intermediate position 905, the stack 912 of articles 902 is transferred to intermediate or staging position 908. This transfer of stack 912 to intermediate position 908 is represented by the arrow 914 shown FIG. 61.

In one aspect of the invention, the separation of stack 901 in first position 904 may be assisted by stack separation system 980. For example, in one aspect of the invention, the top most article 902 in stack 901 located at or near first position 904 may undesirably not remain in first position 904 when stack 912 is transferred to staging position 908, for example, during transfer with transfer device 950. For example, during contact and transfer of articles 902 upon impact and translation of main body 911 of transfer device 950, one or more articles 902 positioned at or near first position 904 may, for example, under the influence of gravity, undesirably topple or fall from first position 904 to intermediate position 905. This undesirable toppling of articles 902 may interfere with the desired number of N articles transferred to intermediate position 908, may interfere with the subsequent transmission of articles 902 from first position 904 to intermediate position 905, or may cause the dislodgement or mishandling of articles 902, among other undesirable effects. The tendency of articles 902 to undesirably topple from first position 904 to intermediate position 905 may be a function of the nature and type of articles handled by aspects of the invention, for example, articles 902 that exhibit more adherence to an adjacent article, such as, frozen hamburger patties, which may be more prone to undesirably topple from first position 904 to intermediate position 905. According to aspects of the present invention shown in FIGS. 60 and 61, the undesirable toppling of articles 902 from first position 904 to intermediate position 905 may be minimized or preferably eliminated with the use of stack separation system 980.

As shown in FIG. 60, stack separation system 980 typically includes a housing or structure 982 and a translatable or movable gate or baffle 984 adapted to move or deflect in relation to housing or structure 982. Housing 982 may be stationary, for example, rigidly mounted to an adjoining structure (not shown). In one aspect, gate or baffle 984 is adapted to forcibly separate adjacent articles 902, for example, by impacting the article 902 defining the predetermined attribute at the elevation of the outlet of the trough 922 of the receiver system 920 with the translatable gate 984. Gate or baffle 984 may comprise a barrier that deflects or translates as indicated by arrow 986, though gate or baffle 984 may linearly deflect or pivotally rotate about a pivot point (not shown). According to aspects of the invention, the rotation, translation, or defection of gate or baffle 984 may be effected by conventional means, for example, manually, pneumatically, hydraulically, and/or mechanically, for example, by means of cams, levers, belts, and/or pulleys, and the like. In the aspect of the invention, shown in FIGS. 60 and 61, gate or baffle 984 may be operatively connected to one or more movable pistons, for example, one or more hydraulic or pneumatic pistons (not shown) positioned in housing 982. As is typical of aspects of the invention, the means for actuating stack separation system 980 may be conventional, for example, actuated in response to user input and/or a programmable controller.

As shown most clearly in FIG. 61, when the desired number N of articles 902 are accumulated in intermediate position 905, prior to or substantially at the same time the transfer device 950 is actuated so that main body 911 contacts and deflects the lower most article of stack 912 and transfers stack 912 to intermediate position 912, stack separation system 980 may be actuated. Upon actuation, translatable or movable gate or baffle 984 is moved or deflected as indicated by arrow 988 and gate or baffle 984 is positioned to obstruct the advancement of the upper most article 902 in stack 901 in first position 904, for example, by retaining a subsequent article 902 at the elevation of the trough 922 of receiver system 920.

According to aspects of the invention, gate or baffle 984 may be sized and positioned to at least partially obstruct the advancement of articles 902 in first position 904. In other aspects, gate or baffle 984 may be substantially completely obstructing the advancement of articles 902. The actuation of stack separation system 980 and the obstruction of arches 902 by gate or barrier 984 may be momentary or have a predetermined duration, for example, from about 0.10 seconds to about 2 seconds, for instance, depending upon the rate of advancement of articles 902 in stack 901 in receiver system 920.

After actuation of stack separation system 980, gate or barrier 984 is retracted, for example, to the position shown in FIG. 60, where articles 902 in first position 904 may continue to discharge to transfer system 930, for example, to accumulate on main body 911 of transfer device 950 while, for example, stack 912 is being transferred to and retained in intermediate or staging position 908. Accordingly, in this aspect, by obstructing articles 902 with gate or barrier 984 the likelihood of articles 902 undesirably toppling into intermediate position 905 is minimized or eliminated.

As also shown in FIG. 61, aspects of the invention may include one or more article retainer bars or rods 992 (shown in phantom) and/or bars or rods 994 (shown in phantom). In one aspect of the invention, bars 992 and/or bars 994 may be associated with stack separation system 980, for example, mounted to housing 982 and/or mounted to and moveable with gate 984. However, in other aspects of the invention, bars 992 and/or 994 may not be associated with stack separation system 980, for example, bars 992 and/or bars 994 may be appropriately mounted and positioned to receiver system 920 and/or transfer system 930 to provide their desired function.

According to this aspect of the invention, one or more bars or rods 992 may be mounted above articles 902 in stack 901 of receiver system 920 and positioned to contact and retain articles 902 that may become dislodged from stack 901, for example, due to the means of transferring articles 902 along receiver system 920, for instance, due to the size and shape of articles 902 or due to the operation of receiver system 920. For example, when receiver system 902 comprises an oscillating feeder device that may agitate the articles 902 in stack 901, one or more bars or rods 992 may be provided to minimize or prevent the movement or dislodgement of articles 902 out of the stack 901, which could undesirably effect the operating of aspects of the invention.

Similarly, according to this aspect of the invention, one or more bars or rods 994 may be mounted above articles 902 in stack 912 of transfer system 930 and positioned to contact and retain articles 902 that may become dislodged from stack 912, for example, due to the means of transferring articles 902 along transfer system 930, for instance, due to the size and shape of articles 902 or due to the operation of transfer system 930. For example, when the transfer of articles from receiver system 920 to transfer system 930 causes one or more articles to become dislodged from stack 912 in intermediate position 905, one or more bars or rods 994 may be provided to minimize or prevent the movement or dislodgement of articles 902 out of the stack 912, which could undesirably effect the operation of aspects of the invention.

Depending upon the shape and size of bars or rods 992, 994, bars or rods 992, 994 may comprise a plurality of bars or rods positioned above articles 902, for example, uniformly distributed above and/or about the centerline of stack 901 or stack 912, respectively. Article retainer bars or rods 992 and/or bars or rods 994 may have any appropriate width, diameter, or cross section, for example, depending upon the nature and/or shape of the articles 902 being handled. For example, bars or rods 992, 994 may circular, square, or rectangular in cross section. In one aspect, one or more bars or rods 992, 994 may be uniquely shaped to accommodate the size and or shape of the articles being handled. For example, bars or rods 992, 994 may comprise one or more bars or rods having a concavity shaped to accommodate the articles being handled, for example, an arcuate concavity or recess shaped to conform to the shape or size of articles 902. The length of bars or rods 992, 994 may also vary depending upon the size and shape of articles 902 or the number of articles being handled, for example, the predetermined number of articles N being transferred.

The one or more bars or rods 992, 994 may be metallic or non-metallic. For example, in one aspect, bars or rods 992, 994 may be made from a plastic, for example, from plastic, for example, a polyamide (PA), for example, nylon; a polyethylene (PE), a polypropylene (PP); a polyester (PE); a polytetrafluoroethylene (PTFE); a polystyrene (PS); an acrylonitrile butadiene styrene (ABS); a polycarbonate (PC); or a polyvinylchloride (PVC); or an acetal resin, such as, DuPont's Delrin® acetal resin, or its equivalent, among other plastics. In another aspect, bars or rods 992, 994 may be made from a corrosion-resistant metal, for example, a stainless steel, such as, 304 stainless steel; an aluminum; or a titanium, among other metals.

FIG. 62 is a side elevation view of one transporter 952 that may be used in transport device 950 of according to one aspect of the invention. FIG. 63 is a top plan view of the transporter 952 shown in FIG. 62. FIG. 64 is a left side elevation view of the transporter 952 shown in FIG. 62 and FIG. 65 is a right side elevation view of the transporter 952 shown in FIG. 62. As shown in FIGS. 62 through 65, transporter 952 may comprise an elongated main body 911 having one or more projections 910. One or more projections 910 are typically positioned, sized, and adapted to engage a transfer device, for example, a hydraulic or pneumatic piston, a solenoid, a lever, bar, cam, or other mechanical actuator whereby transporter 952 can be manipulated. As shown in FIGS. 62 and 63, main body 911 may comprise one or more elongated bars or channels 996 defining at least one though hole or slot 913. As discussed above, hole or slot 913 is positioned and sized to allow for the passage of transporter or "pusher" 962 of transfer device 960. The one or more elongated bars or channels 996 may typically be joined by one or more end plates 998 mounted by mechanical fasteners or welding to bars or channels 996. The one or more end plates 998 may have a thickness ranging from about 0.125 inches to about 6 inches, but is typically between about 0.25 inches and about 1 inch in thickness, for example, about 0.375 inches in thickness. The one or more projections 910 may comprise a part or portion of the one or more end plates 998. In one aspect, transporter 952 may be provided as one integral component, for example, machined, forged, cast, or otherwise fabricated as a single integral component.

In one aspect, the dimensions of transporter 952 may typically vary depending upon the size of the application, for example, depending upon the number and size of articles being handled by transporter 952. Transporter 952 may have a length ranging from about 6 inches to about 60 inches, but is typically between about 6 inches and about 24 inches in length, for example, about 11-12 inches in length. Transporter 952 may have a width ranging from about 3 inches to about 24 inches, but is typically between about 6 inches and about 12 inches in width, for example, about 5-6 inches in width. Transporter 952 may have a height of main body 11 ranging from about 2 inches to about 24 inches, but is typically between about 4 inches and about 8 inches in width, for example, about 4-5 inches in height.

As shown in FIGS. 64 and 65, end plate 998 and main body 911 may be adapted to receive articles (not shown) or stacks of articles (not shown), for example, frozen hamburger patties or frozen chicken breasts, as described herein. In the aspect shown in FIGS. 64 and 65, end plate 998 and main body 911 provide a recess, cavity, or depression 997 adapted to receive articles. As shown in FIGS. 62 through 65, recesses 997 may include linear angled or beveled sides adapted to receive articles and allow the articles to translate along transporter 952 as desired. As shown in FIG. 64, recess 997 may be a recess having linear sides defining an angle β, for example, an angle ranging from about 30 degrees to about 150 degrees, but is typically between about 60 degrees and 120 degrees, for example, about 90 degrees. However, according to other aspects, recess 997 may have arcuate, circular, semicircular, polygonal, or ellipsoidal sides depending upon the shape and properties of the article being received by transporter 952.

Transporter 952—as one integral part or as an assemblage of components—may be metallic or non-metallic. For example, in one aspect, bars or channels 996 and/or end plates 998 may be made from a plastic, for example, a polyamide (PA), for example, nylon; a polyethylene (PE), a polypropylene (PP); a polyester (PE); a polytetrafluoroethylene (PTFE); a polystyrene (PS); an acrylonitrile butadiene styrene (ABS); a polycarbonate (PC); or a polyvinylchloride (PVC); or an acetal resin, such as, DuPont's Delrin® acetal resin, or its equivalent, among other plastics. In another aspect, bars or channels 996 and/or end plates 998 may be made from a metal, for example, a corrosion-resistant metal, such as, a stainless steel, such as, 304 stainless steel; an aluminum; or a titanium, among a other metals.

Figure 66:
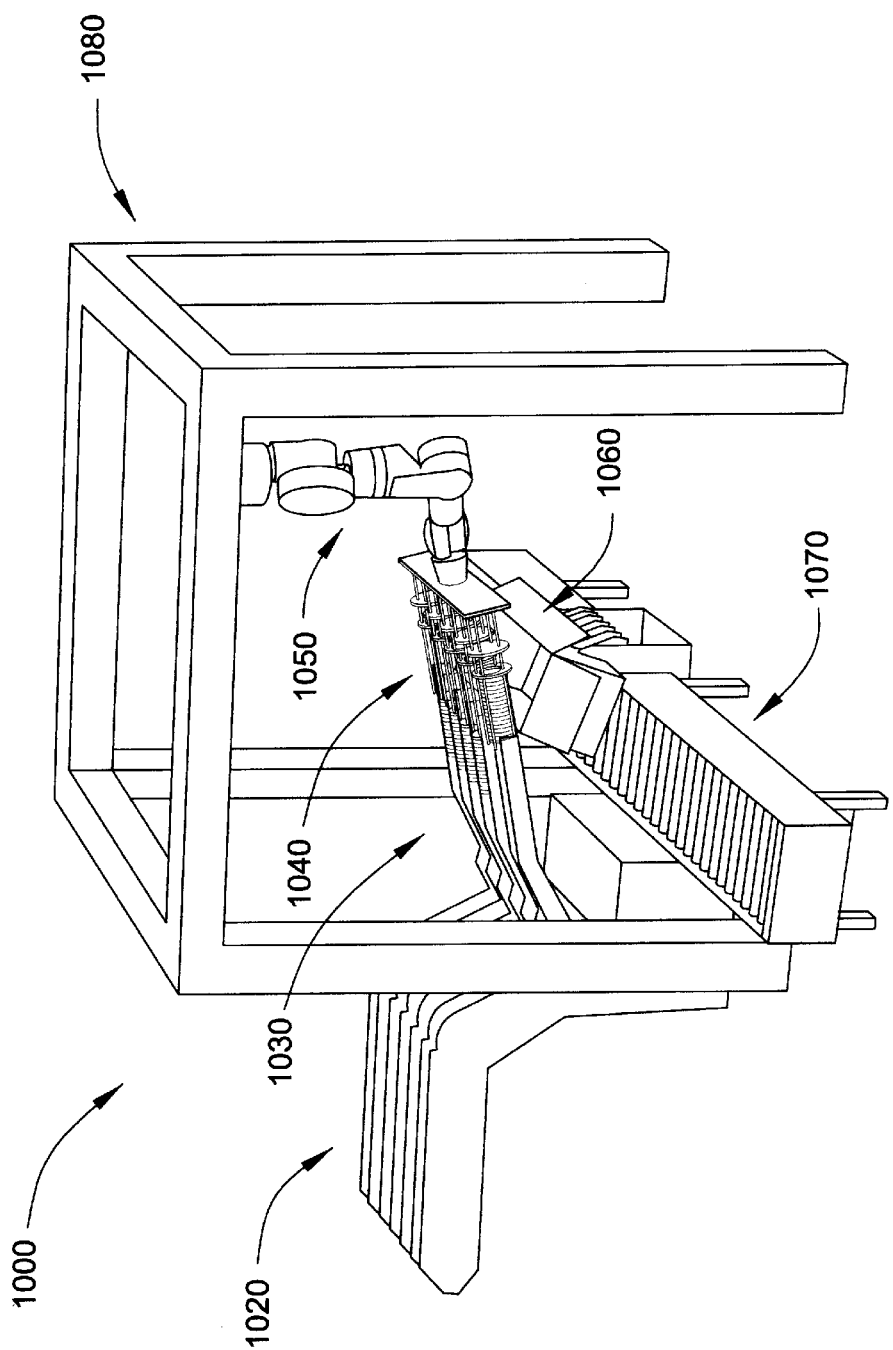
FIG. 66 is a perspective view of a stackable article handling system according to an aspect of the present invention.
Figure 67:
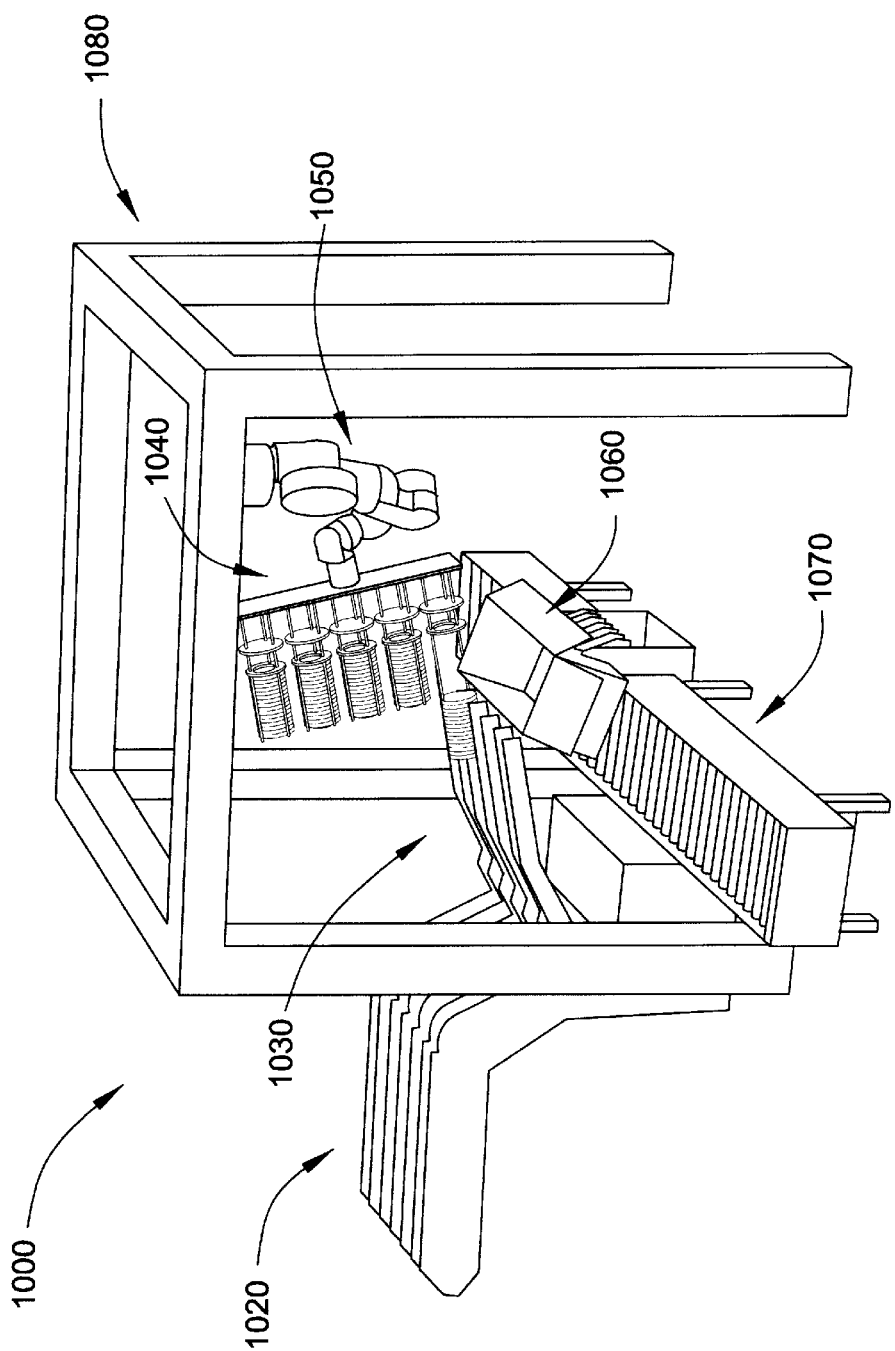
FIG. 67 is a perspective view of the stackable article handling system shown in FIG. 66 illustrating a typical transfer and accumulation of stackable articles in a gripping device according to an aspect of the present invention.
Figure 68:
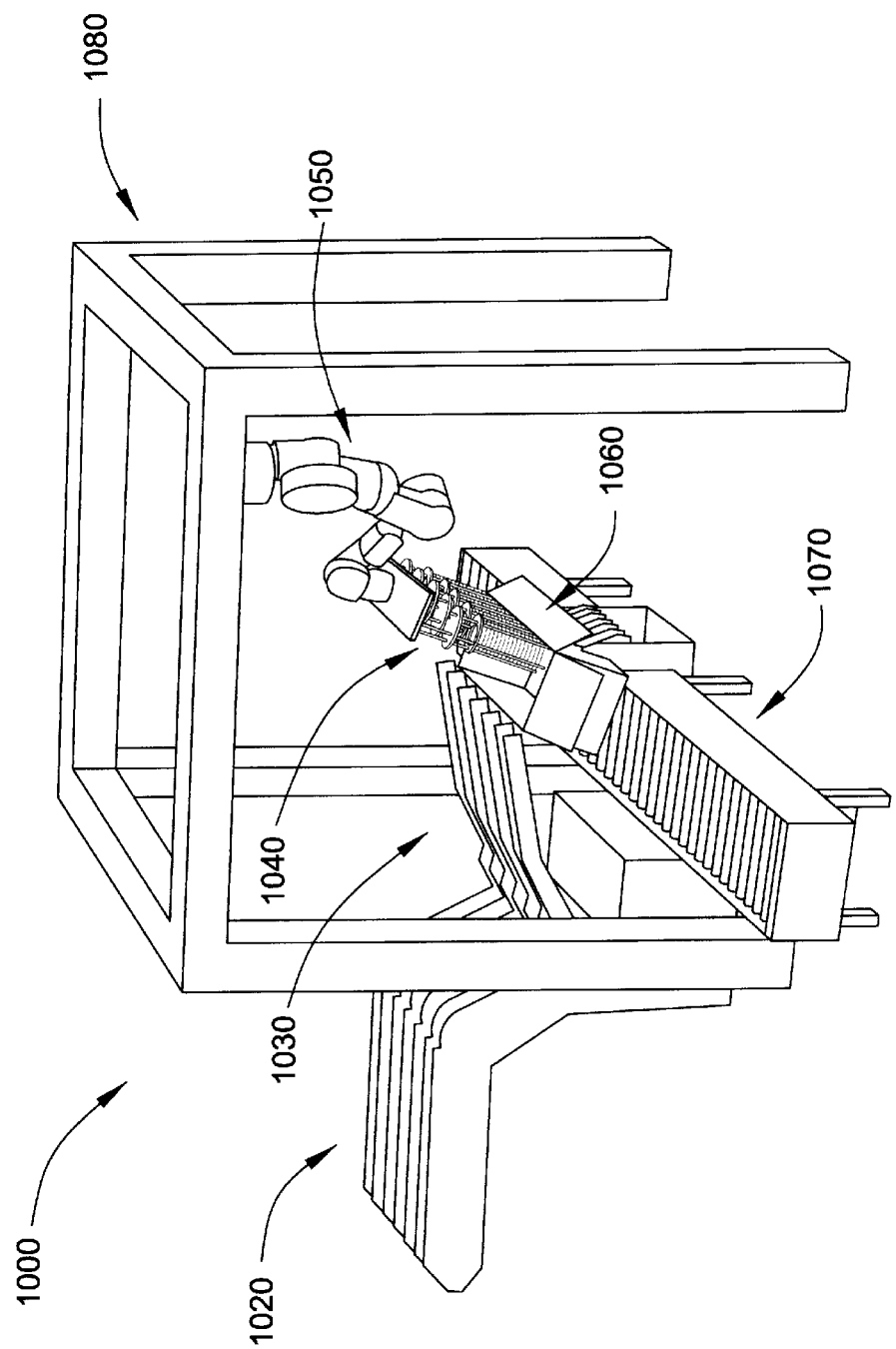
FIG. 68 is a perspective view of the stackable article handling system shown in FIG. 67 illustrating a typical transfer to and release of multiple stacks of stackable articles to a container according to an aspect of the present invention.

FIG. 66 is a perspective view of a stackable article handling system 1000 according to an aspect of the present invention. FIG. 67 is a perspective view of the stackable article handling system 1000 shown in FIG. 66 illustrating a typical transfer and accumulation of stackable articles in a gripping device according to an aspect of the present invention. FIG. 68 is a perspective view of the stackable article handling system shown in FIG. 67 illustrating a typical transfer to and release of multiple stacks of stackable articles to a container according to an aspect of the present invention.

As shown in FIG. 66, stackable article handling system 1000 typically includes a receiver system 1020, a transfer system 1030, a gripping device 1040, a robotic manipulator 1050, a container 1060 for receiving stacked articles, and a container transport device 1070 for transporting containers 1060 to and from handling system 1000. As shown in FIG. 66, one or more of the receiver system 1020, the transfer system 1030, the gripping device 1040, the robotic manipulator 1050, and the container transport device 1070 may be mounted to a frame or structure 1080.

Receiver system 1020 may be any receiver system adapted to function as disclosed herein, for example, receiver system 18 disclosed herein, receiver system 310 disclosed herein, receiver system 418 disclosed herein, receiver system 610 disclosed herein, receiver system 820 disclosed herein, receiver system 920 disclosed herein, or an RMF "Patty Stacker" or its equivalent. As is typical, receiver system 1020 may be positioned and adapted to receive articles, for example, from a conveyor (not shown) for example, a belt conveyor.

Transfer system 1030 may be any transfer system adapted to function as disclosed herein, for example, transfer system 28 disclosed herein, transfer system 330 disclosed herein, transfer system 418 disclosed herein, transfer system 610 disclosed herein, transfer system 820 disclosed herein, transfer system 920 disclosed herein. As is typical, transfer system 1020 may be positioned and adapted to receive articles from receiver system 1020.

Gripping device 1040 in system 1000 shown in FIG. 66 may be any gripping device adapted to function as disclosed herein, for example, gripping device 30 disclosed herein or gripping device 130 disclosed herein. As is typical, gripping device 1040 may be positioned and adapted to receive articles from transfer system 1030.

Robotic manipulator 1050 in system 1000 may be any robotic manipulator adapted to function as disclosed herein. Robotic manipulator 1050 may be a multi-axis robot provided by Motoman Robotics of Miamisburg, Ohio, or its equivalent.

As shown in FIG. 66, gripping device 1040 mounted on robotic manipulator 1050 is positioned and adapted to receive stacks of articles, for example, stacks of frozen hamburgers from transfer system 1030. According to aspects of the present invention, gripping device 1040 may be movable under the influence and control of robotic manipulator 1050 to position gripping device 1040 when needed and where needed to receive stacks of articles from transfer system 1030. The movement of gripping device 1040 may be substantially horizontally as stacks of articles accumulate in respective troughs in transfer device 1030.

As shown in FIG. 67, gripping device 1040 may also be manipulated by robotic manipulator 1050 whereby gripping device 1040 is rotated from its position in FIG. 66 to receive a stack of articles from transfer device 1030. In the aspect of the invention shown in FIG. 67, gripping device 1040 has been completely filled with stacks and, according to aspects of the invention, gripping device 1040 can now transfer the stacks of articles to container 1060. This transfer of stacks to container 1060 is shown in FIG. 68.

As shown in FIG. 68, gripping device 1040 bearing stacks of articles is positioned in container 1060 by robotic manipulator 1050 where gripping device 1040 can release the stacks into container 1060. According to aspects of the invention, after release of the stacks of articles into container 1060, robotic manipulator 1050 may then reposition gripping device 1030 adjacent to transfer device 1030—as shown in FIG. 66—and the process shown in FIGS. 66 through 68 may be repeated as needed, for example, to provide the desired number or articles in container 1060, or to subsequent containers 1060. Container 1060 having the desired number of articles may then be transferred to storage, shipping, or other handling, for example, manually or on conveyor 1070.

Though not shown in the figures presented herein, it will be understood that systems 10, 300, 400, and 600, 800, and 1000 disclosed herein, and any other components, devices, or systems disclosed herein, may typically include appropriate instrumentation, sensors, and controls, for example, to monitor, control, or vary the operation of the components of systems 10, 300, 400, and 600, 800, and 1000. This instrumentation may include a control panel or a user interface and appropriate operation, control, and diagnostic hardware and software. Systems 10, 300, 400, 600, 800, and 1000, and any other components, devices, or systems disclosed herein, may also include appropriate support structures, for example, commercial tubing and mechanical fasteners, and protective barriers and/or screens.

Aspects of the present invention provide devices and methods for transferring articles, for example, food items, such as, frozen or unfrozen hamburger patties, frozen or unfrozen chicken breasts, frozen or unfrozen baked goods, among other food items, including canned goods. Aspects of the present invention may also be used to handle non-food articles, for example, hardware, components, medical devices, dishware, utensils, or any other non-food item that can be handled by the aspects of the invention disclosed herein According aspects of the invention, the devices, methods, and systems disclosed herein may be adapted to handle and/or process articles, such as, hamburgers, at a relatively higher rate of speed than, for example, the devices and systems may be adapted to handle and/or process articles at a rate of at least 500 items per minute, for instance, at a rate of between about 500 items per minute and about 2000 items for minute, or more.

As will be appreciated by those skilled in the art, features, characteristics, and/or advantages of the various aspects described herein, may be applied and/or extended to any embodiment (for example, applied and/or extended to any portion thereof). The systems may be operable at high speeds and be capable, for example, of handling food and non-food stackable articles, for example, frozen hamburger patties, or other frozen foods, and positioning the articles in containers in a safe and efficient manner.

Although several aspects of the present invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

The invention claimed is:

1. A method for processing stackable articles transported on a receiver, the receiver adapted to form a predetermined number of stacks of the articles, the method comprising:
   a) determining an attribute of the articles in at least one of the stacks of articles;
   b) when the attribute of the articles in the at least one of the stacks conforms to a predetermined attribute of the articles, transferring the at least one of the stacks of articles into a gripping device in a first position;
   c) retaining the at least one stack of articles in the gripping device in the first position;
   d) repeating steps a), b), and c) and thereby retaining multiple stacks of articles in the gripping device;
   e) transferring the gripping device having the multiple stacks of articles from the first position to a second position; and
   f) discharging the multiple stacks of articles from the gripping device at the second position.

2. The method as recited in claim 1, wherein the method further comprises: g) repeating steps d), e), and f) until a predetermined number of stacks are discharged at the second position.

3. The method as recited in claim 1, wherein the stackable articles comprise at least one of a food item and a non-food item.

4. The method as recited in claim 1, wherein determining the attribute of the articles in at least one of the stacks of articles comprises at least one of detecting a weight of at least one of the stacks of articles and detecting a length of at least one of the stacks of articles.

5. The method as recited in claim 1, wherein determining the attribute of the articles in at least one of the stacks of articles comprises at least one of weighing at least one of the stacks of articles, counting articles in at least one of the stacks of articles; and measuring a length of at least one of the stacks of articles.

6. The method as recited in any one of claim 1, wherein the attribute of the articles comprises one or more of the number of the articles, the weight of the articles, and the length of the articles.

7. A method for processing stackable articles transported on a receiver, the receiver adapted to form a redetermined number of stacks of the articles the method comprising:
   a) determining an attribute of the articles in at least one of the stacks of articles;
   b) when the attribute of the articles in the at least one of the stacks conforms to a predetermined attribute of the articles, transferring the at least one of the stacks of articles into a gripping device in a first position;
   c) retaining the at least one stack of articles in the gripping device in the first position;
   d) repeating steps a), b), and c) and thereby retaining multiple stacks of articles in the gripping device;
   e) transferring the gripping device having the multiple stacks of articles from the first position to a second position; and
   f) discharging the multiple stacks of articles from the gripping device at the second position,
   wherein transferring the at least one of the stacks of articles into the gripping device in the first position comprises:
   b1) transferring at least some of the stacks of articles to a staging area; and
   b2) transferring at least some of the stacks of articles from the staging area to the gripping device in the first position.

8. The method as recited in claim 7, wherein b1) transferring at least some of the stacks of articles to a staging area comprises slidably transferring at least some of the stacks of articles to the staging area along a path.

9. The method as recited in claim 8, wherein the method further comprises retaining the at least some of the stacks of articles in the staging area.

10. The method as recited in claim 9, wherein retaining the at least some of the stacks of articles in the staging area comprises supporting at least some of the stacks of articles with a moveable retainer.

11. The method as recited in claim 10, wherein supporting at least some of the stacks of articles with a moveable retainer comprises rotatably engaging the moveable retainer with at least some of the stacks of articles.

12. The method as recited in claim 7, wherein the stackable articles comprise at least one of a food item and a non-food item.

13. The method as recited in claim 7, wherein determining the attribute of the articles in at least one of the stacks of articles comprises at least one of detecting a weight of at least one of the stacks of articles and detecting a length of at least one of the stacks of articles.

14. The method as recited in claim 7, wherein determining the attribute of the articles in at least one of the stacks of articles comprises at least one of weighing at least one of the stacks of articles, counting articles in at least one of the stacks of articles; and measuring a length of at least one of the stacks of articles.

15. The method as recited in any one of claim 7, wherein the attribute of the articles comprises one or more of the number of the articles, the weight of the articles, and the length of the articles.

16. A method for processing stackable articles transported on a receiver, the receiver adapted to form a redetermined number of stacks of the articles the method comprising:
   a) determining an attribute of the articles in at least one of the stacks of articles;
   b) when the attribute of the articles in the at least one of the stacks conforms to a predetermined attribute of the articles, transferring the at least one of the stacks of articles into a gripping device in a first position;
   c) retaining the at least one stack of articles in the gripping device in the first position;
   d) repeating steps a), b), and c) and thereby retaining multiple stacks of articles in the gripping device;
   e) transferring the gripping device having the multiple stacks of articles from the first position to a second position; and
   f) discharging the multiple stacks of articles from the gripping device at the second position,
   wherein the method further comprises, prior to a), discharging the articles from the receiver to a transfer system, and wherein a) and b) are practiced by the transfer system.

17. The method as recited in claim 16, wherein discharging the articles from the receiver system to a transfer system comprises discharging the articles from the receiver system at an outlet having an elevation higher than an elevation of an inlet of a trough of the transfer system.

18. The method as recited in claim 17, wherein b) when the number of articles in the at least one of the stacks equals a predetermined number of articles, forcibly separating an article defining a predetermined number from a subsequent article at the elevation of the outlet of the receiver system.

19. The method as recited in claim 18, wherein forcibly separating comprises impacting the article defining the predetermined number with a movable barrier.

20. The method as recited in claim 17, wherein b) when the number of articles in the at least one of the stacks equals a predetermined number of articles, retaining a subsequent article at the elevation of the outlet of the trough of the receiver system.

21. The method as recited in claim 20, wherein retaining the subsequent article comprises temporarily retaining the subsequent article at the elevation of the outlet of the trough with a movable barrier.

22. The method as recited in claim 16, wherein the stackable articles comprise at least one of a food item and a non-food item.

23. The method as recited in claim 16, wherein determining the attribute of the articles in at least one of the stacks of articles comprises at least one of detecting a weight of at least one of the stacks of articles and detecting a length of at least one of the stacks of articles.

24. The method as recited in claim 16, wherein determining the attribute of the articles in at least one of the stacks of articles comprises at least one of weighing at least one of the stacks of articles, counting articles in at least one of the stacks of articles; and measuring a length of at least one of the stacks of articles.

25. The method as recited in any one of claim 16, wherein the attribute of the articles comprises one or more of the number of the articles, the weight of the articles, and the length of the articles.

* * * * *